(12) United States Patent
Reix et al.

(10) Patent No.: US 12,006,626 B2
(45) Date of Patent: Jun. 11, 2024

(54) METHOD FOR SEPARATING AND REASSEMBLING A DUAL LAYER ASSEMBLY

(71) Applicant: COMPAGNIE GENERALE DES ETABLISSEMENTS MICHELIN, Clermont-Ferrand (FR)

(72) Inventors: Olivier Reix, Clermont-Ferrand (FR); Gael Pataut, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 221 days.

(21) Appl. No.: 17/629,836

(22) PCT Filed: Jul. 22, 2020

(86) PCT No.: PCT/FR2020/051337
§ 371 (c)(1),
(2) Date: Jan. 25, 2022

(87) PCT Pub. No.: WO2021/014098
PCT Pub. Date: Jan. 28, 2021

(65) Prior Publication Data
US 2022/0402302 A1 Dec. 22, 2022

(30) Foreign Application Priority Data

Jul. 25, 2019 (FR) ...................... 1908431

(51) Int. Cl.
*D07B 1/06* (2006.01)
*B60C 9/00* (2006.01)
*D07B 7/02* (2006.01)

(52) U.S. Cl.
CPC .......... *D07B 1/0633* (2013.01); *B60C 9/0007* (2013.01); *D07B 1/0646* (2013.01);
(Continued)

(58) Field of Classification Search
CPC .... D07B 1/0633; D07B 1/0646; D07B 7/025; B60C 9/0007
(Continued)

(56) References Cited

U.S. PATENT DOCUMENTS

| | | | |
|---|---|---|---|
| 1,906,543 A | * 5/1933 | Conner | D07B 7/025 57/58.32 |
| 2,000,104 A | * 5/1935 | Somerville | D07B 3/085 57/1 R |

(Continued)

FOREIGN PATENT DOCUMENTS

| | | |
|---|---|---|
| CN | 102373632 A | 3/2012 |
| DE | 102011053240 A1 | 3/2013 |

(Continued)

OTHER PUBLICATIONS

International Search Report dated Nov. 6, 2020, in corresponding PCT/FR2020/051337 (5 pages).

*Primary Examiner* — Shaun R Hurley
(74) *Attorney, Agent, or Firm* — VENABLE LLP

(57) ABSTRACT

The method enables the production of a final assembly (A) comprising two layers and comprises a step (100) of providing a temporary assembly (AT) comprising a temporary core (NT), a step (124) of separating the temporary assembly (AT) into a first divided assembly (AFI), a second divided assembly (AF2), a third divided assembly (AF3) and the temporary core (NT). The method comprises a step (135) of reassembling the first divided assembly (AFI), the second divided assembly (AF2) and the third divided assembly (AF3) to form the final assembly (A).

12 Claims, 15 Drawing Sheets

(52) U.S. Cl.
CPC ...... *D07B 7/025* (2013.01); *D07B 2201/2022* (2013.01); *D07B 2201/204* (2013.01); *D07B 2501/2046* (2013.01)

(58) Field of Classification Search
USPC .............................................. 57/2.3, 2.5, 311
See application file for complete search history.

(56) References Cited

U.S. PATENT DOCUMENTS

| | | | |
|---|---|---|---|
| 2,556,164 | A | 6/1951 | Carleton et al. |
| 3,327,753 | A | 6/1967 | Travers |
| 3,789,596 | A * | 2/1974 | Richley ................... D07B 7/025 57/311 |
| 5,802,830 | A * | 9/1998 | Kawatani .............. B60C 9/0007 57/902 |
| 6,076,344 | A * | 6/2000 | Doujak ................ D07B 1/0653 57/9 |
| 6,109,017 | A * | 8/2000 | Kawatani .............. D07B 1/0653 152/527 |
| 6,151,879 | A * | 11/2000 | Doujak ................ D07B 1/0606 57/284 |
| 6,354,068 | B1 * | 3/2002 | Onuma ................ D07B 1/0653 57/215 |
| 6,681,555 | B1 * | 1/2004 | Heisel .................... D02G 1/082 57/284 |
| 6,904,744 | B2 * | 6/2005 | Cauwels .............. D07B 1/0646 57/311 |
| 8,359,823 | B2 * | 1/2013 | Qi ........................ D07B 1/0626 57/212 |
| 10,364,529 | B2 | 7/2019 | Calvet et al. |
| 10,378,128 | B2 | 8/2019 | Calvet et al. |
| 10,426,505 | B2 | 10/2019 | Matsumoto |
| 10,619,297 | B2 | 4/2020 | Calvet et al. |
| 2006/0027310 | A1 | 2/2006 | Auclair |
| 2007/0006957 | A1 | 1/2007 | Nakajima |
| 2017/0321352 | A1 | 11/2017 | Calvet et al. |
| 2017/0321376 | A1 | 11/2017 | Calvet et al. |
| 2018/0117970 | A1 | 5/2018 | LeClerc et al. |
| 2018/0161053 | A1 | 6/2018 | Matsumoto |
| 2018/0171551 | A1 | 6/2018 | Calvet et al. |
| 2021/0309050 | A1 | 10/2021 | Cornille et al. |
| 2022/0251780 | A1 | 8/2022 | Barguet et al. |
| 2022/0258535 | A1 | 8/2022 | Barguet et al. |
| 2023/0349097 | A1 | 11/2023 | Pataut et al. |

FOREIGN PATENT DOCUMENTS

| | | |
|---|---|---|
| EP | 1623819 A1 | 2/2006 |
| EP | 2845620 A1 | 3/2015 |
| EP | 3165670 A1 | 5/2017 |
| EP | 3293306 A1 | 3/2018 |
| FR | 1413102 | 10/1965 |
| WO | 2016/083265 A1 | 6/2016 |
| WO | 2016/083267 A1 | 6/2016 |
| WO | 2016/189073 A1 | 12/2016 |
| WO | 2016/189074 A1 | 12/2016 |
| WO | 2020/021006 A1 | 1/2020 |
| WO | 2020/021007 A1 | 1/2020 |

* cited by examiner

METHOD FOR SEPARATING AND REASSEMBLING A DUAL LAYER ASSEMBLY

BACKGROUND

The invention relates to a method and an installation for producing a final assembly, to a final assembly obtained by this method, and to a tyre comprising such a final assembly.

A method and an installation for producing first and second final assemblies are known from WO2016083265 and WO2016083267. This method comprises a step of assembling a plurality of metallic filamentary elements in a layer of a plurality of metallic filamentary elements around a temporary core to form a temporary assembly.

The method then comprises a first step of splitting the temporary assembly into:
a first split assembly composed of a layer composed of a plurality of helically wound metallic filamentary elements derived from the layer of the temporary assembly, and
a split assemblage comprising a plurality of metallic filamentary elements helically wound around the temporary core, these metallic filamentary elements being derived from the layer of the temporary assembly.

The method then comprises a second step of splitting the split assemblage into:
a second split assembly composed of a layer composed of the helically wound metallic filamentary elements derived from the layer of the split assemblage, and
the temporary core.

At the end of this method, each first and second split assembly forms a final assembly from which the temporary core has been separated. Separation of the temporary core is made possible by virtue of the separation of the metallic filamentary elements of the layer of the temporary assembly, which makes it possible to form, in the first step of splitting, an outlet passage for the split assemblage comprising the temporary core and, in the second step of splitting, an outlet passage for the temporary core.

By virtue of the temporary core, the method allows the metallic filamentary elements to be preformed collectively by pressing them onto the temporary core in order to impart to all of them the same particular geometrical characteristics, for example a radius of curvature and a helix diameter. The use of a temporary core thus makes preforming possible without the use of mechanical tools. Each final assembly has advantageous mechanical properties, especially properties of endurance in compression, which properties can be refined by modifying especially the diameter of the temporary core and the helix angle of each metallic filamentary element.

Nevertheless, in this method, in order to form the outlet passages for the temporary core and for given geometrical characteristics of each metallic filamentary element, the number of metallic filamentary elements of the layer of each final assembly is necessarily reduced. This reduction in the number of metallic filamentary elements of the layer brings about a reduction in the linear density of each final assembly and therefore a reduction in the reinforcement which the final assembly is able to provide, especially within a tyre. Conversely, if it is desired to retain a high level of reinforcement, it is necessary to start from a temporary assembly comprising a large number of metallic filamentary elements, which does not allow all the desired geometrical characteristics or the desired mechanical properties for the final assemblies to be obtained.

SUMMARY

The invention provides a method for producing a final assembly by means of collective preforming of the metallic filamentary elements around a temporary core, which on the one hand does not prevent as high a linear density as possible from being maintained and on the other hand allows all the desired geometrical characteristics of the metallic filamentary elements to be obtained.

DETAILED DESCRIPTION

To this end, the invention provides a method for producing a final assembly comprising at least two layers comprising an inner layer C1 composed of $C1'>1$ helically wound metallic filamentary elements and an outer layer C2 composed of $C2'>1$ metallic filamentary elements helically wound around the inner layer C1. The method comprises:
a step of providing a temporary assembly comprising at least two layers comprising an inner layer A1 composed of $A1'>1$ metallic filamentary elements helically wound around a temporary core and an outer layer A2 composed of $A2'>1$ metallic filamentary elements helically wound around the inner layer A1,
a step of separating the temporary assembly between at least:
a first split assembly comprising at least one layer D1 composed of $D1' \geq 1$ helically wound metallic filamentary element(s), the D1' metallic filamentary element(s) being derived from the inner layer A1 composed of $A1'>1$ metallic filamentary elements of the temporary assembly,
a second split assembly comprising at least one layer comprising a layer E2 composed of $E2' \geq 1$ helically wound metallic filamentary element(s), the E2' metallic filamentary element(s) being derived from the outer layer A2 composed of $A2'>1$ metallic filamentary elements of the temporary assembly,
a third split assembly comprising at least one layer F2 composed of $F2' \geq 1$ helically wound metallic filamentary element(s), the F2' metallic filamentary element(s) being derived from the outer layer A2 composed of $A2'>1$ metallic filamentary elements of the temporary assembly,
the temporary core or one or more assemblages comprising the temporary core.

The method according to the invention also comprises a step of reassembling at least the first split assembly, the second split assembly and the third split assembly to form the final assembly.

At the end of the step of separating the temporary assembly, there are obtained, in one variant, the first split assembly, the second split assembly, the third split assembly and the temporary core, the temporary core being isolated from any other metallic filamentary element derived from the inner layer A1 and outer layer A2 of the temporary assembly. In other words, at the end of the step of separating the temporary assembly, there are obtained, in this variant, the first split assembly, the second split assembly, the third split assembly and an assemblage composed of the temporary core.

In another variant, at the end of the step of separating the temporary assembly, there are obtained the first split assembly, the second split assembly, the third split assembly and an assemblage comprising the temporary core, the assemblage comprising the temporary core also comprising one or more metallic filamentary elements derived from the inner layer A1 and outer layer A2 of the temporary assembly. In other words, in this variant, at the end of the step of separating the temporary assembly, there are obtained the first split assembly, the second split assembly, the third split assembly and an assemblage composed of the temporary core and one or more metallic filamentary elements derived from the inner layer A1 and outer layer A2 of the temporary assembly.

In yet another variant, at the end of the step of separating the temporary assembly, there are obtained the first split assembly, the second split assembly, the third split assembly and a plurality of assemblages each comprising a portion of the temporary core, each assemblage comprising a portion of the temporary core also comprising one or more metallic filamentary elements derived from the inner layer A1 and outer layer A2 of the temporary assembly. Accordingly, the assemblages comprise the totality of the temporary core and the portions of the temporary core of the assemblages form the temporary core in its totality. In other words, there are obtained, in this variant, the first split assembly, the second split assembly, the third split assembly and a plurality of assemblages each composed of a portion of the temporary core and one or more metallic filamentary elements derived from the inner layer A1 and outer layer A2 of the temporary assembly, the portions of the temporary core constituting the temporary core.

By virtue of the step of reassembling of the method according to the invention, it is possible, for given geometrical characteristics, to increase the linear density of the final assembly as compared to the method of the prior art in which the number of metallic filamentary elements is necessarily limited, while allowing the temporary core to be removed. Conversely, for a given linear density, it is possible to obtain a larger range of geometrical characteristics than with the method of the prior art.

Furthermore, by virtue of the two layers of the final assembly, a larger number of metallic filamentary elements is available for increasing the linear density of the final assembly compared to an assembly having only a single layer. Moreover, owing to the larger number of metallic filamentary elements, it is also possible to adjust the linear density of the final assembly more precisely compared to an assembly having only a single layer. Finally, by altering the geometrical properties of each of the inner layer C1 and outer layer C2 of the final assembly, a greater diversity of mechanical properties can be obtained with final assemblies comprising at least two layers as compared to final assemblies composed of only a single layer.

During this step of reassembling, the helically wound metallic filamentary element(s) forming the layer(s) of the first split assembly is/are reassembled with the helically wound metallic filamentary element(s) forming the layer(s) of the second split assembly and with the helically wound metallic filamentary element(s) forming the layer(s) of the third split assembly. The reassembling of the metallic filamentary elements of these layers allows the layers of the final assembly to be obtained.

In the method according to the invention, each metallic filamentary element of each first, second and third split assembly being derived from one of the inner and outer layers of the temporary assembly, the step of reassembling advantageously makes it possible to form the final assembly in which the C1' and C2' metallic filamentary elements have the same geometrical characteristics and therefore form two homogeneous layers of metallic filamentary elements. Accordingly, in order to permit, in an advantageous embodiment, the obtainment of an assembly in which the metallic filamentary elements have identical geometrical characteristics, the step of providing, the step of separating and the step of reassembling are carried out such that, on the one hand, all the C1' metallic filamentary elements have the same diameter d1, are helically wound with the same pitch p1 and have the same helix diameter $\phi1$ and, on the other hand, all the C2' metallic filamentary elements have the same diameter d2, are helically wound with the same pitch p2 and have the same helix diameter $\phi2$. The helix diameter corresponds to the diameter of the theoretical circle that passes through the centres of the metallic filamentary elements of the layer in a plane perpendicular to the main axis of the assembly. It will be recalled that the pitch with which each metallic filamentary element is wound is the length covered by this filamentary element, measured parallel to the axis of the assembly in which it is located, at the end of which the filamentary element having this pitch makes a complete turn around said axis of the assembly.

Furthermore, as described above, according to the different embodiments, the step of separating and the step of reassembling are carried out such that $A1' \geq C1'$ and $A2' \geq C2'$.

The temporary assembly of the method according to the invention comprises the inner layer A1 composed of A1' metallic filamentary elements, the outer layer A2 composed of A2' metallic filamentary elements helically wound around the inner layer A1, and the temporary core, the A1' metallic filamentary elements being helically wound around the temporary core. Preferably, in an embodiment which allows a final assembly composed of two layers of metallic filamentary elements to be produced, the temporary assembly is composed of the inner layer A1 composed of the A1' metallic filamentary elements, the layer A2 composed of the A2' metallic filamentary elements helically wound around the inner layer A1, and the temporary core, the A1' metallic filamentary elements being helically wound around the temporary core.

Another advantage of the method according to the invention is that each metallic filamentary element of the final assembly is without preforming marks. Such preforming marks include in particular flats. The preforming marks also include cracks extending in section planes substantially perpendicular to the main axis along which each metallic filamentary element extends. Such cracks extend, in a section plane substantially perpendicular to the main axis, from a radially external surface of each metallic filamentary element radially towards the inside of each metallic filamentary element. As described above, such cracks are initiated by the mechanical preforming tools on account of the bending loads, that is to say perpendicularly to the main axis of each metallic filamentary element, making them highly detrimental to endurance. Conversely, in the method used, the metallic filamentary elements are preformed collectively and simultaneously on the temporary core and the preforming forces are exerted torsionally and therefore not perpendicularly to the main axis of each metallic filamentary element. Any cracks created do not extend radially from the radially external surface of each metallic filamentary element radially towards the inside of each metallic filamentary element but along the radially external surface of each metallic filamentary element, making them less detrimental to endurance.

The method according to the invention is advantageously a continuous or in-line method. Accordingly, there is no step of intermediate storage of the various assemblies and assemblages generated in the method between the step of providing the temporary assembly and the step of reassembling the final assembly.

In the present invention, a step of splitting an initial object into a plurality of final objects means that, during this step of splitting, the initial object is divided into the final objects and only these final objects such that the initial object is found in totality in the final objects. Moreover, in a step of splitting, the initial object is divided into the final objects simultaneously, that is to say the final objects are separated at a same splitting point. In particular, in the case of an initial object split into at least three final objects, the three final objects, in a step of splitting, are separated from one another simultaneously and at the same point.

In the present invention, a step of separating an initial object between a plurality of final objects means that, in order to obtain these final objects, at least one step of splitting is necessary. Accordingly, in order to obtain the final objects, the step of separating comprises a step of splitting the initial object into the final objects or comprises a step of splitting the initial object into intermediate objects followed by one or more successive steps of splitting the intermediate objects into the final objects. In addition, in a step of separating, the initial object is not necessarily found in totality in the final object, it being possible that assemblages or assemblies have been removed from the method in one or more steps of splitting and have not been used in the subsequent steps of splitting. Finally, a step of separating can comprise one or more steps of reassembling a plurality of intermediate objects obtained in a step of splitting of the step of separating in order to obtain other intermediate objects or the final objects.

Whether it be in a step of separating or a step of splitting, the final objects are physically separated from one another, that is to say are not in contact with one another downstream of the step of separating or splitting and upstream of any step of reassembling two or more of these final objects.

The final assembly is a single helix. By definition, a single helix assembly is an assembly in which the axis of each metallic filamentary element describes a single helix, in contrast to a double helix assembly in which the axis of each metallic filamentary element describes a first helix around the axis of the assembly and a second helix around a helix described by the axis of the assembly.

In other words, when the assembly extends in a substantially linear direction, the assembly comprising one or more layers of helically wound filamentary elements, each metallic filamentary element of the or each layer describes a helical trajectory around a main axis substantially parallel to the substantially linear direction, such that, in a section plane substantially perpendicular to the main axis, the distance between the centre of each metallic filamentary element of a given layer and the main axis is substantially constant and equal for all the metallic filamentary elements of each given layer. By contrast, when a double helix assembly extends in a substantially linear direction, the distance between the centre of each metallic filamentary element of a given layer and the substantially linear direction is different for all the metallic filamentary elements of the given layer.

Filamentary element is understood as being any elongate element of great length relative to its cross section, whatever the shape thereof, for example circular, oblong, rectangular or square, or even flat. When it is of circular shape, its diameter is preferably less than 3 mm. Very preferably, each filamentary element has a circular cross section.

In one embodiment, each metallic filamentary element comprises a single metallic elementary monofilament.

In another embodiment, each metallic filamentary element comprises an assembly of a plurality of metallic elementary monofilaments. Accordingly, for example, each metallic filamentary element comprises a strand of a plurality of metallic elementary monofilaments. Each strand preferably comprises one or more layers of helically wound metallic elementary monofilaments.

By definition, metallic is understood to mean an elementary monofilament made up predominantly (i.e. more than 50% of its weight) or entirely (100% of its weight) of a metallic material. Each metallic elementary monofilament is preferably made of steel, more preferably of pearlitic (or ferro-pearlitic) carbon steel, referred to as "carbon steel" hereinbelow, or of stainless steel (by definition, steel comprising at least 10.5% chromium).

Such a metallic elementary monofilament preferably comprises a core of steel, optionally coated with one or more layers of a coating which may be metallic and/or based on a non-metallic adhesive composition. For example, the metallic coating comprises a metal chosen from zinc, copper, tin, cobalt and alloys of these metals. Mention will be made, as examples of alloys of these metals, of brass and bronze.

When a carbon steel is used, its carbon content (% by weight of steel) is preferably between 0.1% and 1.2%. Each metallic elementary monofilament has a mechanical strength ranging from 1000 MPa to 5000 MPa. Such mechanical strengths correspond to the steel grades commonly found in the field of tyres, namely the grades NT (normal tensile), HT (high tensile), ST (super tensile), SHT (super high tensile), UT (ultra tensile), UHT (ultra high tensile) and MT (mega tensile), the use of high mechanical strengths optionally permitting improved reinforcement of the matrix in which the reinforcing element is to be embedded and a reduction in the weight of the matrix so reinforced.

In a preferred embodiment, each metallic elementary monofilament has a diameter ranging from 0.05 mm to 0.50 mm, preferably from 0.10 mm to 0.48 mm and more preferably from 0.15 mm to 0.45 mm.

In a first configuration, the first split assembly is composed of the layer D1, the second split assembly is composed of the layer E2 and the third split assembly is composed of the layer F2. In this first configuration, $D1'=C1'$ and $E2'+F2'=C2'$.

In a second configuration, the first split assembly is composed of the layer D1, the second split assembly comprises at least two layers comprising an inner layer E1 composed of helically wound metallic filamentary element(s) and the outer layer E2 composed of the $E2'\geq 1$ metallic filamentary element(s) helically wound around the inner layer E1, the E1' metallic filamentary element(s) being derived from the inner layer A1 composed of $A1'>1$ metallic filamentary elements of the temporary assembly, the E2' metallic filamentary element(s) being derived from the outer layer A2 composed of $A2'>1$ metallic filamentary elements of the temporary assembly, and the third split assembly is composed of the layer F2. In this second configuration, $D1'+E1'=C1'$ and $E2'+F2'=C2'$.

In a third configuration, the first split assembly is composed of the layer D1, the second split assembly is composed of the layer E2 and the third split assembly comprises at least two layers comprising an inner layer F1 composed of $F1'\geq 1$ helically wound metallic filamentary element(s) and the outer layer F2 composed of the $F2'\geq 1$ metallic filamentary element(s) helically wound around the inner layer F1, the F1' metallic filamentary element(s) being derived from the inner layer A1 composed of $A1'>1$ metallic filamentary elements of the temporary assembly. In this third configuration, $D1'+F1'=C1'$ and $E2'+F2'=C2'$.

In a fourth configuration, the first split assembly is composed of the layer D1, the second split assembly comprises at least two layers comprising an inner layer E1 composed of E1'≥1 helically wound metallic filamentary element(s) and the outer layer E2 composed of the E2'≥1 metallic filamentary element(s) helically wound around the inner layer E1, the E1' metallic filamentary element(s) being derived from the inner layer A1 composed of A1'>1 metallic filamentary elements of the temporary assembly, the E2' metallic filamentary element(s) being derived from the outer layer A2 composed of A2'>1 metallic filamentary elements of the temporary assembly, the third split assembly comprises at least two layers comprising an inner layer F1 composed of F1'≥1 helically wound metallic filamentary element(s) and the outer layer F2 composed of the F2'≥1 metallic filamentary element(s) helically wound around the inner layer F1, the F1' metallic filamentary element(s) being derived from the inner layer A1 composed of A1'>1 metallic filamentary elements of the temporary assembly. In this fourth configuration, D1'+E1'+F1'=C1' and E2'+F2'=C2'.

In a fifth configuration, the first split assembly comprises at least two layers comprising the inner layer D1 and an outer layer D2 composed of D2'≥1 metallic filamentary element(s) helically wound around the inner layer D1, the D2' metallic filamentary element(s) being derived from the outer layer A2 composed of A2'>1 metallic filamentary elements of the temporary assembly, the second split assembly is composed of the layer E2, and the third split assembly is composed of the layer F2. In this first configuration, D1'=C1' and D2'+E2'+F2'=C2'.

In a sixth configuration, the first split assembly comprises at least two layers comprising the inner layer D1 and an outer layer D2 composed of D2'≥1 metallic filamentary element(s) helically wound around the inner layer D1, the D2' metallic filamentary element(s) being derived from the outer layer A2 composed of A2'>1 metallic filamentary elements of the temporary assembly, the second split assembly comprises at least two layers comprising an inner layer E1 composed of helically wound metallic filamentary element(s) and the outer layer E2 composed of the E2'≥1 metallic filamentary element(s) helically wound around the inner layer E1, the E1' metallic filamentary element(s) being derived from the inner layer A1 composed of A1'>1 metallic filamentary elements of the temporary assembly, the E2' metallic filamentary element(s) being derived from the outer layer A2 composed of A2'>1 metallic filamentary elements of the temporary assembly, and the third split assembly is composed of the layer F2. In this second configuration, D1'+E1'=C1' and D2'+E2'+F2'=C2'.

In a seventh configuration, the first split assembly comprises at least two layers comprising the inner layer D1 and an outer layer D2 composed of D2'≥1 metallic filamentary element(s) helically wound around the inner layer D1, the D2' metallic filamentary element(s) being derived from the outer layer A2 composed of A2'>1 metallic filamentary elements of the temporary assembly, the second split assembly is composed of the layer E2, and the third split assembly comprises at least two layers comprising an inner layer F1 composed of F1'≥1 helically wound metallic filamentary element(s) and the outer layer F2 composed of the F2'≥1 metallic filamentary element(s) helically wound around the inner layer F1, the F1' metallic filamentary element(s) being derived from the inner layer A1 composed of A1'>1 metallic filamentary elements of the temporary assembly. In this third configuration, D1'+F1'=C1' and D2'+E2'+F2'=C2'.

In an eighth configuration, the first split assembly comprises at least two layers comprising the inner layer D1 and an outer layer D2 composed of D2'≥1 metallic filamentary element(s) helically wound around the inner layer D1, the D2' metallic filamentary element(s) being derived from the outer layer A2 composed of A2'>1 metallic filamentary elements of the temporary assembly, the second split assembly comprises at least two layers comprising an inner layer E1 composed of helically wound metallic filamentary element(s) and the outer layer E2 composed of the E2'≥1 metallic filamentary element(s) helically wound around the inner layer E1, the E1' metallic filamentary element(s) being derived from the inner layer A1 composed of A1'>1 metallic filamentary elements of the temporary assembly, the E2' metallic filamentary element(s) being derived from the outer layer A2 composed of A2'>1 metallic filamentary elements of the temporary assembly, the third split assembly comprises at least two layers comprising an inner layer F1 composed of F1'≥1 helically wound metallic filamentary element(s) and the outer layer F2 composed of the F2'≥1 metallic filamentary element(s) helically wound around the inner layer F1, the F1' metallic filamentary element(s) being derived from the inner layer A1 composed of A1'>1 metallic filamentary elements of the temporary assembly. In this fourth configuration, D1'+E1'+F1'=C1' and D2'+E2'+F2'=C2'.

In an embodiment in which the step of reassembling to form the final assembly is carried out sequentially, the step of reassembling comprises, from upstream to downstream:
  an upstream step of reassembling one of the first, second and third split assemblies with another of the first, second and third split assemblies to form a downstream temporary assembly,
  a downstream step of reassembling the downstream temporary assembly with the remaining assembly from among the first, second and third split assemblies to form the final assembly.

In a first variant of the embodiment in which the step of reassembling to form the final assembly is carried out sequentially starting from the split assemblies of the first and fifth configurations described above, the step of reassembling comprises, from upstream to downstream:
  an upstream step of reassembling the first split assembly with the second split assembly to form a downstream temporary assembly,
  a downstream step of reassembling the downstream temporary assembly with the third split assembly to form the final assembly, or
  an upstream step of reassembling the first split assembly with the third split assembly to form a downstream temporary assembly,
  a downstream step of reassembling the downstream temporary assembly with the second split assembly to form the final assembly.

In a second variant of the embodiment in which the step of reassembling to form the final assembly is carried out sequentially starting from the split assemblies of the second and sixth configurations described above, the step of reassembling comprises, from upstream to downstream:
  an upstream step of reassembling the first split assembly with the second split assembly to form a downstream temporary assembly,
  a downstream step of reassembling the downstream temporary assembly with the third split assembly to form the final assembly.

In a third variant of the embodiment in which the step of reassembling to form the final assembly is carried out sequentially starting from the split assemblies of the third and seventh configurations described above, the step of reassembling comprises, from upstream to downstream:

an upstream step of reassembling the first split assembly with the third split assembly to form a downstream temporary assembly, a downstream step of reassembling the downstream temporary assembly with the second split assembly to form the final assembly.

In a fourth variant of the embodiment in which the step of reassembling to form the final assembly is carried out sequentially starting from the split assemblies of the fourth and eighth configurations described above, the step of reassembling comprises, from upstream to downstream:

an upstream step of reassembling the first split assembly with the second split assembly to form a downstream temporary assembly, a downstream step of reassembling the downstream temporary assembly with the third split assembly to form the final assembly, or an upstream step of reassembling the first split assembly with the third split assembly to form a downstream temporary assembly, a downstream step of reassembling the downstream temporary assembly with the second split assembly to form the final assembly.

In another embodiment in which the step of reassembling to form the final assembly is carried out in a single step, the step of reassembling comprises a step of simultaneously reassembling the first, second and third split assemblies to form the final assembly.

In a first embodiment permitting partial reassembling of the A1' metallic filamentary elements of the inner layer A1, the step of separating the temporary assembly between at least the first split assembly, the second split assembly, the third split assembly and the temporary core or one or more assemblages comprising the temporary core and the step of reassembling at least the first split assembly, the second split assembly and the third split assembly to form the final assembly are carried out such that $C1' < A1'$ and $C2' \leq A2'$.

In variants of a first version of the first embodiment which are compatible with the second configuration of the first, second and third split assemblies described above, the step of separating the temporary assembly between at least the first split assembly, the second split assembly, the third split assembly and the temporary core or one or more assemblages comprising the temporary core comprises:

a step of separating the temporary assembly between:

an upstream split assemblage comprising at least two layers comprising an inner layer G1 composed of $G1' \geq 1$ metallic filamentary element(s) helically wound around the temporary core and an outer layer G2 composed of $G2' \geq 1$ metallic filamentary element(s) helically wound around the inner layer G1, the G1' metallic filamentary element(s) being derived from the inner layer A1 composed of $A1' > 1$ metallic filamentary elements of the temporary assembly and the G2' metallic filamentary element(s) being derived from the outer layer A2 composed of $A2' > 1$ metallic filamentary elements of the temporary assembly, and the third split assembly, and a step of separating the upstream split assemblage between:

the first split assembly, the second split assembly, and the temporary core or one or more assemblages comprising the temporary core, preferably the temporary core.

In these variants of the first version of the first embodiment, $A1' \geq G1'$, $A2' \geq F2' + G2'$, $G1' \geq D1'$ and $G2' \geq E2'$.

In these variants, the upstream split assemblage comprises the inner layer G1 composed of the G1' metallic filamentary element(s), the outer layer G2 composed of G2' metallic filamentary element(s) helically wound around the inner layer G1, and the temporary core, the G1' metallic filamentary element(s) being helically wound around the temporary core. Preferably, in an embodiment permitting the production of a final assembly composed of two layers of metallic filamentary elements, the upstream split assemblage is composed of the inner layer G1 composed of the G1' metallic filamentary element(s), the outer layer G2 composed of the G2' metallic filamentary element(s) helically wound around the inner layer G1, and the temporary core, the G1' metallic filamentary element(s) being helically wound around the temporary core.

In these variants of the first version of the first embodiment, the step of separating the temporary assembly between the upstream split assemblage and the third split assembly takes place upstream of the step of separating the upstream split assemblage between the first split assembly, the second split assembly and the temporary core or one or more assemblages comprising the temporary core, preferably the temporary core.

Advantageously, in these variants of the first version of the first embodiment, the step of separating the upstream split assemblage between the first split assembly, the second split assembly and the temporary core or one or more assemblages comprising the temporary core, preferably the temporary core, comprises:

a step of separating the upstream split assemblage between:

a precursor assemblage comprising at least one layer I1 composed of $I1' > 1$ helically wound metallic filamentary elements, the I1' metallic filamentary elements being derived from the inner layer G1 composed of the G1' metallic filamentary elements of the upstream split assemblage, the second split assembly, the temporary core or one or more assemblages comprising the temporary core, preferably the temporary core, and a step of separating the precursor assemblage between:

a main assemblage comprising at least one layer J1 composed of $J1' \geq 1$ helically wound metallic filamentary element(s), the $J1' \geq 1$ metallic filamentary element(s) being derived from the layer I1 composed of the $I1' > 1$ metallic filamentary elements of the precursor assemblage, the main assemblage forming the first split assembly, and a supplementary assemblage comprising at least one layer K1 composed of $K1' \geq 1$ helically wound metallic filamentary element(s), the $K1' \geq 1$ metallic filamentary element(s) being derived from the layer I1 composed of the $I1' > 1$ metallic filamentary elements of the precursor assemblage.

The main assemblage forming the first split assembly, $D1' = J1'$.

Preferably, in an embodiment permitting the production of a final assembly composed of two layers of metallic filamentary elements, the precursor assemblage is composed of the layer I1 composed of the I1' metallic filamentary elements, the main assemblage forming the first split assembly is composed of the layer J1 composed of the J1' metallic filamentary element(s), and the supplementary assemblage is composed of the layer K1 composed of the K1 metallic filamentary element(s).

In these variants of the first version of the first embodiment, the step of separating the upstream split assemblage between the precursor assemblage, the second split assembly and the temporary core or one or more assemblages comprising the temporary core, preferably the temporary core, takes place upstream of the step of separating the precursor assemblage between the main assemblage forming the first split assembly and the supplementary assemblage.

Advantageously, the step of separating the precursor assemblage between the main assemblage forming the first split assembly and the supplementary assemblage comprises a step of splitting the precursor assemblage into:
the main assemblage forming the first split assembly, and
the supplementary assemblage.

Accordingly, advantageously $I1'=J1'+K1'$.

In a first variant of the first version of the first embodiment in which the temporary core is separated with the first split assembly, the step of separating the upstream split assemblage between the precursor assemblage, the second split assembly and the temporary core or one or more assemblages comprising the temporary core, preferably the temporary core, comprises:
a step of separating the upstream split assemblage between:
a downstream split assemblage comprising at least one layer H1 composed of $H1'\geq1$ metallic filamentary element(s) helically wound around the temporary core, the H1' metallic filamentary element(s) being derived from the inner layer G1 composed of the G1' metallic filamentary elements of the upstream split assemblage,
the second split assembly, and
a step of separating the downstream split assemblage between:
the precursor assemblage, and
the temporary core or one or more assemblages comprising the temporary core, preferably the temporary core.

Accordingly, in the first variant of the first version of the first embodiment, advantageously $G1'\geq H1'+E1'$, $G2'\geq E2'$ and $H1'\geq I1'$.

In this first variant, the downstream split assemblage comprises the layer H1 composed of the H1' metallic filamentary element(s) and the temporary core, the H1' metallic filamentary element(s) being helically wound around the temporary core. Preferably, in an embodiment permitting the production of a final assembly composed of two layers of metallic filamentary elements, the downstream split assemblage is composed of the layer H1 composed of the Ht metallic filamentary element(s) and the temporary core, the H1' metallic filamentary element(s) being helically wound around the temporary core.

In this first variant, the step of separating the upstream split assemblage between the downstream split assemblage and the second split assembly takes place upstream of the step of separating the downstream split assemblage between the precursor assemblage and the temporary core or one or more assemblages comprising the temporary core, preferably the temporary core.

Advantageously, in this first variant, the step of separating the upstream split assemblage between the downstream split assemblage and the second split assembly comprises a step of splitting the upstream split assemblage into:
the downstream split assemblage, and
the second split assembly.

Accordingly, advantageously $G1'=H1'+E1'$ and $G2'=E2'$.

Advantageously, in this first variant, the step of separating the downstream split assemblage between the precursor assemblage and the temporary core or one or more assemblages comprising the temporary core, preferably the temporary core, comprises a step of splitting the downstream split assemblage into:
the precursor assemblage, and
the temporary core or one or more assemblages comprising the temporary core, preferably the temporary core.

Accordingly, in the case of a step of splitting the downstream split assemblage into the precursor assemblage and the temporary core, advantageously $H1'=I1'$.

In a second variant of the first embodiment in which the temporary core is separated with the second split assembly, the step of separating the upstream split assemblage between the precursor assemblage, the second split assembly and the temporary core or one or more assemblages comprising the temporary core, preferably the temporary core, comprises:
a step of separating the upstream split assemblage between:
a downstream split assemblage comprising at least two layers comprising an inner layer H1 composed of $H1'\geq1$ metallic filamentary element(s) helically wound around the temporary core, and an outer layer H2 composed of $H2'\geq1$ metallic filamentary element(s) helically wound around the inner layer H1, the H1' metallic filamentary element(s) being derived from the inner layer G1 composed of $G1'>1$ metallic filamentary elements of the upstream split assemblage and the H2' metallic filamentary element(s) being derived from the outer layer G2 composed of $G2'>1$ metallic filamentary elements of the upstream split assemblage, and
the precursor assemblage, and
a step of separating the downstream split assemblage between:
the second split assembly, and
the temporary core or one or more assemblages comprising the temporary core, preferably the temporary core.

Accordingly, in the second variant of the first embodiment, advantageously $G1'\geq H1'+I1'$, $G2'\geq E2'$, $H1'\geq E1'$ and $H2'\geq E2'$.

In this second variant, the downstream split assemblage comprises the inner layer H1 composed of the H1' metallic filamentary element(s), the outer layer H2 composed of H2' metallic filamentary element(s) helically wound around the inner layer H1, and the temporary core, the H1' metallic filamentary element(s) being helically wound around the temporary core. Preferably, in an embodiment permitting the production of a final assembly composed of two layers of metallic filamentary elements, the downstream split assemblage is composed of the inner layer H1 composed of the H1' metallic filamentary element(s), of the outer layer H2 composed of the H2' metallic filamentary element(s) helically wound around the inner layer H1, and of the temporary core, the H1' metallic filamentary element(s) being helically wound around the temporary core.

In this second variant, the step of separating the upstream split assemblage between the downstream split assemblage and the precursor assemblage takes place upstream of the step of separating the downstream split assemblage between the second split assembly and the temporary core or one or more assemblages comprising the temporary core, preferably the temporary core.

Advantageously, in this second variant, the step of separating the upstream split assemblage between the downstream split assemblage and the precursor assemblage comprises a step of splitting the upstream split assemblage into:
the downstream split assemblage, and
the precursor assemblage.

Accordingly, advantageously $G1'=H1'+I1'$, $G2'=E2'$.

Advantageously, in this second variant, the step of separating the downstream split assemblage between the second split assembly and the temporary core or one or more assemblages comprising the temporary core, preferably the temporary core, comprises a step of splitting the downstream split assemblage into:

the second split assembly, and the temporary core or one or more assemblages comprising the temporary core, preferably the temporary core.

Accordingly, in the case of a step of splitting the downstream split assemblage into the second split assembly and the temporary core, advantageously H1'=E1' and H2'=E2'.

In variants of a second version of the first embodiment which are compatible with the first configuration of the first, second and third split assemblies described above, the step of separating the temporary assembly between at least the first split assembly, the second split assembly, the third split assembly and the temporary core or one or more assemblages comprising the temporary core comprises:

a step of separating the temporary assembly between:

an intermediate split assemblage comprising a layer Q1 composed of $Q1'>1$ metallic filamentary elements helically wound around the temporary core, the Q1' metallic filamentary elements being derived from the inner layer A1 composed of $A1'>1$ metallic filamentary elements of the temporary assembly, and the second split assembly, the third split assembly, and a step of separating the intermediate split assemblage between:

a derived assemblage comprising at least one layer Z1-composed of $Z1'\geq 1$ helically wound metallic filamentary element(s), the Z1' metallic filamentary element(s) being derived from the inner layer Q1 composed of the $Q1'>1$ metallic filamentary elements of the intermediate split assemblage, the first split assembly, and the temporary core or one or more assemblages comprising the temporary core, preferably the temporary core.

In these variants of the second version of the first embodiment, $A1'\geq 1)1'$, $A2'\geq E2'+F2'$ and $Q1'\geq Z1'+D1'$.

In these variants, the intermediate split assemblage comprises the layer Q1 composed of the Q1' metallic filamentary elements and the temporary core, the Q1' metallic filamentary elements being helically wound around the temporary core. Preferably, in an embodiment permitting the production of a final assembly composed of two layers of metallic filamentary elements, the intermediate split assemblage is composed of the layer Q1 composed of the Q1' metallic filamentary elements and the temporary core, the Q1' metallic filamentary elements being helically wound around the temporary core.

Preferably, in an embodiment permitting the production of a final assembly composed of two layers of metallic filamentary elements, the derived assemblage is composed of the layer Z1 composed of $Z1'\geq 1$ metallic filamentary element(s).

In these variants of the second version of the first embodiment, the step of separating the temporary assembly between the intermediate split assemblage, the second split assembly and the third split assembly takes place upstream of the step of separating the intermediate split assemblage between the derived assemblage, the first split assembly and the temporary core or one or more assemblages comprising the temporary core, preferably the temporary core.

Advantageously, in these variants of the first embodiment, the step of separating the intermediate split assemblage between the derived assemblage, the first split assembly and the temporary core or one or more assemblages comprising the temporary core, preferably the temporary core, comprises:

a step of separating the intermediate split assemblage between:

a first separated assemblage comprising at least one layer W1 composed of $W1'\geq 1$ helically wound metallic filamentary element(s), the W1' metallic filamentary element(s) being derived from the layer Q1 composed of the Q1' metallic filamentary elements of the intermediate split assemblage, a second separated assemblage comprising at least one layer X1 composed of $X1'\geq 1$ helically wound metallic filamentary element(s), the X1' metallic filamentary element (s) being derived from the layer Q1 composed of the Q1' metallic filamentary elements of the intermediate split assemblage, the derived assemblage, the temporary core or one or more assemblages comprising the temporary core, preferably the temporary core, a step of reassembling the first separated assemblage and the second separated assemblage to form the first split assembly.

Accordingly, advantageously $Q1'\geq W1'+X1'+Z1'$ and $W1'+X1'=D1'$.

Preferably, in an embodiment permitting the production of a final assembly composed of two layers of metallic filamentary elements, the first separated assemblage is composed of the layer W1 composed of the W1' metallic filamentary element(s), the second derived assemblage is composed of the layer X1 composed of the X1' metallic filamentary element(s).

In these variants of the first embodiment, the step of separating the intermediate split assemblage between the first separated assemblage, the second separated assemblage, the derived assemblage, the temporary core or one or more assemblages comprising the temporary core, preferably the temporary core, takes place upstream of the step of reassembling the first separated assemblage and the second separated assemblage to form the first split assembly.

In these variants of the second version of the first embodiment, according to a first option which employs a sequence of successive steps of separating, the step of separating the intermediate split assemblage between the first separated assemblage, the second separated assemblage, the derived assemblage, the temporary core or one or more assemblages comprising the temporary core, preferably the temporary core, comprises:

a step of separating the intermediate split assemblage between:

the derived assemblage, and a downstream split assemblage comprising a layer H1 composed of $H1'\geq 1$ metallic filamentary element(s) helically wound around the temporary core, the H1' metallic filamentary element(s) being derived from the layer Q1 composed of the $Q1'>1$ metallic filamentary elements of the intermediate split assemblage, a step of separating the downstream split assemblage between:

the first separated assemblage, the second separated assemblage, the temporary core or one or more assemblages comprising the temporary core, preferably the temporary core.

Accordingly, advantageously $Q1'\geq H1'+Z1'$ and $H1'\geq W1'+X1'$.

Preferably, in an embodiment permitting the production of a final assembly composed of two layers of metallic filamentary elements, the downstream split assemblage is composed of the layer H1 composed of the H1' metallic filamentary element(s) and the temporary core, the H1' metallic filamentary element(s) being wound around the temporary core.

In these variants of the first embodiment, the step of separating the intermediate split assemblage between the derived assemblage and the downstream split assemblage takes place upstream of the step of separating the downstream split assemblage between the first separated assemblage, the second separated assemblage and the temporary core or one or more assemblages comprising the temporary core, preferably the temporary core.

Advantageously, in this first option, the step of separating the intermediate split assemblage between the derived assemblage and the downstream split assemblage comprises a step of splitting the intermediate split assemblage into the derived assemblage and the downstream split assemblage.

Accordingly, advantageously $Q1'=Z1'+H1'$.

Advantageously, in this first option, the step of separating the downstream split assemblage between the first separated assemblage, the second separated assemblage and the temporary core or one or more assemblages comprising the temporary core, preferably the temporary core, comprises a step of splitting the downstream split assemblage into the first separated assemblage, the second separated assemblage and the temporary core or one or more assemblages comprising the temporary core, preferably the temporary core.

Accordingly, in the case of a step of splitting the downstream split assemblage into the first separated assemblage, the second separated assemblage and the temporary core, advantageously $H1'=W1'+X1'$.

In these variants of the second version of the first embodiment, according to a second option which employs a step of simultaneously separating, the step of separating the intermediate split assemblage between the first separated assemblage, the second separated assemblage, the derived assemblage, the temporary core or one or more assemblages comprising the temporary core, preferably the temporary core, comprises a step of splitting the intermediate split assemblage into the first separated assemblage, the second separated assemblage, the derived assemblage, the temporary core or one or more assemblages comprising the temporary core, preferably the temporary core.

In a second embodiment permitting total reassembling of the A1' metallic filamentary elements of the inner layer A1, the step of separating the temporary assembly between at least the first split assembly, the second split assembly, the third split assembly and the temporary core or one or more assemblages comprising the temporary core and the step of reassembling at least the first split assembly, the second split assembly and the third split assembly to form the final assembly are carried out such that $C1'=A1'$ and $C2'\leq A2'$.

In variants of a first version of the second embodiment which are compatible with the second configuration of the first, second and third split assemblies described above, the step of separating the temporary assembly between at least the first split assembly, the second split assembly, the third split assembly and the temporary core or one or more assemblages comprising the temporary core comprises:

a step of separating the temporary assembly between:

an upstream split assemblage comprising at least two layers comprising an inner layer G1 composed of $G1'\geq 1$ metallic filamentary element(s) helically wound around the temporary core and an outer layer G2 composed of $G2'\geq 1$ metallic filamentary element(s) helically wound around the inner layer G1, the G1' metallic filamentary element(s) being derived from the inner layer A1 composed of $A1'>1$ metallic filamentary elements of the temporary assembly and the G2' metallic filamentary element(s) being derived from the outer layer A2 composed of $A2'>1$ metallic filamentary elements of the temporary assembly, and the third split assembly, and a step of separating the upstream split assemblage between:

the first split assembly, the second split assembly, and the temporary core.

In these variants of the second embodiment, $A1'\geq G1'$, $A2'\geq F2'+G2'$, $G1'\geq D1'$ and $G2'\geq E2'$.

In these variants, the upstream split assemblage comprises the inner layer G1 composed of the G1' metallic filamentary element(s), the outer layer G2 composed of G2' metallic filamentary element(s) helically wound around the inner layer G1, and the temporary core, the G1' metallic filamentary element(s) being helically wound around the temporary core. Preferably, in an embodiment permitting the production of a final assembly composed of two layers of metallic filamentary elements, the upstream split assemblage is composed of the inner layer G1 composed of the G1' metallic filamentary element(s), the outer layer G2 composed of the G2' metallic filamentary element(s) helically wound around the inner layer G1, and the temporary core, the G1' metallic filamentary element(s) being helically wound around the temporary core.

In these variants of the first version of the second embodiment, the step of separating the temporary assembly between the upstream split assemblage and the third split assembly takes place upstream of the step of separating the upstream split assemblage between the first split assembly, the second split assembly and the temporary core or one or more assemblages comprising the temporary core, preferably the temporary core.

In a first variant of the first version of the second embodiment in which the temporary core is separated with the first split assembly, the step of separating the upstream split assemblage between the first split assembly, the second split assembly and the temporary core comprises:

a step of separating the upstream split assemblage between:

a downstream split assemblage comprising at least one layer H1 composed of $H1'\geq 1$ metallic filamentary element(s) helically wound around the temporary core, the Ht metallic filamentary element(s) being derived from the inner layer G1 composed of the G1' metallic filamentary elements of the upstream split assemblage, the second split assembly, and a step of separating the downstream split assemblage between:

the first split assembly, and the temporary core.

Accordingly, in the first variant of the first version of the second embodiment, advantageously $G1'=H1'+E1'$, $G2'\geq E2'$ and $H1'=D1'$.

In this first variant, the downstream split assemblage comprises the layer H1 composed of the H1' metallic filamentary element(s) and the temporary core, the H1' metallic filamentary element(s) being helically wound around the temporary core. Preferably, in an embodiment permitting the production of a final assembly composed of two layers of metallic filamentary elements, the downstream split assemblage is composed of the layer H1 composed of the Ht metallic filamentary element(s) and the temporary core, the H1' metallic filamentary element(s) being helically wound around the temporary core.

In this first variant of the first version of the second embodiment, the step of separating the upstream split assemblage between the downstream split assemblage and the second split assembly takes place upstream of the step of separating the downstream split assemblage between the first split assembly and the temporary core.

Advantageously, the step of separating the upstream split assemblage between the downstream split assemblage and the second split assembly comprises a step of splitting the upstream split assemblage into:
the downstream split assemblage, and
the second split assembly.
Accordingly, advantageously G1'=H1'+E1' and G2'=E2'.

Advantageously, the step of separating the downstream split assemblage between the first split assembly and the temporary core comprises a step of splitting the downstream split assemblage into:
the first split assembly, and
the temporary core.
Accordingly, advantageously H1'=D1'.

In a second variant of the first version of the second embodiment in which the temporary core is separated with the second split assembly, the step of separating the upstream split assemblage between the first split assembly, the second split assembly and the temporary core comprises:
a step of separating the upstream split assemblage between:
a downstream split assemblage comprising at least two layers comprising an inner layer H1 composed of H1'≥1 metallic filamentary element(s) helically wound around the temporary core, and an outer layer H2 composed of H2'≥1 metallic filamentary element(s) helically wound around the inner layer H1, the H1' metallic filamentary element(s) being derived from the inner layer G1 composed of G1'>1 metallic filamentary elements of the upstream split assemblage and the H2' metallic filamentary element(s) being derived from the outer layer G2 composed of G2'>1 metallic filamentary elements of the upstream split assemblage, and
the first split assembly, and
a step of separating the downstream split assemblage between:
the second split assembly, and
the temporary core.

Accordingly, in the second variant of the first version of the second embodiment, advantageously G1'=H1'+D1', G2'≥G2', H1'=E1' and H2'=E2'.

In this second variant, the downstream split assemblage comprises in the inner layer H1 composed of the H1' metallic filamentary element(s), the outer layer H2 composed of H2' metallic filamentary element(s) helically wound around the inner layer H1, and the temporary core, the H1' metallic filamentary element(s) being helically wound around the temporary core. Preferably, in an embodiment permitting the production of a final assembly composed of two layers of metallic filamentary elements, the downstream split assemblage is composed of the inner layer H1 composed of the H1' metallic filamentary element(s), the outer layer H2 composed of the H2' metallic filamentary element(s) helically wound around the inner layer H1, and the temporary core, the H1' metallic filamentary element(s) being helically wound around the temporary core.

In this second variant, the step of separating the upstream split assemblage between the downstream split assemblage and the first split assembly takes place upstream of the step of separating the downstream split assemblage between the second split assembly and the temporary core.

Advantageously, in this second variant, the step of separating the upstream split assemblage between the downstream split assemblage and the first split assembly comprises a step of splitting the upstream split assemblage into:
the downstream split assemblage, and
the first split assembly.
Accordingly, advantageously G1'=H1'+D1', G2'=H2'.

Advantageously, in this second variant, the step of separating the downstream split assemblage between the second split assembly and the temporary core comprises a step of splitting the downstream split assemblage into:
the second split assembly, and
the temporary core.
Accordingly, advantageously H1'=E1' and H2'=E2'.

In variants of a second version of the second embodiment which are compatible with the first configuration of the first, second and third split assemblies described above, the step of separating the temporary assembly between at least the first split assembly, the second split assembly, the third split assembly and the temporary core or one or more assemblages comprising the temporary core comprises:
a step of separating the temporary assembly between:
an intermediate split assemblage comprising a layer Q1 composed of Q1'>1 metallic filamentary elements helically wound around the temporary core, the Q1' metallic filamentary elements being derived from the inner layer A1 composed of A1'>1 metallic filamentary elements of the temporary assembly, and
the second split assembly,
the third split assembly, and
a step of separating the intermediate split assemblage between:
the first split assembly, and
the temporary core or one or more assemblages comprising the temporary core, preferably the temporary core.

In these variants of the second version of the first embodiment, A1'≥Q1', A2'≥E2'+F2' and Q1'≥D1'.

In these variants, the intermediate split assemblage comprises the layer Q1 composed of the Q1' metallic filamentary elements and the temporary core, the Q1' metallic filamentary elements being helically wound around the temporary core. Preferably, in an embodiment permitting the production of a final assembly composed of two layers of metallic filamentary elements, the intermediate split assemblage is composed of the layer Q1 composed of the Q1' metallic filamentary elements and the temporary core, the Q1' metallic filamentary elements being helically wound around the temporary core.

In these variants of the second version of the first embodiment, the step of separating the temporary assembly between the intermediate split assemblage, the second split assembly and the third split assembly takes place upstream of the step of separating the intermediate split assemblage between the first split assembly and the temporary core or one or more assemblages comprising the temporary core, preferably the temporary core.

Advantageously, in these variants of the second embodiment, the step of separating the intermediate split assemblage between the first split assembly and the temporary core or one or more assemblages comprising the temporary core, preferably the temporary core, comprises:
a step of separating the intermediate split assemblage between:
a first separated assemblage comprising at least one layer W1 composed of W1'≥1 helically wound metallic filamentary element(s), the W1' metallic filamentary element(s) being derived from the layer Q1 composed of the Q1' metallic filamentary elements of the intermediate split assemblage, a second separated assemblage comprising at least one layer X1 composed of X1'≥1 helically wound metallic filamentary element(s), the X1' metallic filamentary element(s) being derived from the layer Q1 composed of the Q1' metallic filamentary elements of the intermediate split assemblage, the temporary core or one or more assemblages comprising the temporary core, preferably the temporary core, a step of reassembling the first separated assemblage and the second separated assemblage to form the first split assembly.

Accordingly, advantageously Q1'≥W1'+X1' and W1'+X1'=D1'.

Preferably, in an embodiment permitting the production of a final assembly composed of two layers of metallic filamentary elements, the first separated assemblage is composed of the layer W1 composed of the W1' metallic filamentary element(s), the second derived assemblage is composed of the layer X1 composed of the X1' metallic filamentary element(s).

In these variants of the second embodiment, the step of separating the intermediate split assemblage between the first separated assemblage, the second separated assemblage, the temporary core or one or more assemblages comprising the temporary core, preferably the temporary core, takes place upstream of the step of reassembling the first separated assemblage and the second separated assemblage to form the first split assembly.

Advantageously, in these variants of the second embodiment, the step of separating the intermediate split assemblage between the first separated assemblage, the second separated assemblage and the temporary core or one or more assemblages comprising the temporary core, preferably the temporary core, comprises a step of splitting the intermediate split assemblage into the first separated assemblage, the second separated assemblage and the temporary core or one or more assemblages comprising the temporary core, preferably the temporary core.

Accordingly, in the case of a step of splitting the intermediate split assemblage into the first separated assemblage, the second separated assemblage and the temporary core, advantageously Q1'=W1'+X1'.

In a first configuration of the first and second embodiments advantageously employing the variants described above and permitting partial reassembling of the A2' metallic filamentary elements of the outer layer A2, the step of separating the temporary assembly between at least the first split assembly, the second split assembly, the third split assembly and the temporary core or one or more assemblages comprising the temporary core and the step of reassembling at least the first split assembly, the second split assembly and the third split assembly to form the final assembly are carried out such that C2'<A2'.

In variants of a first version of this first configuration which are compatible with the second configuration of the first, second and third split assemblies described above, the step of separating the temporary assembly between the upstream split assemblage and the third split assembly comprises:

a step of separating the temporary assembly between:
a precursor assemblage comprising at least one layer I2 composed of I2'>1 helically wound metallic filamentary elements, the I2' metallic filamentary elements being derived from the outer layer A2 composed of the A2' metallic filamentary elements of the temporary assembly,
the upstream split assemblage, and
a step of separating the precursor assemblage between:
a main assemblage comprising a layer J2 composed of J2'≥1 helically wound metallic filamentary element(s), the J2'≥1 metallic filamentary element(s) being derived from the layer I2 composed of the I2' metallic filamentary elements of the precursor assemblage, the main assemblage forming the third split assembly, and
a supplementary assemblage comprising a layer K2 composed of K2'≥1 helically wound metallic filamentary element(s), the K2'≥1 metallic filamentary element(s) being derived from the layer I2 composed of the I2' metallic filamentary elements of the precursor assemblage.

The main assemblage forming the third split assembly, J2'=F2'.

In these variants of the first version of the first configuration, A1'≥G1', A2'≥I2'+G2', I2'≥J2'+K2'.

Preferably, in an embodiment permitting the production of a final assembly composed of two layers of metallic filamentary elements, the precursor assemblage is composed of the layer I2 composed of the I2' helically wound metallic filamentary elements, the main assemblage is composed of the layer J2 composed of the J2' helically wound metallic filamentary element(s), and the supplementary assemblage is composed of the layer K2 composed of the K2' helically wound metallic filamentary element(s).

In these variants of the first version of this first configuration, the step of separating the temporary assembly between the upstream split assemblage and the precursor assemblage takes place upstream of the step of separating the precursor assemblage between the main assemblage forming the third split assembly and the supplementary assemblage.

Advantageously, the step of separating the temporary assembly between the upstream split assemblage and the precursor assemblage comprises a step of splitting the temporary assembly into:
the upstream split assemblage, and
the precursor assemblage.

Accordingly, advantageously A1'=G1' and A2'=I2'+G2'.

Advantageously, the step of separating the precursor assemblage between the main assemblage forming the third split assembly and the supplementary assemblage comprises a step of splitting the precursor assemblage into:
the main assemblage forming the third split assembly, and
the supplementary assemblage.

Accordingly, advantageously I2'=J2'+K2'.

In variants of a second version of this first configuration which are compatible with the first configuration of the first, second and third split assemblies described above, the step of separating the temporary assembly between at least the first split assembly, the second split assembly, the third split assembly and the temporary core or one or more assemblages comprising the temporary core comprises:

a step of separating the temporary assembly between:
a derived assemblage comprising at least one layer Z2 composed of Z2'≥1 helically wound metallic filamentary element(s), the Z2' metallic filamentary element(s) being derived from the outer layer A2 composed of the A2'>1 metallic filamentary elements of the temporary assembly,
an upstream split assemblage comprising at least two layers comprising an inner layer G1 composed of G1'>1 metallic filamentary elements helically wound around the temporary core, and an outer layer G2 composed of G2'>1 metallic filamentary elements helically wound around the inner layer G1, the G1' metallic filamentary elements being derived from the inner layer A1 composed of A1'>1 metallic filamentary elements of the temporary assembly and the G2' metallic filamentary elements being derived from the outer layer A2 composed of A2'>1 metallic filamentary elements of the temporary assembly, a step of separating the upstream split assemblage between:
  the first split assembly,
  the second split assembly,
  the third split assembly, and
  the temporary core or one or more assemblages comprising the temporary core, preferably the temporary core.

In these variants of the second version of this first configuration, A1'≥G1' and A2'≥Z2'+G2'.

In these variants, the upstream split assemblage comprises the inner layer G1 composed of the G1' metallic filamentary elements, the outer layer G2 composed of the G2' metallic filamentary elements, and the temporary core, the G1' metallic filamentary elements being helically wound around the temporary core. Preferably, in an embodiment permitting the production of a final assembly composed of two layers of metallic filamentary elements, the upstream split assemblage is composed of the inner layer G1 composed of the G1' metallic filamentary elements, the outer layer G2 composed of the G2' metallic filamentary elements and the temporary core, the G1' metallic filamentary elements being helically wound around the temporary core.

In these variants of the second version of this first configuration, the step of separating the temporary assembly between the derived assemblage and the upstream split assemblage takes place upstream of the step of separating the upstream split assemblage between the first split assembly, the second split assembly, the third split assembly and the temporary core or one or more assemblages comprising the temporary core, preferably the temporary core.

Advantageously, in these variants of the second version of this first configuration, the step of separating the temporary assembly between the derived assemblage and the upstream split assemblage comprises a step of splitting the temporary assembly into the derived assemblage and the upstream split assemblage.

Accordingly, advantageously A1'=G1' and A2'=Z2'+G2'.

Advantageously, in these variants of the second version of this first configuration, the step of separating the upstream split assemblage between the first split assembly, the second split assembly, the third split assembly and the temporary core or one or more assemblages comprising the temporary core, preferably the temporary core, comprises:

a step of separating the upstream split assemblage between:
  an intermediate split assemblage comprising at least one layer Q1 composed of Q1'>1 metallic filamentary elements helically wound around the temporary core, the Q1' metallic filamentary elements being derived from the layer G1 composed of the G1' metallic filamentary elements of the upstream split assemblage,
  the second split assembly,
  the third split assembly,
a step of separating the intermediate split assemblage between:
  the first split assembly, and
  the temporary core or one or more assemblages comprising the temporary core, preferably the temporary core.

Accordingly, advantageously, G1'≥Q1' and Q1'≥D1'.

Preferably, in an embodiment permitting the production of a final assembly composed of two layers of metallic filamentary elements, the intermediate split assemblage is composed of the layer Q1 composed of the Q1' metallic filamentary elements and the temporary core.

In these variants of the second version of this first configuration, the step of separating the upstream split assemblage between the intermediate split assemblage, the second split assembly and the third split assembly takes place upstream of the step of separating the intermediate split assemblage between the first split assemblage and the temporary core or one or more assemblages comprising the temporary core, preferably the temporary core.

Advantageously, in these variants of the second version of this first configuration, the step of separating the upstream split assemblage between the intermediate split assemblage, the second split assembly and the third split assembly comprises a step of splitting the upstream split assemblage into the intermediate split assemblage, the second split assembly and the third split assembly.

Accordingly, advantageously G1'=Q1' and G2'=E2'+F2'.

In a second configuration of the first and second embodiments advantageously employing the variants described hereinbefore and permitting total reassembling of the A2' metallic filamentary elements of the outer layer A2, the step of separating the temporary assembly between at least the first split assembly, the second split assembly, the third split assembly and the temporary core or one or more assemblages comprising the temporary core and the step of reassembling at least the first split assembly, the second split assembly and the third split assembly to form the final assembly are carried out such that C2'=A2'.

In variants of a second version of this second configuration which are compatible with the first configuration of the first, second and third split assemblies described above, the step of separating the temporary assembly between the intermediate split assemblage, the second split assembly and the third split assembly comprises a step of splitting the temporary assembly into the upstream split assemblage and the third split assembly.

In variants of a second version of this second configuration which are compatible with the first configuration of the first, second and third split assemblies described above, the step of separating the temporary assembly between the intermediate split assemblage, the second split assembly and the third split assembly comprises a step of splitting the temporary assembly into the intermediate split assemblage, the second split assembly and the third split assembly.

In a particularly preferred embodiment, the final assembly being composed of the inner layer C1 composed of C1' helically wound metallic filamentary elements and the outer layer C2 composed of C2' metallic filamentary elements helically wound around the inner layer C1, the method comprises:
  a step of providing a temporary assembly composed of an inner layer A1 composed of A1>1 metallic filamentary elements, an outer layer A2 composed of A2'>1 metallic filamentary elements helically wound around the inner layer A1, and a temporary core, the A1' metallic filamentary elements being helically wound around the temporary core,
  a step of separating the temporary assembly between at least:

a first split assembly composed of a layer D1 composed of D1'≥1 helically wound metallic filamentary element(s), the D1' metallic filamentary element(s) being derived from the inner layer A1 composed of A1'>1 metallic filamentary elements of the temporary assembly, second split assembly comprising at least one layer E2 composed of E2'≥1 helically wound metallic filamentary element(s), the E2' metallic filamentary element(s) being derived from the outer layer A2 composed of A2'>1 metallic filamentary elements of the temporary assembly, a third split assembly composed of a layer F2 composed of F2'≥1 helically wound metallic filamentary element(s), the F2' metallic filamentary element(s) being derived from the outer layer A2 composed of A2'>1 metallic filamentary elements of the temporary assembly, the temporary core or one or more assemblages comprising the temporary core, the method comprising a step of reassembling at least the first split assembly, the second split assembly and the third split assembly to form the final assembly.

In this particularly preferred embodiment, the final assembly is composed of two layers of C1' and C2' helically wound metallic filamentary elements and is therefore without a central core around which the C1' and C2' metallic filamentary elements would be wound.

Advantageously, A1' ranges from 2 to 10 and A2' ranges from 6 to 20.

Very preferably, the step of providing the temporary assembly comprises a step of assembling by twisting the A1' metallic filamentary elements helically wound around the temporary core and a step of assembling by twisting the A2' metallic filamentary elements helically wound around the inner layer A1.

Advantageously, the step of providing the temporary assembly comprises a step of balancing the temporary assembly. Accordingly, the step of balancing being carried out on the temporary assembly comprising the A1', A2' metallic filamentary elements and the temporary core, the step of balancing is implicitly carried out upstream of the step of separating the first, second and third split assemblies. The necessity of managing the residual twist imposed during the step of assembling the temporary assembly during the passage of the various assemblies downstream of the step of assembling, especially in the guide means, for example the pulleys, is avoided.

Advantageously, the method comprises a step of balancing the final assembly downstream of the step of reassembling.

Advantageously, the method comprises a step of maintaining the rotation of the final assembly about its direction of advance. This step of maintaining the rotation is carried out downstream of the step of separating the temporary assembly and upstream of the step of balancing the final assembly.

Preferably, the method does not comprise steps of individually preforming each of the metallic filamentary elements. In the methods of the prior art which use a step of individually preforming each of the metallic filamentary elements, the latter are provided with a shape by preforming tools, for example rollers, these tools creating defects on the surface of the metallic filamentary elements. These defects notably reduce the endurance of the metallic filamentary elements and therefore of the final assembly.

Very preferably, the temporary core is a metallic filamentary element. In a preferred embodiment, the temporary core is a metallic monofilament. The diameter of the space between the metallic filamentary elements, and therefore the geometrical characteristics of the final assembly, are accordingly controlled very precisely, in contrast to a temporary core made of a textile material, for example a polymer material, the compressibility of which can cause variations in the geometrical characteristics of the final assembly.

In other embodiments which are likewise advantageous, the temporary core is a textile filamentary element. Such a textile filamentary element comprises at least one multifilament textile ply or, in a variant, is composed of a textile monofilament. The textile filaments which can be used are chosen from among the polyesters, the polyketones, the aliphatic or aromatic polyamides and mixtures of textile filaments of these materials. Accordingly, the risks of breakage of the temporary core which are caused by friction of the metallic filamentary elements on the temporary core and by the twist imparted to the temporary core are reduced.

The invention also provides a final assembly comprising at least two layers comprising an inner layer C1 composed of C1'>1 helically wound metallic filamentary elements (14) and an outer layer C2 composed of C2'>1 metallic filamentary elements helically wound around the inner layer, which final assembly is obtained by the method as defined above and wherein each metallic filamentary element of each inner layer C1 and outer layer C2 is devoid of preforming marks.

The invention also provides a tyre comprising a final assembly as defined above.

Such a tyre is especially to equip motor vehicles of the type passenger vehicle, SUV (sport utility vehicles), two-wheeled vehicles (especially bicycles, scooters), aircraft, such as industrial vehicles chosen from vans, "heavy goods vehicles"—that is to say metro, buses, heavy road transport vehicles (lorries, tractors, trailers), off-road vehicles such as agricultural vehicles or civil engineering vehicles—, other transport or handling vehicles.

Advantageously, the tyre comprises a crown comprising a tread and a crown reinforcement, the tyre comprising two sidewalls, two beads, each sidewall connecting each bead to the crown, the crown reinforcement extending in the crown in a circumferential direction of the tyre, the tyre comprising a carcass reinforcement anchored in each of the beads and extending in the sidewalls and in the crown, the crown reinforcement being radially interposed between the carcass reinforcement and the tread. In one embodiment, the crown reinforcement comprises a final assembly as defined above.

The invention also provides an installation for producing a final assembly comprising at least two layers comprising an inner layer C1 composed of C1'>1 helically wound metallic filamentary elements and an outer layer C2 composed of C2'>1 metallic filamentary elements helically wound around the inner layer C1. The installation comprises:

means for providing a temporary assembly comprising at least two layers comprising an inner layer A1 composed of A1>1 metallic filamentary elements helically wound around a temporary core and an outer layer A2 composed of A2'>1 metallic filamentary elements helically wound around the inner layer A1, means for separating the temporary assembly between at least:

a first split assembly comprising at least one layer D1 composed of D1'≥1 helically wound metallic filamentary element(s), the D1' metallic filamentary element(s) being derived from the inner layer A1 composed of A1'>1 metallic filamentary elements of the temporary assembly, a second split assembly comprising at least one layer comprising a layer E2 composed of E2'≥1 helically wound metallic filamentary element(s), the E2' metallic filamentary element(s) being derived from the outer layer A2 composed of A2'>1 metallic filamentary elements of the temporary assembly, a third split assembly comprising at least one layer F2 composed of F2'≥1 helically wound metallic filamentary element(s), the F2' metallic filamentary element(s) being derived from the outer layer A2 composed of A2'>1 metallic filamentary elements of the temporary assembly, the temporary core or one or more assemblages comprising the temporary core.

The installation according to the invention also comprises means for reassembling at least the first split assembly, the second split assembly and the third split assembly to form the final assembly. In a manner analogous to the method described above, the means for separating and the means for reassembling are arranged such that C1' and C2'.

In the present invention, means for splitting an initial object into a plurality of final objects mean that, by employing these means for splitting, the initial object is divided into the final objects and only these final objects, such that the initial object is found in totality in the final objects. Moreover, by using the means for splitting, the initial object is divided into the final objects simultaneously, that is to say the final objects are separated at the same splitting point. In particular, in the case of an initial object split into at least three final objects, the three final objects, by using the means for splitting, are separated simultaneously and at the same point.

In the present invention, means for separating an initial object between a plurality of final objects mean that, in order to obtain these final objects, at least means for splitting are necessary. Accordingly, in order to obtain the final objects, the means for separating comprise means for splitting the initial object into the final objects or comprise means for splitting the initial object into intermediate objects and means for splitting the intermediate objects into the final objects. Using the means for separating, the initial object is not necessarily found in totality in the final objects, it being possible that assemblages or assemblies have been removed from the method during their passage through the means for splitting and have not been used during their passage through subsequent means for splitting. Finally, means for separating can comprise means for reassembling a plurality of intermediate objects obtained from means for splitting of the means for separating in order to obtain other intermediate objects or the final objects.

In an embodiment in which the means for reassembling to form the final assembly are arranged in succession from upstream to downstream, the means for reassembling comprise, from upstream to downstream:

upstream means for reassembling one of the first, second and third split assemblies with another of the first, second and third split assemblies to form a downstream temporary assembly, downstream means for reassembling the downstream temporary assembly with the remaining assembly from among the first, second and third split assemblies to form the final assembly.

In a first variant of the embodiment in which the means for reassembling to form the final assembly starting from the split assemblies of the first and fifth configurations described above are arranged in succession from upstream to downstream, the means for reassembling comprise, from upstream to downstream:

upstream means for reassembling the first split assembly with the second split assembly to form a downstream temporary assembly, downstream means for reassembling the downstream temporary assembly with the third split assembly to form the final assembly. or upstream means for reassembling the first split assembly with the third split assembly to form a downstream temporary assembly, downstream means for reassembling the downstream temporary assembly with the second split assembly to form the final assembly.

In a second variant of the embodiment in which the means for reassembling to form the final assembly starting from the split assemblies of the second and sixth configurations described above are arranged in succession from upstream to downstream, the means for reassembling comprise, from upstream to downstream:

upstream means for reassembling the first split assembly with the second split assembly to form a downstream temporary assembly, downstream means for reassembling the downstream temporary assembly with the third split assembly to form the final assembly.

In a third variant of the embodiment in which the means for reassembling to form the final assembly starting from the split assemblies of the third and seventh configurations described above are arranged in succession from upstream to downstream, the means for reassembling comprise, from upstream to downstream:

upstream means for reassembling the first split assembly with the third split assembly to form a downstream temporary assembly, downstream means for reassembling the downstream temporary assembly with the second split assembly to form the final assembly.

In a fourth variant of the embodiment in which the means for reassembling to form the final assembly starting from the split assemblies of the fourth and eighth configurations described above are arranged in succession from upstream to downstream, the means for reassembling comprise, from upstream to downstream:

upstream means for reassembling the first split assembly with the second split assembly to form a downstream temporary assembly, downstream means for reassembling the downstream temporary assembly with the third split assembly to form the final assembly. or upstream means for reassembling the first split assembly with the third split assembly to form a downstream temporary assembly, downstream means for reassembling the downstream temporary assembly with the second split assembly to form the final assembly.

In another embodiment, the means for reassembling comprise means for simultaneously reassembling the first, second and third split assemblies to form the final assembly.

In a first embodiment permitting partial reassembling of the A1' metallic filamentary elements of the inner layer A1, the means for separating the temporary assembly between at least the first split assembly, the second split assembly, the third split assembly and the temporary core or one or more assemblages comprising the temporary core and the means for reassembling the first split assembly, the second split assembly and the third split assembly to form the final assembly are arranged such that C1'<A1' and C2'≤A2'.

In variants of a first version of the first embodiment which are compatible with the second configuration of the first, second and third split assemblies described above, the means for separating the temporary assembly between at least the first split assembly, the second split assembly, the third split assembly and the temporary core or one or more assemblages comprising the temporary core comprise:

means for separating the temporary assembly between:
an upstream split assemblage comprising at least two layers comprising an inner layer G1 composed of G1'≥1 metallic filamentary element(s) helically wound around the temporary core and an outer layer G2 composed of G2'≥1 metallic filamentary element(s) helically wound around the inner layer G1, the G1' metallic filamentary element(s) being derived from the inner layer A1 composed of A1'>1 metallic filamentary elements of the temporary assembly and the G2' metallic filamentary element(s) being derived from the outer layer A2 composed of A2'>1 metallic filamentary elements of the temporary assembly, and
the third split assembly, and
means for separating the upstream split assemblage between:
the first split assembly,
the second split assembly, and
the temporary core or one or more assemblages comprising the temporary core, preferably the temporary core.

In these variants of the first version of the first embodiment, the means for separating the temporary assembly between the upstream split assemblage and the third split assembly are arranged upstream of the means for separating the upstream split assemblage between the first split assembly, the second split assembly and the temporary core or one or more assemblages comprising the temporary core, preferably the temporary core.

Advantageously, in these first and second variants of the first version of the first embodiment, the means for separating the upstream split assemblage between the first split assembly, the second split assembly and the temporary core or one or more assemblages comprising the temporary core, preferably the temporary core, comprise:

means for separating the upstream split assemblage between:
a precursor assemblage comprising at least one layer I1 composed of I1'>1 helically wound metallic filamentary elements, the I1' metallic filamentary elements being derived from the inner layer GI composed of the GI' metallic filamentary elements of the upstream split assemblage,
the second split assembly,
the temporary core or one or more assemblages comprising the temporary core, preferably the temporary core, and
means for separating the precursor assemblage between:
a main assemblage comprising at least one layer J1 composed of J1'≥1 helically wound metallic filamentary element(s), the J1'≥1 metallic filamentary element(s) being derived from the layer I1 composed of the I1'>1 metallic filamentary elements of the precursor assemblage, the main assemblage forming the first split assembly, and
a supplementary assemblage comprising at least one layer K1 composed of K1'≥1 helically wound metallic filamentary element(s), the K1'≥1 metallic filamentary element(s) being derived from the layer I1 composed of the I1'>1 metallic filamentary elements of the precursor assemblage.

In these variants of the first version of the first embodiment, the means for separating the upstream split assemblage between the precursor assemblage, the second split assembly and the temporary core or one or more assemblages comprising the temporary core, preferably the temporary core, are arranged upstream of the means for separating the precursor assemblage between the main assemblage forming the first split assembly and the supplementary assemblage.

Advantageously, the means for separating the precursor assemblage between the main assemblage forming the first split assembly and the supplementary assemblage comprise means for splitting the precursor assemblage into:
the main assemblage forming the first split assembly, and
the supplementary assemblage.

In a first variant of the first version of the first embodiment in which the temporary core is separated with the first split assembly, the means for separating the upstream split assemblage between the precursor assemblage, the second split assembly and the temporary core or one or more assemblages comprising the temporary core, preferably the temporary core, comprise:
ans for separating the upstream split assemblage between:
a downstream split assemblage comprising at least one layer H1 composed of H1'≥1 metallic filamentary element(s) helically wound around the temporary core, the H1' metallic filamentary element(s) being derived from the inner layer G1 composed of the G1' metallic filamentary elements of the upstream split assemblage,
the second split assembly, and
means for separating the downstream split assemblage between:
the precursor assemblage, and
the temporary core or one or more assemblages comprising the temporary core, preferably the temporary core.

In this first variant, the means for separating the upstream split assemblage between the downstream split assemblage and the second split assembly are arranged upstream of the means for separating the downstream split assemblage between the precursor assemblage and the temporary core or one or more assemblages comprising the temporary core, preferably the temporary core.

Advantageously, in this first variant, the means for separating the upstream split assemblage between the downstream split assemblage and the second split assembly comprise means for splitting the upstream split assemblage into:
the downstream split assemblage, and
the second split assembly.

Advantageously, in this first variant, the means for separating the downstream split assemblage between the precursor assemblage and the temporary core or one or more assemblages comprising the temporary core, preferably the temporary core, comprise means for splitting the downstream split assemblage into:
the precursor assemblage, and
the temporary core or one or more assemblages comprising the temporary core, preferably the temporary core.

In a second variant of the first version of the first embodiment in which the temporary core is separated with the second split assembly, the means for separating the upstream split assemblage between the precursor assemblage, the second split assembly and the temporary core or one or more assemblages comprising the temporary core, preferably the temporary core, comprise:
means for separating the upstream split assemblage between:

a downstream split assemblage comprising at least two layers comprising an inner layer H1 composed of H1'≥1 metallic filamentary element(s) helically wound around the temporary core, and an outer layer H2 composed of H2'≥1 metallic filamentary element(s) helically wound around the inner layer H1, the H1' metallic filamentary element(s) being derived from the inner layer G1 composed of G1'>1 metallic filamentary elements of the upstream split assemblage and the H2' metallic filamentary element(s) being derived from the outer layer G2 composed of G2'>1 metallic filamentary elements of the upstream split assemblage, and the precursor assemblage, and means for separating the downstream split assemblage between:

the second split assembly, and the temporary core or one or more assemblages comprising the temporary core, preferably the temporary core.

In this second variant, the means for separating the upstream split assemblage between the downstream split assemblage and the precursor assemblage are arranged upstream of the means for separating the downstream split assemblage between the second split assembly and the temporary core or one or more assemblages comprising the temporary core, preferably the temporary core.

Advantageously, in this second variant, the means for separating the upstream split assemblage between the downstream split assemblage and the precursor assemblage comprise means for splitting the upstream split assemblage into:

the downstream split assemblage, and the precursor assemblage.

Advantageously, in this second variant, the means for separating the downstream split assemblage between the second split assembly and the temporary core or one or more assemblages comprising the temporary core, preferably the temporary core, comprise means for splitting the downstream split assemblage into:

the second split assembly, and the temporary core or one or more assemblages comprising the temporary core, preferably the temporary core.

In variants of a second version of the first embodiment which are compatible with the first configuration of the first, second and third split assemblies described above, the means for separating the temporary assembly between at least the first split assembly, the second split assembly, the third split assembly and the temporary core or one or more assemblages comprising the temporary core comprise:

means for separating the temporary assembly between:

an intermediate split assemblage comprising a layer Q1 composed of Q1'>1 metallic filamentary elements helically wound around the temporary core, the Q1' metallic filamentary elements being derived from the inner layer A1 composed of A1'>1 metallic filamentary elements of the temporary assembly, and the second split assembly, the third split assembly, and means for separating the intermediate split assemblage between:

a derived assemblage comprising at least one layer Z1 composed of Z1'≥1 helically wound metallic filamentary element(s), the Z1' metallic filamentary element(s) being derived from the inner layer Q1 composed of the Q1'>1 metallic filamentary elements of the intermediate split assemblage, the first split assembly, and the temporary core or one or more assemblages comprising the temporary core, preferably the temporary core.

In these variants of the second version of the first embodiment, the means for separating the temporary assembly between the intermediate split assemblage, the second split assembly and the third split assembly are arranged upstream of the means for separating the intermediate split assemblage between the derived assemblage, the first split assembly and the temporary core or one or more assemblages comprising the temporary core, preferably the temporary core.

Advantageously, in these variants of the first embodiment, the means for separating the intermediate split assemblage between the derived assemblage, the first split assembly and the temporary core or one or more assemblages comprising the temporary core, preferably the temporary core, comprise:

means for separating the intermediate split assemblage between:

a first separated assemblage comprising at least one layer W1 composed of W1'≥1 helically wound metallic filamentary element(s), the W1' metallic filamentary element(s) being derived from the layer Q1 composed of the Q1' metallic filamentary elements of the intermediate split assemblage, a second separated assemblage comprising at least one layer X1 composed of X1'≥1 helically wound metallic filamentary element(s), the X1' metallic filamentary element(s) being derived from the layer Q1 composed of the Q1' metallic filamentary elements of the intermediate split assemblage, the derived assemblage, the temporary core or one or more assemblages comprising the temporary core, preferably the temporary core, means for reassembling the first separated assemblage and the second separated assemblage to form the first split assembly.

In these variants of the first embodiment, the means for separating the intermediate split assemblage between the first separated assemblage, the second separated assemblage, the derived assemblage, the temporary core or one or more assemblages comprising the temporary core, preferably the temporary core, are arranged upstream of the means for reassembling the first separated assemblage and the second separated assemblage to form the first split assembly.

In these variants of the second version of the first embodiment, according to a first option which employs successive means for separating, the means for separating the intermediate split assemblage between the first separated assemblage, the second separated assemblage, the derived assemblage, the temporary core or one or more assemblages comprising the temporary core, preferably the temporary core, comprise:

means for separating the intermediate split assemblage between:

the derived assemblage, and a downstream split assemblage comprising a layer H1 composed of H1'≥1 metallic filamentary element(s) helically wound around the temporary core, the H1' metallic filamentary element(s) being derived from the layer Q1 composed of the Q1'>1 metallic filamentary elements of the intermediate split assemblage, means for separating the downstream split assemblage between:

the first separated assemblage, the second separated assemblage, the temporary core or one or more assemblages comprising the temporary core, preferably the temporary core.

In these variants of the first embodiment, the means for separating the intermediate split assemblage between the derived assemblage and the downstream split assemblage are arranged upstream of the means for separating the downstream split assemblage between the first separated assemblage, the second separated assemblage and the temporary core or one or more assemblages comprising the temporary core, preferably the temporary core.

Advantageously, in this first option, the means for separating the intermediate split assemblage between the derived assemblage and the downstream split assemblage comprise means for splitting the intermediate split assemblage into the derived assemblage and the downstream split assemblage.

Advantageously, in this first option, the means for separating the downstream split assemblage between the first separated assemblage, the second separated assemblage and the temporary core or one or more assemblages comprising the temporary core, preferably the temporary core, comprise means for splitting the downstream split assemblage into the first separated assemblage, the second separated assemblage and the temporary core or one or more assemblages comprising the temporary core, preferably the temporary core.

In these variants of the second version of the first embodiment, according to a second option, the means for separating the intermediate split assemblage between the first separated assemblage, the second separated assemblage, the derived assemblage, the temporary core or one or more assemblages comprising the temporary core, preferably the temporary core, comprise means for splitting the intermediate split assemblage into the first separated assemblage, the second separated assemblage, the derived assemblage, the temporary core or one or more assemblages comprising the temporary core, preferably the temporary core.

In a second embodiment permitting total reassembling of the A1' metallic filamentary elements of the inner layer A1, the means for separating the temporary assembly between at least the first split assembly, the second split assembly, the third split assembly and the temporary core or one or more assemblages comprising the temporary core and the means for reassembling the first split assembly, the second split assembly and the third split assembly to form the final assembly are arranged such that C1'=A1' and C2'≤A2'.

In variants of a first version of the second embodiment which are compatible with the second configuration of the first, second and third split assemblies described above, the means for separating the temporary assembly between at least the first split assembly, the second split assembly, the third split assembly and the temporary core or one or more assemblages comprising the temporary core comprise:

means for separating the temporary assembly between:
an upstream split assemblage comprising at least two layers comprising an inner layer G1 composed of G1'≥1 metallic filamentary element(s) helically wound around the temporary core and an outer layer G2 composed of G2'≥1 metallic filamentary element(s) helically wound around the inner layer G1, the G1' metallic filamentary element(s) being derived from the inner layer A1 composed of A1'>1 metallic filamentary elements of the temporary assembly and the G2' metallic filamentary element(s) being derived from the outer layer A2 composed of A2'>1 metallic filamentary elements of the temporary assembly, and
the third split assembly, and
means for separating the upstream split assemblage between:
the first split assembly,
the second split assembly, and
the temporary core.

In these variants of the first version of the second embodiment, the means for separating the temporary assembly between the upstream split assemblage and the third split assembly are arranged upstream of the means for separating the upstream split assemblage between the first split assembly, the second split assembly and the temporary core or one or more assemblages comprising the temporary core, preferably the temporary core.

In a first variant of the first version of the second embodiment in which the temporary core is separated with the first split assembly, the means for separating the upstream split assemblage between the first split assembly, the second split assembly and the temporary core comprise:

means for separating the upstream split assemblage between:
a downstream split assemblage comprising at least one layer H1 composed of H1'≥1 metallic filamentary element(s) helically wound around the temporary core, the H1' metallic filamentary element(s) being derived from the inner layer G1 composed of the G1' metallic filamentary elements of the upstream split assemblage,
the second split assembly, and
means for separating the downstream split assemblage between:
the first split assembly, and
the temporary core.

In this first variant of the first version of the second embodiment, the means for separating the upstream split assemblage between the downstream split assemblage and the second split assembly are arranged upstream of the means for separating the downstream split assemblage between the first split assembly and the temporary core.

Advantageously, the means for separating the upstream split assemblage between the downstream split assemblage and the second split assembly comprise means for splitting the upstream split assemblage into:
the downstream split assemblage, and
the second split assembly.

Advantageously, the means for separating the downstream split assemblage between the first split assembly and the temporary core comprise means for splitting the downstream split assemblage into:
the first split assembly, and
the temporary core.

In a second variant of the first version of the second embodiment in which the temporary core is separated with the second split assembly, the means for separating the upstream split assemblage between the first split assembly, the second split assembly and the temporary core comprise:

means for separating the upstream split assemblage between:
a downstream split assemblage comprising at least two layers comprising an inner layer H1 composed of H1'≥1 metallic filamentary element(s) helically wound around the temporary core, and an outer layer H2 composed of H2'≥1 metallic filamentary element(s) helically wound around the inner layer H1, the H1' metallic filamentary element(s) being derived from the inner layer G1 composed of G1'>1 metallic filamentary elements of the upstream split assemblage and the H2' metallic filamentary element(s) being derived from the outer layer G2 composed of G2'>1 metallic filamentary elements of the upstream split assemblage, and
the first split assembly, and
means for separating the downstream split assemblage between:
the second split assembly, and
the temporary core.

In this second variant, the means for separating the upstream split assemblage between the downstream split assemblage and the first split assembly are arranged upstream of the means for separating the downstream split assemblage between the second split assembly and the temporary core.

Advantageously, in this second variant, the means for separating the upstream split assemblage between the downstream split assemblage and the first split assembly comprise means for splitting the upstream split assemblage into:
the downstream split assemblage, and
the first split assembly.

Advantageously, in this second variant, the means for separating the downstream split assemblage between the second split assembly and the temporary core comprise means for splitting the downstream split assemblage into:
the second split assembly, and
the temporary core.

In variants of a second version of the second embodiment which are compatible with the first configuration of the first, second and third split assemblies described above, the means for separating the temporary assembly between at least the first split assembly, the second split assembly, the third split assembly and the temporary core or one or more assemblages comprising the temporary core comprise:
means for separating the temporary assembly between:
an intermediate split assemblage comprising a layer Q1 composed of Q1'>1 metallic filamentary elements helically wound around the temporary core, the Q1' metallic filamentary elements being derived from the inner layer A1 composed of A1'>1 metallic filamentary elements of the temporary assembly, and
the second split assembly,
the third split assembly, and
means for separating the intermediate split assemblage between:
the first split assembly, and
the temporary core or one or more assemblages comprising the temporary core, preferably the temporary core.

In these variants of the second version of the first embodiment, the means for separating the temporary assembly between the intermediate split assemblage, the second split assembly and the third split assembly are arranged upstream of the means for separating the intermediate split assemblage between the first split assembly and the temporary core or one or more assemblages comprising the temporary core, preferably the temporary core.

Advantageously, in these variants of the first embodiment, the means for separating the intermediate split assemblage between the first split assembly and the temporary core or one or more assemblages comprising the temporary core, preferably the temporary core, comprise:
means for separating the intermediate split assemblage between:
a first separated assemblage comprising at least one layer W1 composed of W1'≥1 helically wound metallic filamentary element(s), the W1' metallic filamentary element(s) being derived from the layer Q1 composed of the Q1' metallic filamentary elements of the intermediate split assemblage,
a second separated assemblage comprising at least one layer X1 composed of X1'≥1 helically wound metallic filamentary element(s), the X1' metallic filamentary element(s) being derived from the layer Q1 composed of the Q1' metallic filamentary elements of the intermediate split assemblage,
the temporary core or one or more assemblages comprising the temporary core, preferably the temporary core,
means for reassembling the first separated assemblage and the second separated assemblage to form the first split assembly.

In these variants of the first embodiment, the means for separating the intermediate split assemblage between the first separated assemblage, the second separated assemblage, the temporary core or one or more assemblages comprising the temporary core, preferably the temporary core, are arranged upstream of the means for reassembling the first separated assemblage and the second separated assemblage to form the first split assembly.

Advantageously, in these variants of the first embodiment, the means for separating the intermediate split assemblage between the first separated assemblage, the second separated assemblage and the temporary core or one or more assemblages comprising the temporary core, preferably the temporary core, comprise means for splitting the intermediate split assemblage into the first separated assemblage, the second separated assemblage and the temporary core or one or more assemblages comprising the temporary core, preferably the temporary core.

In a first configuration of the first and second embodiments advantageously employing the variants described hereinbefore and permitting partial reassembling of the A2' metallic filamentary elements of the outer layer A2, the means for separating the temporary assembly between at least the first split assembly, the second split assembly, the third split assembly and the temporary core or one or more assemblages comprising the temporary core and the means for reassembling the first split assembly, the second split assembly and the third split assembly to form the final assembly are arranged such that C2'<A2'.

In variants of a first version of this first configuration which are compatible with the second configuration of the first, second and third split assemblies described above, the means for separating the temporary assembly between the upstream split assemblage and the third split assembly comprise:
means for separating the temporary assembly between:
a precursor assemblage comprising at least one layer I2 composed of I2'>1 helically wound metallic filamentary elements, the 12' metallic filamentary elements being derived from the outer layer A2 composed of the A2' metallic filamentary elements of the temporary assembly,
the upstream split assemblage, and
means for separating the precursor assemblage between:
a main assemblage comprising a layer J2 composed of J2'≥1 helically wound metallic filamentary element(s), the J2'≥1 metallic filamentary element(s) being derived from the layer I2 composed of the 12' metallic filamentary elements of the precursor assemblage, the main assemblage forming the third split assembly, and
a supplementary assemblage comprising a layer K2 composed of K2'≥1 helically wound metallic filamentary element(s), the K2'≥1 metallic filamentary element(s) being derived from the layer I2 composed of the I2' metallic filamentary elements of the precursor assemblage.

In these variants of the first version of this first configuration, the means for separating the temporary assembly between the upstream split assemblage and the precursor assemblage are arranged upstream of the means for separating the precursor assemblage between the main assemblage forming the third split assembly and the supplementary assemblage.

Advantageously, the means for separating the temporary assembly between the upstream split assemblage and the precursor assemblage comprise means for splitting the temporary assembly into:
- the upstream split assemblage, and
- the precursor assemblage.

Advantageously, the means for separating the precursor assemblage between the main assemblage forming the third split assembly and the supplementary assemblage comprise means for splitting the precursor assemblage into:
- the main assemblage forming the third split assembly, and
- the supplementary assemblage.

In variants of a second version of this first configuration which are compatible with the first configuration of the first, second and third split assemblies described above, the means for separating the temporary assembly between at least the first split assembly, the second split assembly, the third split assembly and the temporary core or one or more assemblages comprising the temporary core comprise:
- means for separating the temporary assembly between:
  - a derived assemblage comprising at least one layer Z2 composed of $Z2' \geq 1$ helically wound metallic filamentary element(s), the $Z2'$ metallic filamentary element(s) being derived from the outer layer A2 composed of the $A2'>1$ metallic filamentary elements of the temporary assembly,
  - an upstream split assemblage comprising at least two layers comprising an inner layer G1 composed of $G1'>1$ metallic filamentary elements helically wound around the temporary core, and an outer layer G2 composed of $G2'>1$ metallic filamentary elements helically wound around the inner layer G1, the $G1'$ metallic filamentary elements being derived from the inner layer A1 composed of $A1'>1$ metallic filamentary elements of the temporary assembly and the $G2'$ metallic filamentary elements being derived from the outer layer A2 composed of $A2'>1$ metallic filamentary elements of the temporary assembly,
- means for separating the upstream split assemblage between:
  - the first split assembly,
  - the second split assembly,
  - the third split assembly, and
  - the temporary core or one or more assemblages comprising the temporary core, preferably the temporary core.

In these variants of the second version of this first configuration, the means for separating the temporary assembly between the derived assemblage and the upstream split assemblage are arranged upstream of the means for separating the upstream split assemblage between the first split assembly, the second split assembly, the third split assembly and the temporary core or one or more assemblages comprising the temporary core, preferably the temporary core.

Advantageously, in these variants of the second version of this first configuration, the means for separating the temporary assembly between the derived assemblage and the upstream split assemblage comprise means for splitting the temporary assembly into the derived assemblage and the upstream split assemblage.

Advantageously, in these variants of the second version of this first configuration, the means for separating the upstream split assemblage between the first split assembly, the second split assembly, the third split assembly and the temporary core or one or more assemblages comprising the temporary core, preferably the temporary core, comprise:
- means for separating the upstream split assemblage between:
  - an intermediate split assemblage comprising at least one layer Q1 composed of $Q1'>1$ metallic filamentary elements helically wound around the temporary core, the $Q1'$ metallic filamentary elements being derived from the layer G1 composed of the $G1'$ metallic filamentary elements of the upstream split assemblage,
  - the second split assembly,
  - the third split assembly,
- means for separating the intermediate split assemblage between:
  - the first split assembly, and
  - the temporary core or one or more assemblages comprising the temporary core, preferably the temporary core.

In these variants of the second version of this first configuration, the means for separating the upstream split assemblage between the intermediate split assemblage, the second split assembly and the third split assembly are arranged upstream of the means for separating the intermediate split assemblage between the first split assemblage and the temporary core or one or more assemblages comprising the temporary core, preferably the temporary core.

Advantageously, in these variants of the second version of this first configuration, the means for separating the upstream split assemblage between the intermediate split assemblage, the second split assembly and the third split assembly comprise means for splitting the upstream split assemblage into the intermediate split assemblage, the second split assembly and the third split assembly.

In a second configuration of the first and second embodiments advantageously employing the variants described above and permitting total reassembling of the $A2'$ metallic filamentary elements of the outer layer A2, the means for separating the temporary assembly between at least the first split assembly, the second split assembly, the third split assembly and the temporary core or one or more assemblages comprising the temporary core and the means for reassembling the first split assembly, the second split assembly and the third split assembly to form the final assembly are arranged such that $C2'=A2'$.

In variants of a first version of this second configuration which are compatible with the second configuration of the first, second and third split assemblies described above, the means for separating the temporary assembly between the upstream split assemblage and the third split assembly comprise means for splitting the temporary assembly into the upstream split assemblage and the third split assembly.

In variants of a second version of this second configuration which are compatible with the first configuration of the first, second and third split assemblies described above, the means for separating the temporary assembly between the intermediate split assemblage, the second split assembly and the third split assembly comprise means for splitting the temporary assembly into the intermediate split assemblage, the second split assembly and the third split assembly.

Very preferably, the means for providing the temporary assembly comprise means for assembling by twisting the $A1'$ metallic filamentary elements helically wound around the temporary core and means for assembling by twisting the $A2'$ metallic filamentary elements helically wound around the inner layer C1.

Advantageously, the means for providing the temporary assembly comprise means for balancing the temporary assembly.

The invention will be understood better on reading the following description, which is given purely by way of non-limiting example and with reference to the drawings, in which.

INSTALLATION AND METHOD ACCORDING TO A FIRST EMBODIMENT OF THE INVENTION

Figure 1:
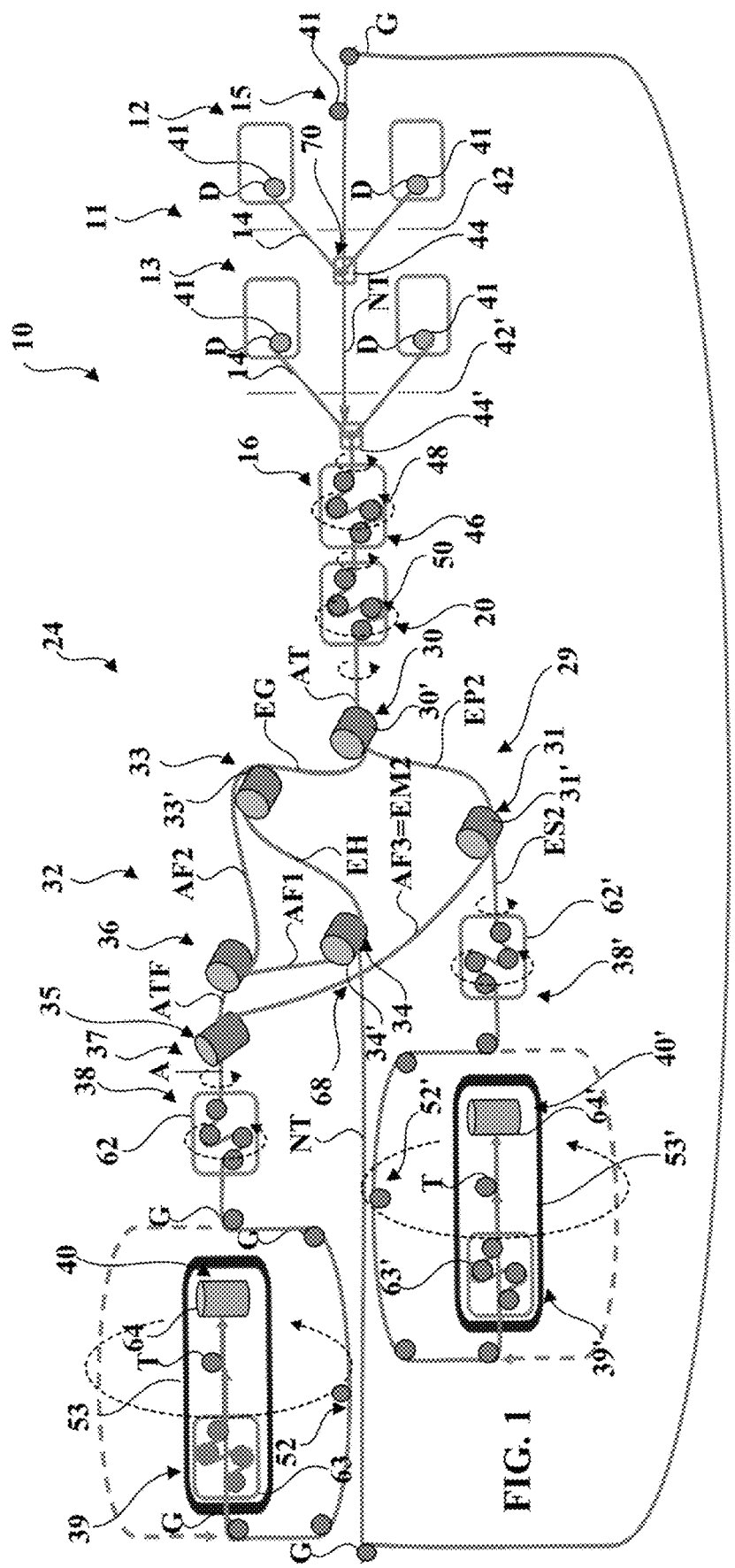
FIG. 1 is a diagram of an installation according to a first embodiment of the invention allowing a method according to a first embodiment of the invention to be implemented and the cable of FIG. 14 to be produced.
Figure 14:
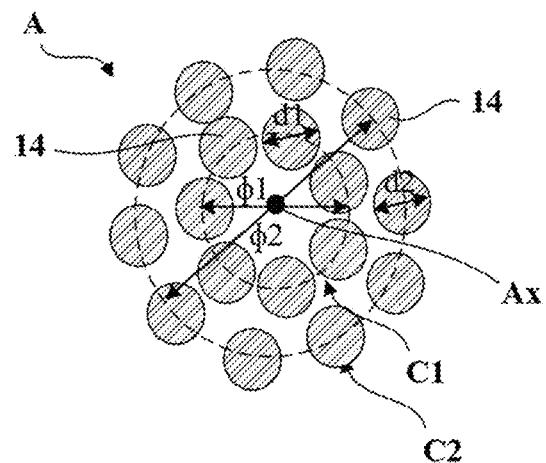
FIG. 14 is a view in section perpendicular to the axis of the assembly (assumed to be linear and at rest) of a final assembly derived from the reassembling of the downstream temporary assembly of FIG. 13 and the third split assembly of FIG. 11.

FIG. 1 shows an installation for producing a final assembly A comprising at least two layers and here comprising an inner layer C1 composed of C1'>1 helically wound metallic filamentary elements 14 and an outer layer C2 composed of C2'>1 metallic filamentary elements 14 helically wound around the inner layer C1. In the present case, the final assembly A, shown in FIG. 14, is composed of the two layers C1, C2 with C1'=7 and C2'=10. Accordingly, the final assembly A is composed of the layers C1 and C2, in other words the final assembly A does not comprise any metallic filamentary element other than those of the layers C1 and C2. The final assembly A has a main axis Ax extending substantially parallel to the direction in which the final assembly A extends along its greatest length. Each metallic filamentary element 14 of each layer C1, C2 describes, when the final assembly A extends in a substantially linear direction, a helical trajectory around the main axis Ax substantially parallel to the substantially linear direction, such that, in a section plane substantially perpendicular to the main axis Ax, the distance between the centre of each metallic filamentary element 14 of the inner layer C1 and the main axis Ax is substantially constant and equal for all the metallic filamentary elements 14 of the inner layer C1 and between each metallic filamentary element 14 of the outer layer C2 and the main axis Ax is substantially constant and equal for all the metallic filamentary elements 14 of the outer layer C2. This constant distance between the centre of each metallic filamentary element 14 of each layer C1, C2 and the main axis Ax is equal to half of each helix diameter of each metallic filamentary element 14 of each layer C1, C2.

Figure 5:
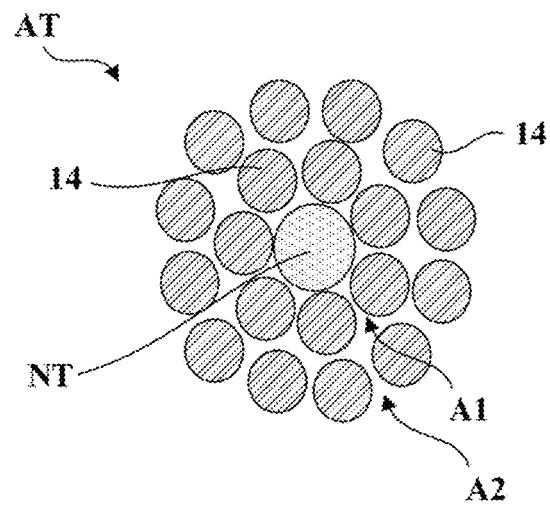
FIG. 5 is a view in section perpendicular to the axis of the assembly (assumed to be linear and at rest) of a temporary assembly of the method illustrated in FIGS. 1 and 2.

The installation is denoted by the general reference 10. The installation 10 comprises, firstly, means 11 for providing a temporary assembly AT comprising at least two layers and here comprising an inner layer A1 composed of A1'>1 metallic filamentary elements 14 helically wound around a temporary core NT and an outer layer A2 composed of A2'>1 metallic filamentary elements 14 helically wound around the inner layer A1. In the present case, the temporary assembly AT illustrated in FIG. 5 comprises the inner layer A1, the outer layer A2 and the temporary core NT, the A1' metallic filamentary elements 14 being helically wound around the temporary core NT. Here, the temporary assembly AT is composed of the inner layer A1, the outer layer A2 and the temporary core NT.

Advantageously, A1' ranges from 2 to 10 and A2' ranges from 6 to 20. Here, A1'=7 and A2'=12.

Each metallic filamentary element 14 comprises, here is composed of, a single metallic elementary monofilament of circular cross section, here of carbon steel, having a diameter d1=d2 ranging from 0.05 mm to 0.50 mm, preferably from 0.10 mm to 0.48 mm and more preferably from 0.15 mm to 0.45 mm and here d1=d2=0.32 mm. The temporary core is here a textile filamentary element, more particularly is here a multifilament textile ply of polyester having a linear density of 334 tex and a diameter equal to 0.60 mm.

The means 11 for providing comprise means 12 for supplying the A1' metallic filamentary elements 14, means for supplying 13 the A2' metallic filamentary elements 14 and means for supplying 15 the temporary core NT. The means for providing 11 also comprise means 16 for assembling by twisting the A1' and A2' metallic filamentary elements 14 to form the layers A1 and A2 of metallic filamentary elements 14 around the temporary core NT to form the temporary assembly AT. Furthermore, the means for providing 11 comprise means 20 for balancing the temporary assembly AT. At the outlet of the means 20, each metallic filamentary element 14 of the inner layer A1 of the temporary assembly A2 is here assembled with a temporary pitch equal to 5.8 mm and each metallic filamentary element 14 of the outer layer A2 of the temporary assembly AT is here assembled with a temporary pitch equal to 5.8 mm. The temporary helix diameter of each metallic filamentary element 14 of the inner layer A1 of the temporary assembly AT is here substantially equal to 0.92 mm and the temporary helix diameter of each metallic filamentary element 14 of the outer layer A2 of the temporary assembly AT is here substantially equal to 1.56 mm.

Downstream of the means for providing 11, considering the direction of advance of the metallic filamentary elements, the installation 10 comprises means 24 for separating the temporary assembly AT between a first split assembly AF1, a second split assembly AF2, a third split assembly AF3 and the temporary core NT or one or more assemblages comprising the temporary core NT, here the temporary core NT.

Figure 9:
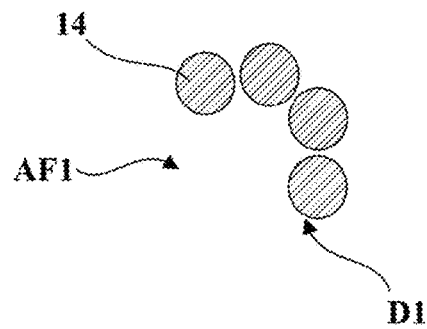
FIG. 9 is a view in section perpendicular to the axis of the assembly (assumed to be linear and at rest) of a first split assembly derived from the downstream split assemblage of FIG. 8.

The first split assembly AF1 shown in FIG. 9 comprises at least one layer D1 composed of D1'≥1 helically wound metallic filamentary element(s) 14, the D1' metallic filamentary element(s) 14 being derived from the inner layer A1 composed of A1'>1 metallic filamentary elements 14 of the temporary assembly AT. In the present case, the first split assembly AF1 is composed of the layer D1 composed of D1'=4 helically wound metallic filamentary elements 14.

Figure 10:
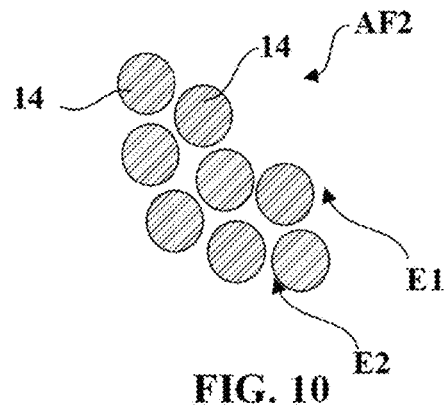
FIG. 10 is a view in section perpendicular to the axis of the assembly (assumed to be linear and at rest) of a second split assembly derived from the upstream split assemblage of FIG. 7.

The second split assembly AF2 shown in FIG. 10 comprises at least two layers E1, E2 comprising an inner layer E1 composed of helically wound metallic filamentary elements 14 and an outer layer E2 composed of E2'≥1 metallic filamentary elements 14 helically wound around the inner layer E1. Here, E1'=3 and E2'=5. The E1' metallic filamentary elements 14 are derived from the inner layer A1 of the temporary assembly AT and the E2' metallic filamentary elements 14 are derived from the outer layer A2 of the temporary assembly AT. In the present case, the second split assembly 27 is composed of the layers E1 and E2.

Figure 11:
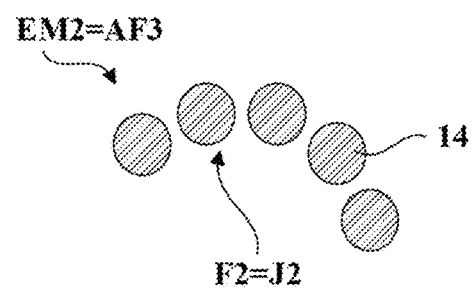
FIG. 11 is a view in section perpendicular to the axis of the assembly (assumed to be linear and at rest) of a main part forming the third split assembly derived from the precursor assemblage of FIG. 6.

The third split assembly AF3 shown in FIG. 11 comprises at least one layer F2 composed of F2'≥1 helically wound metallic filamentary element(s) 14, the F2' metallic filamentary elements 14 being derived from the outer layer A2 composed of A2'>1 metallic filamentary elements 14 of the temporary assembly AT. In the present case, the third split assembly AF3 is composed of the layer F2 composed of F2'=5 helically wound metallic filamentary elements 14.

Downstream of the means for providing 11, the means for separating 24 the temporary assembly AT between the first split assembly AF1, the second split assembly AF2, the third split assembly AF3 and the temporary core NT comprise means 29 for separating the temporary assembly AT between an upstream split assemblage EG and the third split assembly AF3.

Figure 7:
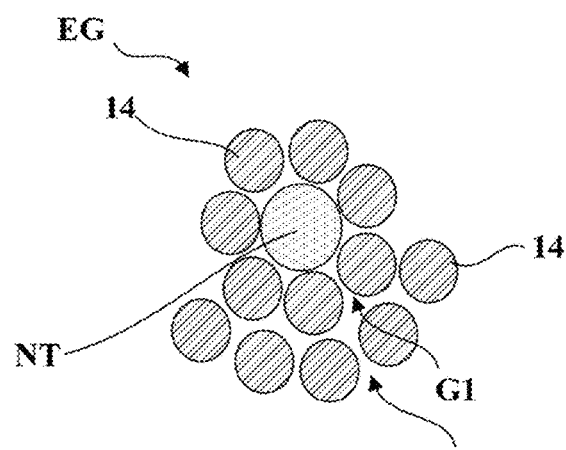
FIG. 7 is a view in section perpendicular to the axis of the assembly (assumed to be linear and at rest) of an upstream split assemblage derived from the temporary assembly of FIG. 5.

The upstream split assemblage EG shown in FIG. 7 comprises at least two layers G1, G2 comprising an inner layer G1 composed of G1'≥1 metallic filamentary element(s) 14 helically wound around the temporary core NT and an outer layer G2 composed of G2'≥1 metallic filamentary element(s) 14 helically wound around the inner layer G1. The G1' metallic filamentary element(s) 14 are derived from the inner layer A1 composed of A1'>1 metallic filamentary elements 14 of the temporary assembly AT. The G2' metallic filamentary element(s) 14 are derived from the outer layer A2 composed of A2'>1 metallic filamentary elements 14 of the temporary assembly AT. The split assemblage EG here comprises the inner layer G1, the outer layer G2 and the temporary core NT, the G1'≥1 metallic filamentary element(s) 14 being helically wound around the temporary core NT. In the present case, the upstream split assemblage EG is composed of the two layers G1, G2 with G1'=7 and G2'=5 and the temporary core NT, the G1'≥1 metallic filamentary elements 14 being helically wound around the temporary core NT.

The means for separating 29 the temporary assembly AT between the upstream split assemblage EG and the third split assembly AF3 comprise means 30 for separating the temporary assembly AT between a precursor assemblage EP2 and the upstream split assemblage EG. In the present case, the means for separating 30 comprise means 30' for splitting the temporary assembly AT into the precursor assemblage EP2 and the upstream split assemblage EG.

Figure 6:
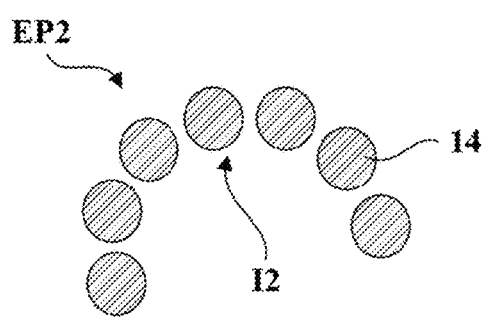
FIG. 6 is a view in section perpendicular to the axis of the assembly (assumed to be linear and at rest) of a precursor assemblage derived from the temporary assembly of FIG. 5.

The precursor assemblage EP2 shown in FIG. 6 comprises at least one layer I2 composed of I2'>1 helically wound metallic filamentary elements 14, the I2' metallic filamentary elements 14 being derived from the outer layer A2 composed of A2' metallic filamentary elements 14 of the temporary assembly AT. In the present case, the precursor assemblage EP2 is composed of the layer I2 composed of I2'=7 helically wound metallic filamentary elements 14.

The means for separating 29 the temporary assembly AT between the upstream split assemblage EG and the third split assembly AF3 also comprise means 31 for separating the precursor assemblage EP2 between a main assemblage EM2 forming the third split assembly AF3 and a supplementary assemblage ES2. In the present case, the means for separating 31 comprise means 31' for splitting the precursor assemblage EP2 into the main assemblage EM2 forming the third split assembly AF3 and the supplementary assemblage ES2.

The main assemblage EM2 shown in FIG. 11 comprises a layer J2 composed of J2'≥1 helically wound metallic filamentary element(s) 14, the J2'≥1 metallic filamentary element(s) 14 being derived from the layer I2 composed of the I2' metallic filamentary elements 14 of the precursor assemblage EP2. In the present case, the main assemblage EM2 is composed of the layer J2 composed of F2'=J2'=5 helically wound metallic filamentary elements 14.

Figure 12:
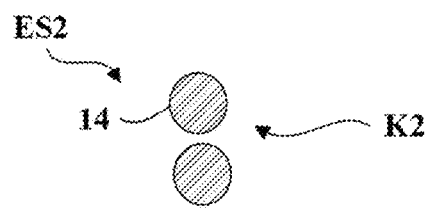
FIG. 12 is a view in section perpendicular to the axis of the assembly (assumed to be linear and at rest) of a supplementary part derived from the precursor assemblage of FIG. 6.

The supplementary assemblage ES2 shown in FIG. 12 comprises a layer K2 composed of K2'≥1 helically wound metallic filamentary element(s) 14, the K2'≥1 metallic filamentary element(s) being derived from the layer I2 composed of the I2' metallic filamentary elements 14 of the precursor assemblage EP2. In the present case, the supplementary assemblage ES2 is composed of the layer K2 composed of K2'=2 helically wound metallic filamentary elements 14.

Downstream of the means for providing 11, the means for separating 24 the temporary assembly AT between the first split assembly AF1, the second split assembly AF2, the third split assembly AF3 and the temporary core NT also comprise means 32 for separating the upstream split assemblage EG between the first split assembly AF1, the second split assembly AF2 and the temporary core NT.

The means for separating 32 the upstream split assemblage EG between the first split assembly AF1, the second split assembly AF2 and the temporary core NT comprise means 33 for separating the upstream split assemblage EG between a downstream split assemblage EH and the second split assembly AF2. In the present case, the means for separating 33 comprise means 33' for splitting the upstream split assemblage EG into the downstream split assemblage EH and the second split assembly AF2.

Figure 8:
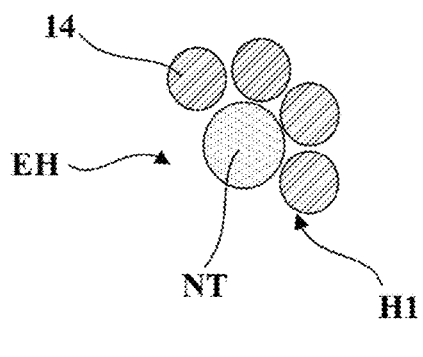
FIG. 8 is a view in section perpendicular to the axis of the assembly (assumed to be linear and at rest) of a downstream split assemblage derived from the upstream split assemblage of FIG. 7.

The downstream split assemblage EH shown in FIG. 8 comprises at least one layer H1 composed of H1'≥1 metallic filamentary element(s) 14 helically wound around the temporary core NT, the H1' metallic filamentary element(s) 14 being derived from the inner layer G1 composed of the G1' metallic filamentary elements 14 of the upstream split assemblage EG. The downstream split assemblage EH comprises the inner layer G1 and the temporary core NT, the H1′≥1 metallic filamentary element(s) 14 being helically wound around the temporary core NT. In the present case, the downstream split assemblage EH is composed of the layer H1 composed of H1′=4 metallic filamentary elements 14 and the temporary core NT, the H1′≥1 metallic filamentary elements 14 being helically wound around the temporary core NT.

The means for separating 32 the upstream split assemblage EG between the first split assembly AF1, the second split assembly AF2 and the temporary core NT also comprise means 34 for separating the downstream split assemblage EH between the first split assembly AF1 and the temporary core NT. In the present case, the means for separating 34 comprise means 34′ for splitting the downstream split assemblage EH into the first split assembly AF1 and the temporary core NT.

It will be noted that the means 29 for separating the temporary assembly AT between the upstream split assemblage EG and the third split assembly AF3 are arranged upstream of the means 32 for separating the upstream split assemblage between the first split assembly AF1, the second split assembly AF3 and the temporary core NT. The means 33 for separating the upstream split assemblage EG between the downstream split assemblage EH and the second split assembly AF2 are arranged upstream of the means 34 for separating the downstream split assemblage EH between the first split assembly AF1 and the temporary core NT. The means 30 for separating the temporary assembly AT between the upstream split assemblage EG and the precursor assemblage EP2 are arranged upstream of the means 31 for separating the precursor assemblage EP2 between the main assemblage EM2 forming the third split assembly AF3 and the supplementary assemblage ES2.

Downstream of the means for separating 29, 30, 31, 32, 33 and 34, the installation 10 comprises means 35 for reassembling the first split assembly AF1, the second split assembly AF2 and the third split assembly AF3 to form the final assembly A.

The means for reassembling 35 comprise upstream means 36 for reassembling the first split assembly AF1 with the second split assembly AF2 to form a downstream temporary assembly ATF.

Figure 13:
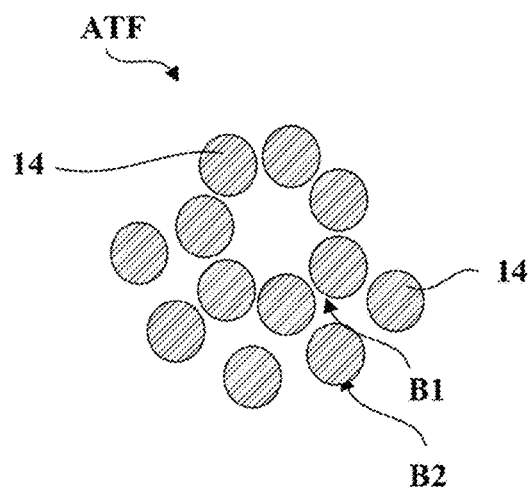
FIG. 13 is a view in section perpendicular to the axis of the assembly (assumed to be linear and at rest) of a downstream temporary assembly derived from the reassembling of the first and second split assemblies of FIGS. 9 and 10.

The downstream temporary assembly ATF shown in FIG. 13 comprises at least two layers B1, B2 comprising an inner layer B1 composed of C1=B1′>1 helically wound metallic filamentary elements 14 forming the inner layer C1 composed of C1′ helically wound metallic filamentary elements 14 and an outer layer B2 composed of B2′>1 helically wound metallic filamentary elements 14 forming a portion of the outer layer C2 composed of C2′ helically wound metallic filamentary elements 14. In the present case, the downstream temporary assembly ATF is composed of the inner layer B1 and the outer layer B2.

The means for reassembling 35 also comprise downstream means 37 for reassembling the downstream temporary assembly ATF with the third split assembly AF3 to form the final assembly A.

In the present case, owing to the springback of each metallic filamentary element 14 in response to the step of twisting, the pitch of each metallic filamentary element 14 of the inner layer C1 of the temporary assembly AT changes from the temporary pitch equal to 5.8 mm to the pitch p1 here equal to 7.8 mm and the pitch of each metallic filamentary element 14 of the outer layer C2 of the temporary assembly AT changes from the temporary pitch equal to 5.8 mm to the pitch p2 equal to the pitch p1, namely 7.8 mm.

The person skilled in the art will know how to determine the temporary pitches to apply in order to obtain the desired pitches p1, p2.

Each helix diameter $\phi 1$, $\phi 2$ of each metallic filamentary element 14 in the final assembly is here substantially greater than the temporary helix diameter of each filamentary element 14 in the temporary assembly AT, owing to the springback. The higher the degree of twist, the greater each helix diameter $\phi 1$, $\phi 2$ of each metallic filamentary element 14 in the final assembly than the temporary helix diameter of each filamentary element 14 in the temporary assembly AT. The person skilled in the art will know how to determine the temporary helix diameter to apply in order to obtain each desired helix diameter $\phi 1$, $\phi 2$, according to the degree of twist and the nature of the temporary core.

The means for providing 11, the means for separating 24 and the means for reassembling 35 are arranged such that, on the one hand, all the C1′ metallic filamentary elements 14 have the same diameter d1=0.32 mm, are helically wound with the same pitch p1=7.8 mm and have the same helix diameter $\phi 1$=0.95 mm and, on the other hand, all the C2′ metallic filamentary elements have the same diameter d2=0.32 mm, are helically wound with the same pitch p2=7.8 mm and have the same helix diameter $\phi 2$=1.62 mm. Accordingly, in this first embodiment, the means for separating 24 and the means 35 for reassembling are arranged such that D1′+E1′=A1′ and E2′+F2′≤A2′ and here such that E2′+F2′<A2′. In particular, in this first embodiment, the means for separating 24 and the means 35 for reassembling are arranged such that C1′=A1′ and C2′≤A2′ and here such that C2′<A2′.

Downstream of the means for reassembling 35, 36 and 37, considering the direction of advance of the metallic filamentary elements 14, the installation 10 comprises means 38, 38′ for maintaining the rotation of the final assembly A and of the supplementary assemblage ES2, respectively, about their direction of advance.

Downstream of the means for maintaining the rotation 38, 38′, considering the direction of advance of the metallic filamentary elements 14, the installation 10 comprises means for balancing 39, 39′ the final assembly A and the supplementary assemblage ES2, respectively.

Downstream of the means for balancing 39, 39′, considering the direction of advance of the metallic filamentary elements 14, the installation 10 comprises means 40, 40′ for storing the final assembly A and the supplementary assemblage ES2, respectively.

The installation 10 also comprises means for guiding G, for unwinding D and for pulling T the filamentary elements, the assemblages and the assemblies which are conventionally used by the person skilled in the art, for example pulleys and capstans.

The means for supplying 12 here comprise seven reels 41 for storing the A1′ metallic filamentary elements. The means for supplying 13 here comprise twelve reels 41 for storing the A2′ metallic filamentary elements. The means for supplying 15 comprise a reel 41 for storing the temporary core NT. In FIG. 1, only four of the seven and twelve reels 41 are shown for purposes of clarity of the figure.

The means for assembling 16 comprise distributors 42, 42′ and assembly pegs 44, 44′. The means for assembling 16 comprise means 46 for twisting the A1′ and A2′ filamentary elements 14 and the temporary core NT. The means for twisting 46 comprise a twisting element 48, also commonly called a "twister" by the person skilled in the art, for example a four-pulley twister. Downstream of these means for twisting 46, the means for balancing 20 comprise a twister 50, for example a four-pulley twister. Finally, downstream of the twisting element 48, the means for assembling 16 comprise a transfer element 52 and a nacelle 53 carrying the means for final balancing 39 and the means 40 for storing. The transfer element 52 and the nacelle 53 are rotatably mounted so as to preserve the assembly pitch of the final assembly A. The installation 10 also comprises a transfer element 52' and a nacelle 53' for the supplementary assemblage ES2.

Figure 3:
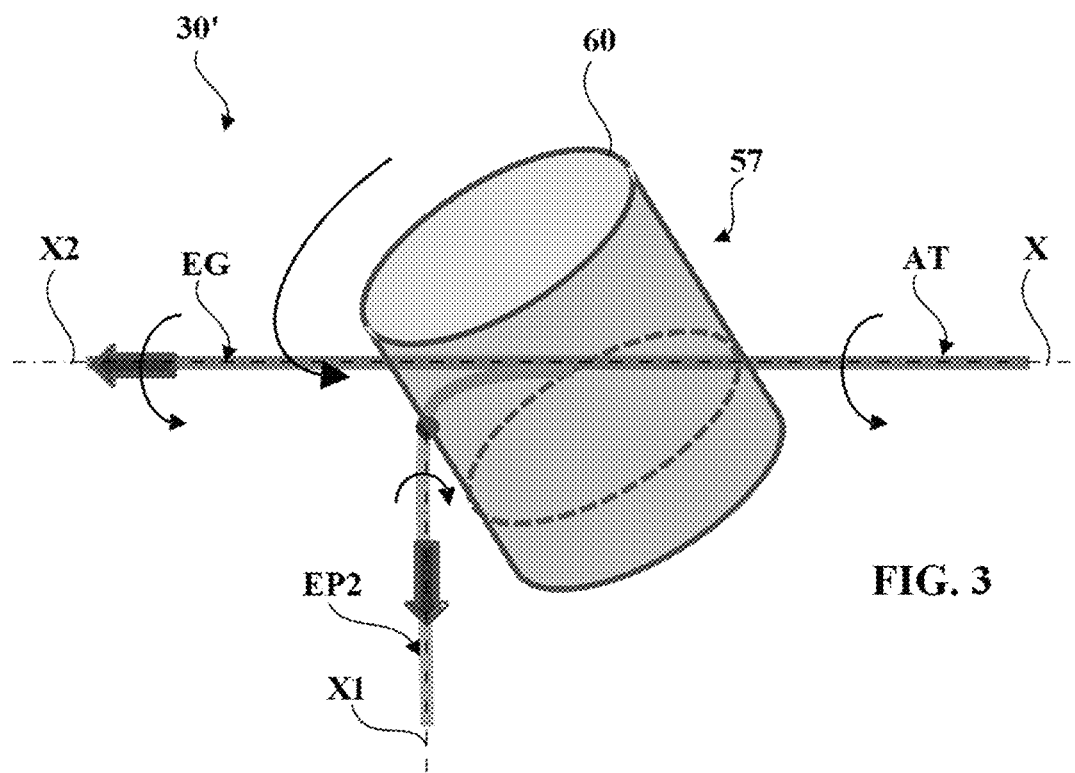
FIGS. 3 and 4 are diagrams of means for splitting and reassembling of the installation of FIG. 1.

The means for splitting 30' are shown in FIG. 3. The temporary assembly AT advances in an upstream direction of advance X. After passing through the means for splitting 30', the upstream split assemblage EG advances in a downstream direction of advance X2 and the precursor assemblage EP2 advances in a downstream direction X1. The means for splitting 30' comprise means 57 for guiding which allow, on the one hand, translational movement of the upstream split assemblage EG and of the precursor assemblage EP2 in the downstream directions X2, X1, respectively, and, on the other hand, rotation of the upstream split assemblage EG and of the precursor assemblage EP2 about the downstream directions X2, X1, respectively. In the present case, the means 57 comprise an inclined rotating roller 60. The means for splitting 31', 33' and 34' are analogous to the means for splitting 30' described above. In the method, the precursor assemblage EP2 comes into contact with the roller 60 downstream of the point of splitting between the upstream split assemblage EG and the precursor assemblage EP2.

Figure 4:
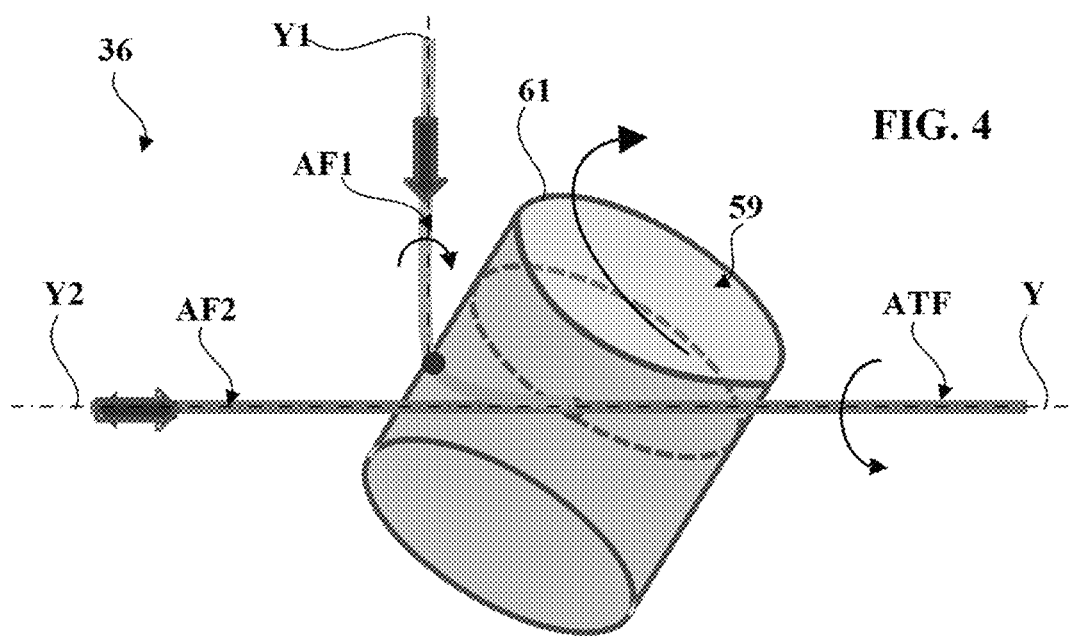

The means for reassembling 36 are shown in FIG. 4. The first split assembly AF1 advances in an upstream direction of advance Y1. The second split assembly AF2 advances in an upstream direction of advance Y2. The downstream temporary assembly ATF advances in a downstream direction of advance Y. The means for reassembling 36 comprise means 59 for guiding which allow, on the one hand, translational movement of the first and second split assemblies AF1, AF2 in the downstream directions Y1, Y2, respectively, and, on the other hand, rotation of the first and second split assemblies AF1, AF2 about the downstream directions Y1, Y2, respectively. In the present case, the means 59 comprise an inclined rotating roller 61. In the method, the first split assembly AF1 comes into contact with the roller 61 upstream of the point of reassembling of the first and second split assemblies AF1, AF2. The means for reassembling 37 are similar to the means for reassembling 36 described above.

The means 38, 38' for maintaining rotation comprise twisters 62, 62', for example four-pulley twisters allowing the rotation of the final assembly A about the downstream direction to be maintained. The means for final balancing 39, 39' also comprise twisters 63, 63', for example four-pulley twisters. The means for storing 40, 40' here comprise reels 64, 64' for storing the final assembly A and the supplementary part ES2, respectively.

In order to recycle the temporary core NT, the installation 10 comprises means for guiding G the temporary core NT between, on the one hand, an outlet 68 of the means for separating 24, here downstream of the means for splitting 34, and, on the other hand, an inlet 70 into the means for assembling 16.

It will be noted that the installation 10 does not have means for preforming, in particular means for individually preforming the filamentary elements 14 arranged upstream of the means for assembling 16.

Figure 2:
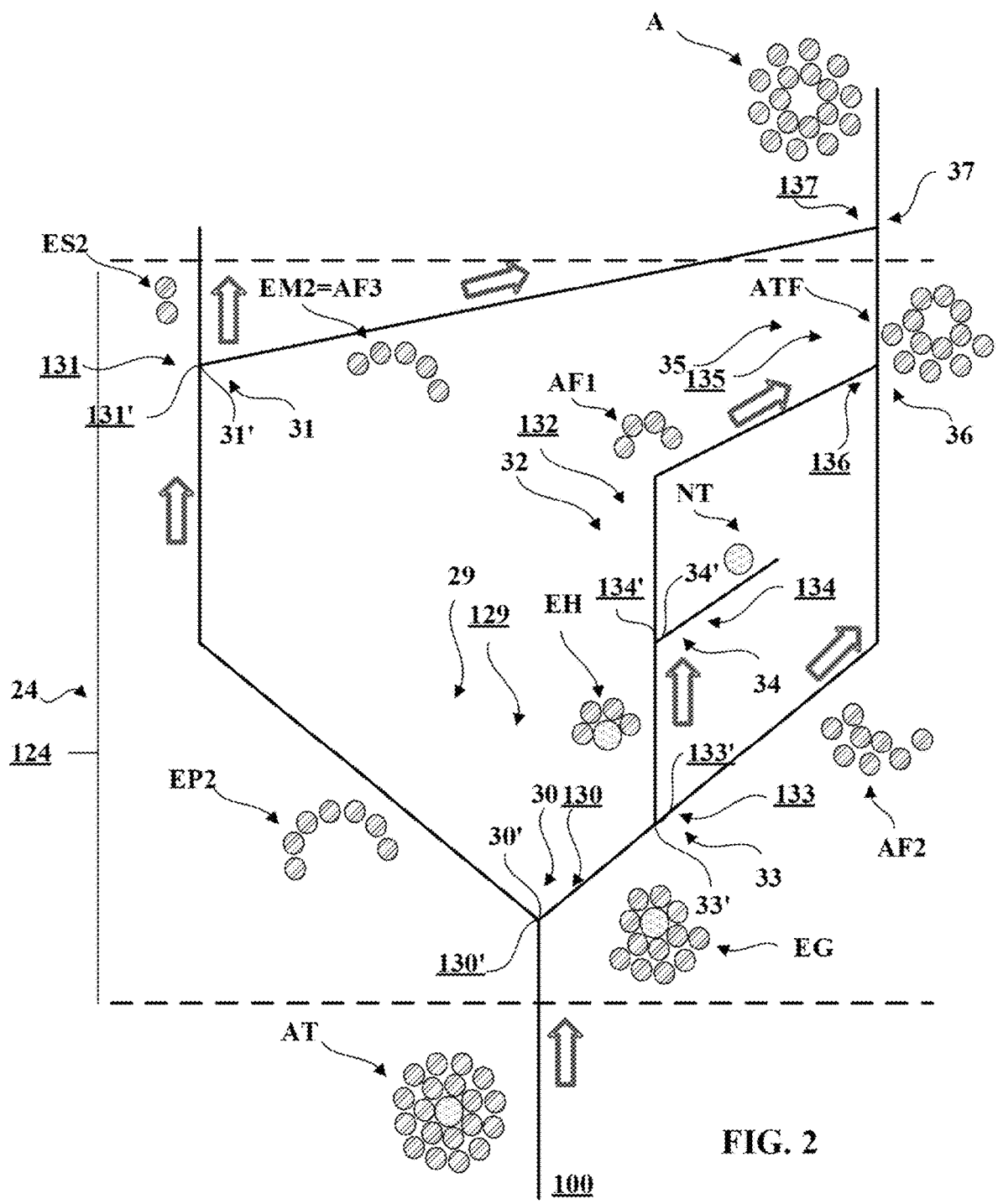
FIG. 2 is a schematic representation of the installation and of the method illustrated in FIG. 1.

The various means 24, 29, 30, 30', 31, 31', 32, 33, 33', 34, 34', 35, 36, 37 and the various assemblies and assemblages A, AT, ATF, AF1, AF2, AF3, EG, EH, EP2, EM2, ES2, NT are shown schematically in FIG. 2, in which the arrows indicate the direction of advance of these assemblies and assemblages from downstream to upstream.

The method according to the first embodiment permitting the use of the installation 10 described above will now be described. The method permits the production of the final assembly A described above.

Firstly, the filamentary elements 14 and the temporary core NT are unwound from the means for supplying 12, 13 and 15, here the reels 41.

The method then comprises a step 100 of providing the temporary assembly AT comprising, on the one hand, a step of assembling by twisting the A1', A2' metallic filamentary elements 14 in two layers A1, A2 around the temporary core NT and, on the other hand, a step of balancing the temporary assembly AT carried out by means of the twister 50.

The method comprises a step 124 of separating the temporary assembly NT between the first split assembly AF1, the second split assembly AF2, the third split assembly AF3 and the temporary core NT or one or more assemblages comprising the temporary core NT, here the temporary core NT.

Downstream of the step of providing 100, the step of separating 124 the temporary assembly AT between the first split assembly AF1, the second split assembly AF2, the third split assembly AF3 and the temporary core NT comprises a step 129 of separating the temporary assembly AT between the upstream split assemblage EG and the third split assembly AF3.

The step of separating 129 the temporary assembly AT between the upstream split assemblage EG and the third split assembly AF3 comprises a step 130 of separating the temporary assembly AT between the precursor assemblage EP2 and the upstream split assemblage EG. In the present case, the step of separating 130 comprises a step 130' of splitting the temporary assembly AT into the precursor assemblage EP2 and the upstream split assemblage EG.

The step of separating 129 the temporary assembly AT between the upstream split assemblage EG and the third split assembly AF3 also comprises a step 131 of separating the precursor assemblage EP2 between the main assemblage EM2 forming the third split assembly AF3 and the supplementary assemblage ES2. In the present case, the step of separating 131 comprises a step 131' of splitting the precursor assemblage EP2 into the main assemblage EM2 forming the third split assembly AF3 and the supplementary assemblage ES2.

Downstream of the step of providing 100, the step of separating 124 the temporary assembly AT between the first split assembly AF1, the second split assembly AF2, the third split assembly AF3 and the temporary core NT also comprises a step 132 of separating the upstream split assemblage EG between the first split assembly AF1, the second split assembly AF2 and the temporary core NT.

The step of separating 132 the upstream split assemblage EG between the first split assembly AF1, the second split assembly AF2 and the temporary core NT comprises a step 133 of separating the upstream split assemblage EG between a downstream split assemblage EH and the second split assembly AF2. In the present case, the step of separating 133 comprises a step 133' of splitting the upstream split assemblage EG into the downstream split assemblage EH and the second split assembly AF2.

The step of separating 132 the upstream split assemblage EG between the first split assembly AF1, the second split assembly AF2 and the temporary core NT also comprises a step 134 of separating the downstream split assemblage EH between the first split assembly AF1 and the temporary core NT. In the present case, the step of separating 134 comprises a step 134' of splitting the downstream split assemblage EH into the first split assembly AF1 and the temporary core NT.

It will be noted that the step 129 of separating the temporary assembly AT between the upstream split assemblage EG and the third split assembly AF3 takes place upstream of the step 132 of separating the upstream split assemblage between the first split assembly AF1, the second split assembly AF3 and the temporary core NT. The step 133 of separating the upstream split assemblage EG between the downstream split assemblage EH and the second split assembly AF2 takes place upstream of the step 134 of separating the downstream split assemblage EH between the first split assembly AF1 and the temporary core NT. The step 130 of separating the temporary assembly AT between the upstream split assemblage EG and the precursor assemblage EP2 takes place upstream of the step 131 of separating the precursor assemblage EP2 between the main assemblage EM2 forming the third split assembly AF3 and the supplementary assemblage ES2.

Downstream of each step of separating 129, 130, 131, 132, 133 and 134, the method comprises a step 135 of reassembling the first split assembly AF1, the second split assembly AF2 and the third split assembly AF3 to form the final assembly A.

The step of reassembling 135 comprises an upstream step 136 of reassembling the first split assembly AF1 with the second split assembly AF2 to form the downstream temporary assembly ATF. The step of reassembling 135 also comprises a downstream step 137 of reassembling the downstream temporary assembly ATF with the third split assembly AF3 to form the final assembly A.

In this embodiment, the step of providing 100, the step of separating 124 and the step of reassembling 135 are carried out such that, on the one hand, all the C'1 metallic filamentary elements 14 have the same diameter d1=0.32 mm, are helically wound with the same pitch p1=7.8 mm and have the same helix diameter $\phi$40=0.95 mm and, on the other hand, all the C2' metallic filamentary elements have the same diameter d2=0.32 mm, are helically wound with the same pitch p2=7.8 mm and have the same helix diameter $\phi$2=1.62 mm.

Accordingly, in this first embodiment permitting total reassembling of the A1' metallic filamentary elements and partial reassembling of the A2' metallic filamentary elements, the step 124 of separating and the step 135 of reassembling are carried out such that D1'+E1'=A1' and E2'+F2'≤A2' and here such that E2'+F2'<A2'. In particular, in this first embodiment, the step 124 of separating and the step 135 of reassembling are carried out such that C1'=A1' and C2'≤A2' and here such that C2'<A2'.

Furthermore, it will be noted that A1'≥G1', A2'≥F2'+G2', A2'≥I2'+G2', G1'≥D1', G2'≥E2', G1'≥H1'+E1', H1'≥D1', J2'=F2' and I2'≥J2'+K2'. In the present case, G1'=H1'+E1', G2'=E2', H1'=D1', A1'=G1', A2'=I2'+G2' and I2'=J2'+K2'.

Finally, it will be noted that, in order to facilitate the exit of the temporary core, D1'=1 or 2 in the cases where A1'=4 or A1'=5 and D1'0.75×A1' and preferably D1'≤0.70×A1' in the cases where A1'≥6. Here, A1'=7, and D1'=4<0.7×4=4.2.

Furthermore, the method comprises steps of maintaining the rotation of the final assembly A and of the supplementary assemblage ES2 about their respective directions of advance. These steps of maintaining are carried out downstream of the step of separating the temporary assembly AT by means of the means 38 and 38'.

A step of final balancing is carried out by means of the means 39 and 39'.

Finally, the final assembly A and the supplementary assembly ES2 are stored on the storage reels 64, 64'.

With regard to the temporary core NT, the method comprises a step of recycling the temporary core NT. During this recycling step, the temporary core NT is recovered downstream of the step of separating 124, here downstream of the step of separating 134, and the previously recovered temporary core NT is introduced upstream of the step of assembling. This step of recycling is continuous.

It will be noted that the method so described does not have steps of individually preforming each of the metallic filamentary elements.14

Installation and Method According to a Second Embodiment of the Invention

Figure 15:
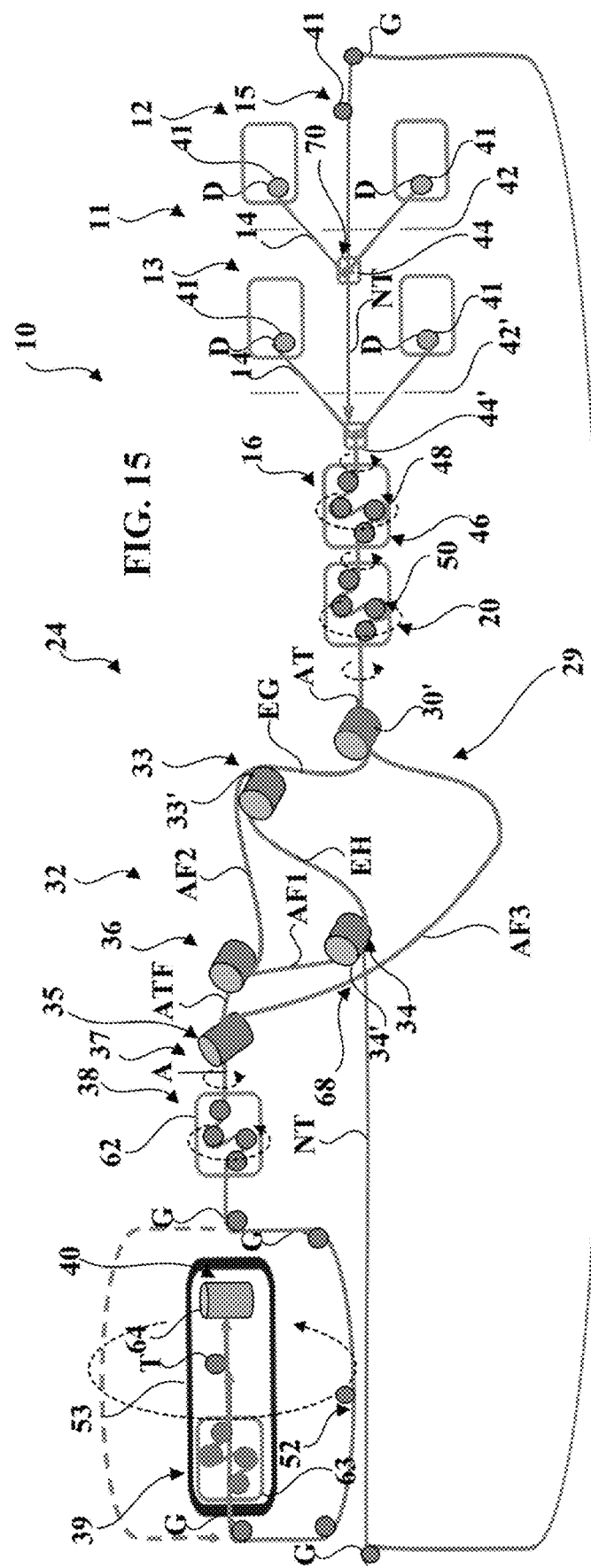
FIGS. 15 and 16 are representations analogous to those of FIGS. 1 and 2 of an installation and of a method according to a second embodiment of the invention.
Figure 16:
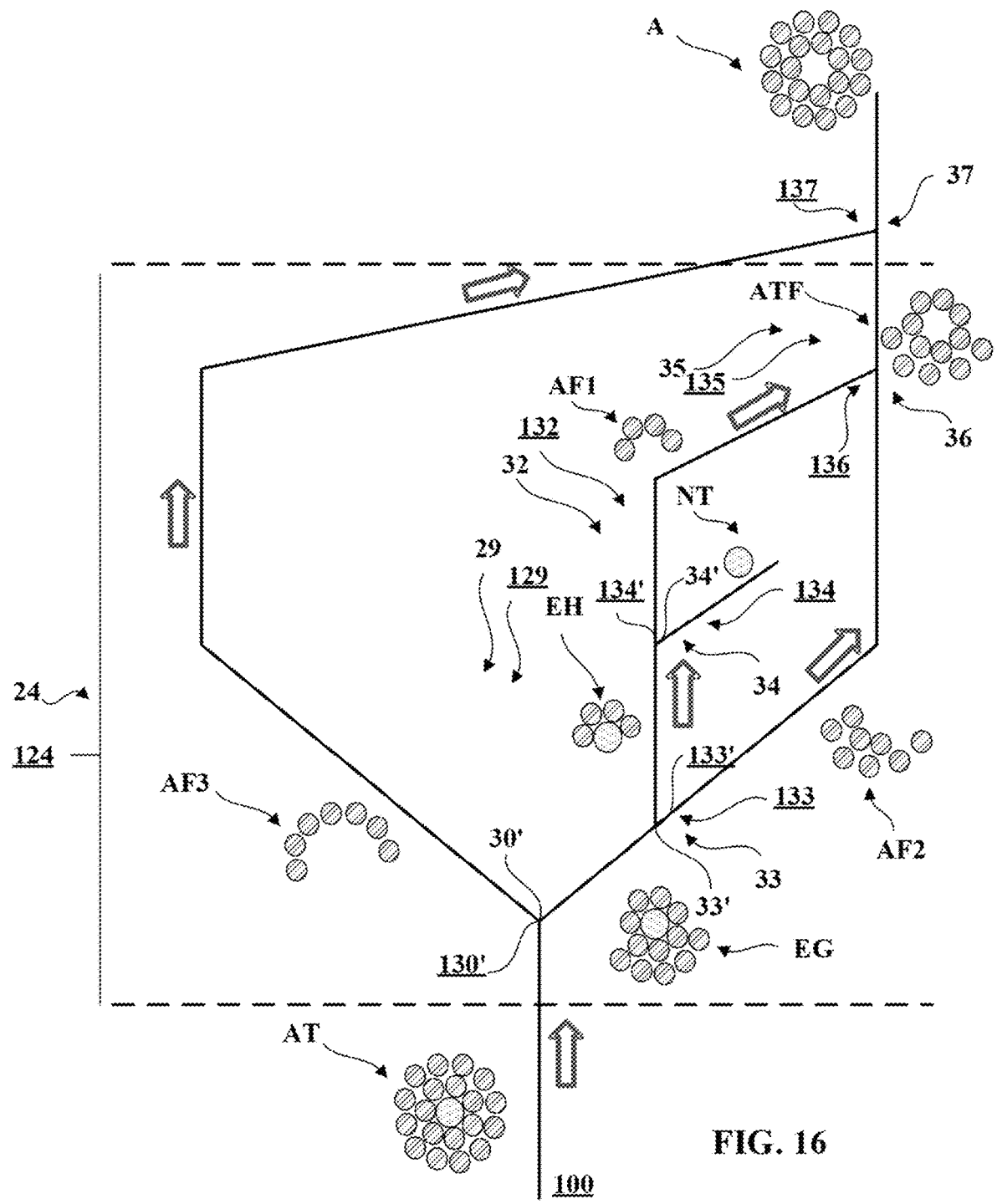

An installation and a method according to the second embodiment of the invention will now be described with reference to FIGS. 15 and 16. Elements similar to those of the first embodiment are denoted by identical references.

Unlike in the first embodiment, the means 24 for separating the temporary assembly AT between the first split assembly AF1, the second split assembly AF2, the third split assembly AF3 and the temporary core NT and the means 35 for reassembling the first split assembly AF1 with the second split assembly AF2 and the third split assembly AF3 are arranged such that E2'+F2'=A2' and here such that C2'=A2'. Similarly, the step 124 of separating the temporary assembly AT between the first split assembly AF1, the second split assembly AF2, the third split assembly AF3 and the temporary core NT and the step 135 of reassembling the first split assembly AF1 with the second split assembly AF2 and the third split assembly AF3 are carried out such that E2'+F2'=A2' and here such that C2'=A2'.

In the present case, the means 29 for separating the temporary assembly AT between the upstream split assemblage EG and the third split assembly AF3 comprise means 30' for splitting the temporary assembly AT into the upstream split assemblage EG and the third split assembly AF3. Similarly, the step 129 of separating the temporary assembly AT between the upstream split assemblage EG and the third split assembly AF3 comprises a step 130' of splitting the temporary assembly AT into the upstream split assemblage EG and the third split assembly AF3.

The other means and steps follow mutatis mutandis from those of the first embodiment.

Installation and Method According to a Third Embodiment of the Invention

An installation and a method according to the third embodiment of the invention will now be described with reference to FIG. 17. Elements similar to those of the preceding embodiments are denoted by identical references.

Unlike in the first embodiment, the means 32 for separating the upstream split assemblage EG between the first split assembly AF1, the second split assembly AF2 and the temporary core NT comprise means 38 for separating the upstream split assemblage EG between a downstream split assemblage EH and the first split assembly AF1. In the present case, the means for separating 38 comprise means 38' for splitting the upstream split assemblage EG into a downstream split assemblage EH and the first split assembly AF1. Similarly, the step 132 of separating the upstream split assemblage EG between the first split assembly AF1, the second split assembly AF2 and the temporary core NT comprises a step 138 of separating the upstream split assemblage EG between the downstream split assemblage EH and the first split assembly AF1. In the present case, the step of separating 138 comprises a step 138' of splitting the upstream split assemblage EG into the downstream split assemblage EH and the first split assembly AF1.

The downstream split assemblage EH comprises at least two layers H1, H2 comprising an inner layer H1 composed of $H1' \geq 1$ metallic filamentary element(s) 14 helically wound around the temporary core NT and an outer layer H2 composed of $H2' \geq 1$ metallic filamentary element(s) 14 helically wound around the inner layer H1. The H1' metallic filamentary element(s) 14 are derived from the inner layer G1 composed of $G1'>1$ metallic filamentary elements 14 of the upstream split assemblage EG and the H2' metallic filamentary element(s) 14 are derived from the outer layer G2 composed of $G2'>1$ metallic filamentary elements 14 of the upstream split assemblage EG. The downstream split assemblage comprises the inner layer H1, the outer layer H2 and the temporary core NT, the H1' metallic filamentary element(s) being helically wound around the temporary core. Here, the downstream split assemblage EH is composed of the inner layer H1, the outer layer H2 and the temporary core, the H1' metallic filamentary element(s) being helically wound around the temporary core. In the present case, $H1'=3$ and $H2'=5$.

Unlike in the first embodiment, the means 32 for separating the upstream split assemblage EG between the first split assembly AF1, the second split assembly AF2 and the temporary core NT also comprise means 39 for separating the downstream split assemblage EH between the second split assembly AF2 and the temporary core NT. In the present case, the means for separating 39 comprise means 39' for splitting the downstream split assemblage EH into the second split assembly AF2 and the temporary core NT. Similarly, the step 132 of separating the upstream split assemblage EG between the first split assembly AF1, the second split assembly AF2 and the temporary core NT also comprises a step 139 of separating the downstream split assemblage EH between the second split assembly AF2 and the temporary core NT. In the present case, the step of separating 139 comprises a step 139' of splitting the downstream split assemblage EH into the second split assembly AF2 and the temporary core NT.

The means 38 for separating the upstream split assemblage EG between the downstream split assemblage EH and the first split assembly AF1 are arranged upstream of the means 39 for separating the downstream split assemblage EH between the second split assembly AF2 and the temporary core NT. Similarly, the step 138 of separating the upstream split assemblage EG between the downstream split assemblage EH and the first split assembly AF1 takes place upstream of the step 139 of separating the downstream split assemblage EH between the second split assembly AF2 and the temporary core NT.

It will be noted that, in this third embodiment, $G1' \geq H1'+D1'$, $G2' \geq H2'$, $H1' \geq E1'$, $H2' \geq E2'$ and here $G1'=H1'+D1'$, $G2'=H2'$, $H1'=E1'$ and $H2'=E2'$.

The other means and steps follow mutatis mutandis from those of the preceding embodiments.

Installation and Method According to a Fourth Embodiment of the Invention

Figure 18:
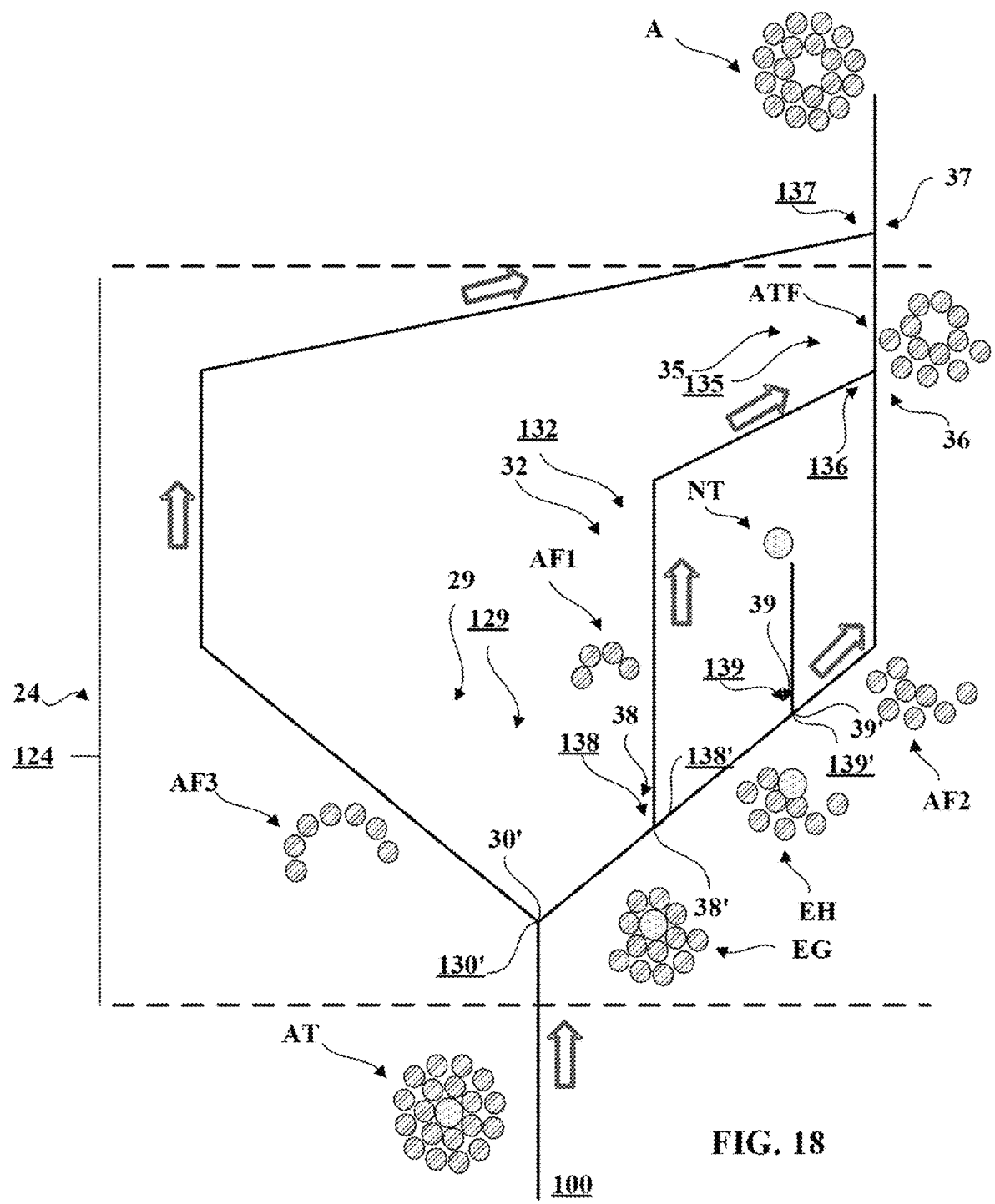

An installation and a method according to the fourth embodiment of the invention will now be described with reference to FIG. 18. Elements similar to those of the preceding embodiments are denoted by identical references.

The differences between the fourth embodiment and the second embodiment are the same differences as between the third embodiment and the first embodiment. The means and steps therefore follow mutatis mutandis from those of the preceding embodiments.

Installation and Method According to a Fifth Embodiment of the Invention

Figure 19:
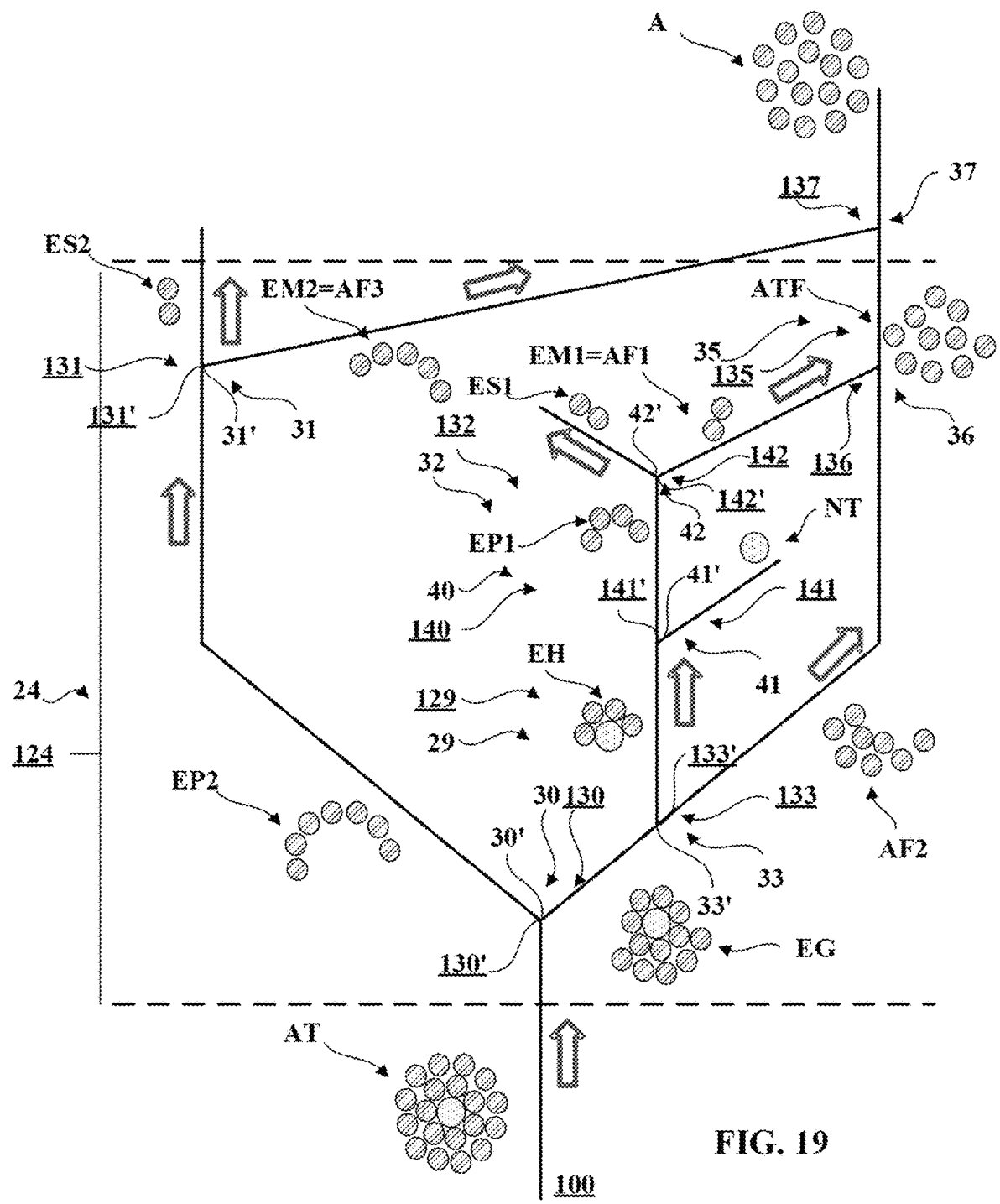

An installation and a method according to the fifth embodiment of the invention will now be described with reference to FIG. 19. Elements similar to those of the preceding embodiments are denoted by identical references.

Unlike in the first embodiment, the means 24 for separating the temporary assembly AT between the first split assembly AF1, the second split assembly AF2, the third split assembly AF3 and the temporary core NT and the means 35 for reassembling the first split assembly AF1 with the second split assembly AF2 and the third split assembly AF3 are arranged such that $D1'+E1'<A1'$ and $E2'+F2' \leq A2'$ and here such that $D1'+E1'<A1'$ and $E2'+F2'<A2'$. In particular, the means 24 for separating and the means 35 for reassembling are arranged such that $C1'<A1'$ and $C2' \leq A2'$ and here such that $C1'<A1'$ and $C2'<A2'$. Similarly, the step 124 of separating the temporary assembly AT between the first split assembly AF1, the second split assembly AF2, the third split assembly AF3 and the temporary core NT and the step 135 of reassembling the first split assembly AF1 with the second split assembly AF2 and the third split assembly AF3 are carried out such that $D1'+E1'<A1'$ and $E2'+F2' \leq A2'$ and here such that $D1'+E1'<A1'$ and $E2'+F2'<A2'$. In particular, the step 124 of separating and the step 135 of reassembling are carried out such that $C1'<A1'$ and $C2' \leq A2'$ and here such that $C1'<A1'$ and $C2'<A2'$.

Unlike in the first embodiment, the means 32 for separating the upstream split assemblage EG between the first split assembly AF1, the second split assembly AF2 and the temporary core NT comprise means 40 for separating the upstream split assemblage EG between a precursor assemblage EP1, the second split assembly AF2 and the temporary core NT. Similarly, the step 132 of separating the upstream split assemblage EG between the first split assembly AF1, the second split assembly AF2 and the temporary core NT comprises a step 140 of separating the upstream split assemblage E between the precursor assemblage EP1, the second split assembly AF2 and the temporary core NT.

The precursor assemblage EP1 comprises at least one layer I1 composed of $I1'>1$ helically wound metallic filamentary elements 14. The I1' metallic filamentary elements 14 are derived from the inner layer G1 composed of the G1' metallic filamentary elements 14 of the upstream split assemblage EG. Here, the precursor assemblage EP1 is composed of the layer I1 composed of the $I1'=4$ metallic filamentary elements.

Unlike in the first embodiment, the means 32 for separating the upstream split assemblage EG between the first split assembly AF1, the second split assembly AF2 and the temporary core NT also comprise means 42 for separating the precursor assemblage EP1 between a main assemblage EM1 forming the first split assembly AF1 and a supplementary assemblage ES1. In the present case, the means for separating 42 comprise means 42' for splitting the precursor assemblage EP1 into the main assemblage EM1 forming the first split assembly AF1 and the supplementary assemblage ES1. Similarly, the step 132 of separating the upstream split assemblage EG between the first split assembly AF1, the second split assembly AF2 and the temporary core NT also comprises a step 142 of separating the precursor assemblage EP1 between the main assemblage EM1 forming the first split assembly AF1 and the supplementary assemblage ES1. In the present case, the step of separating 132 comprises a step 142' of splitting the precursor assemblage EP1 into the main assemblage EM1 forming the first split assembly AF1 and the supplementary assemblage ES1.

The main assemblage EM1 comprises at least one layer J1 composed of $J1'\geq1$ helically wound metallic filamentary element(s) 14. The $J1'\geq1$ metallic filamentary element(s) 14 are derived from the layer I1 composed of the $I1'>1$ metallic filamentary elements 14 of the precursor assemblage EP1. Here, the main assemblage EM1 forming the first split assembly AF1 is composed of the layer J1 composed of the $J1'=2$ metallic filamentary element(s).

The supplementary assemblage ES1 comprises at least one layer K1 composed of $K1'\geq1$ helically wound metallic filamentary element(s) 14. The $K1'\geq1$ metallic filamentary element(s) 14 are derived from the layer I1 composed of the $I1'>1$ metallic filamentary elements 14 of the precursor assemblage EP1. The supplementary assemblage ES1 is composed of the layer K1 composed of the $K1'=2$ metallic filamentary element(s).

The means 40 for separating the upstream split assemblage EG between the precursor assemblage EP1, the second split assembly AF2 and the temporary core NT comprise the means 33 for separating the upstream split assemblage EG between the downstream split assemblage EH and the second split assembly AF2. In the present case, the means for separating 33 comprise the means 33' for splitting the upstream split assemblage EG into the downstream split assemblage EH and the second split assembly AF2. Similarly, the step 140 of separating the upstream split assemblage EG between the precursor assemblage EP1, the second split assembly AF2 and the temporary core NT comprises a step 133 of separating the upstream split assemblage EG between the downstream split assemblage EH and the second split assembly AF2. In the present case, the step of separating 133 comprises a step 133' of splitting the upstream split assemblage EG between the downstream split assemblage EH and the second split assembly AF2.

The means 40 for separating the upstream split assemblage EG between the precursor assemblage EP1, the second split assembly AF2 and the temporary core NT also comprise means 41 for separating the downstream split assemblage EH between the precursor assemblage EP1 and the temporary core NT. In the present case, the means for separating 41 comprise means 41' for splitting the downstream split assemblage EH into the precursor assemblage EP1 and the temporary core NT. Similarly, the step 140 of separating the upstream split assemblage EG between the precursor assemblage EP1, the second split assembly AF2 and the temporary core NT comprises a step 141 of separating the downstream split assemblage EH between the precursor assemblage EP1 and the temporary core NT. In the present case, the step of separating 141 comprises a step 141' of splitting the downstream split assemblage EH into the precursor assemblage EP1 and the temporary core NT.

The means 29 for separating the temporary assembly AT between the upstream split assemblage EG and the third split assembly AF3 are arranged upstream of the means 32 for separating the upstream split assemblage EG between the first split assembly AF1, the second split assembly AF2 and the temporary core NT. Similarly, the step 129 of separating the temporary assembly AT between the upstream split assemblage EG and the third split assembly AF3 takes place upstream of the step 132 of separating the upstream split assemblage EG between the first split assembly AF1, the second split assembly AF2 and the temporary core NT.

The means 40 for separating the upstream split assemblage EG between the precursor assemblage EP1, the second split assembly AF2 and the temporary core NT are arranged upstream of the means 42 for separating the precursor assemblage EP1 between the main assemblage EM1 forming the first split assembly AF1 and the supplementary assemblage ES1. Similarly, the step 140 of separating the upstream split assemblage EG between the precursor assemblage EP1, the second split assembly AF2 and the temporary core NT takes place upstream of the step 142 of separating the precursor assemblage EP1 between the main assemblage EM1 forming the first split assembly AF1 and the supplementary assemblage ES1.

The means 33 for separating the upstream split assemblage EG between the downstream split assemblage EH and the second split assembly AF2 are arranged upstream of the means 41 for separating the downstream split assemblage EH between the precursor assemblage EP1 and the temporary core NT. Similarly, the step 133 of separating the upstream split assemblage EG between the downstream split assemblage EH and the second split assembly AF2 takes place upstream of the step 141 of separating the downstream split assemblage EH between the precursor assemblage EP1 and the temporary core NT.

It will be noted that, in this fifth embodiment, $A1'\geq G1'$, $G1'\leq D1'$, $D1'=J1'$, $I1'=J1'+K1'$, $H1'=I1'$, $G1'=H1'+E1'$, $A2'\geq F2'+G2'$, $A2'\geq I2'+G2'$, $I2'\geq J2'+K2'$, $G2'=E2'$, $J2'=F2'$.

The other means and steps follow mutatis mutandis from those of the preceding embodiments.

Installation and Method According to a Sixth Embodiment of the Invention

Figure 20:
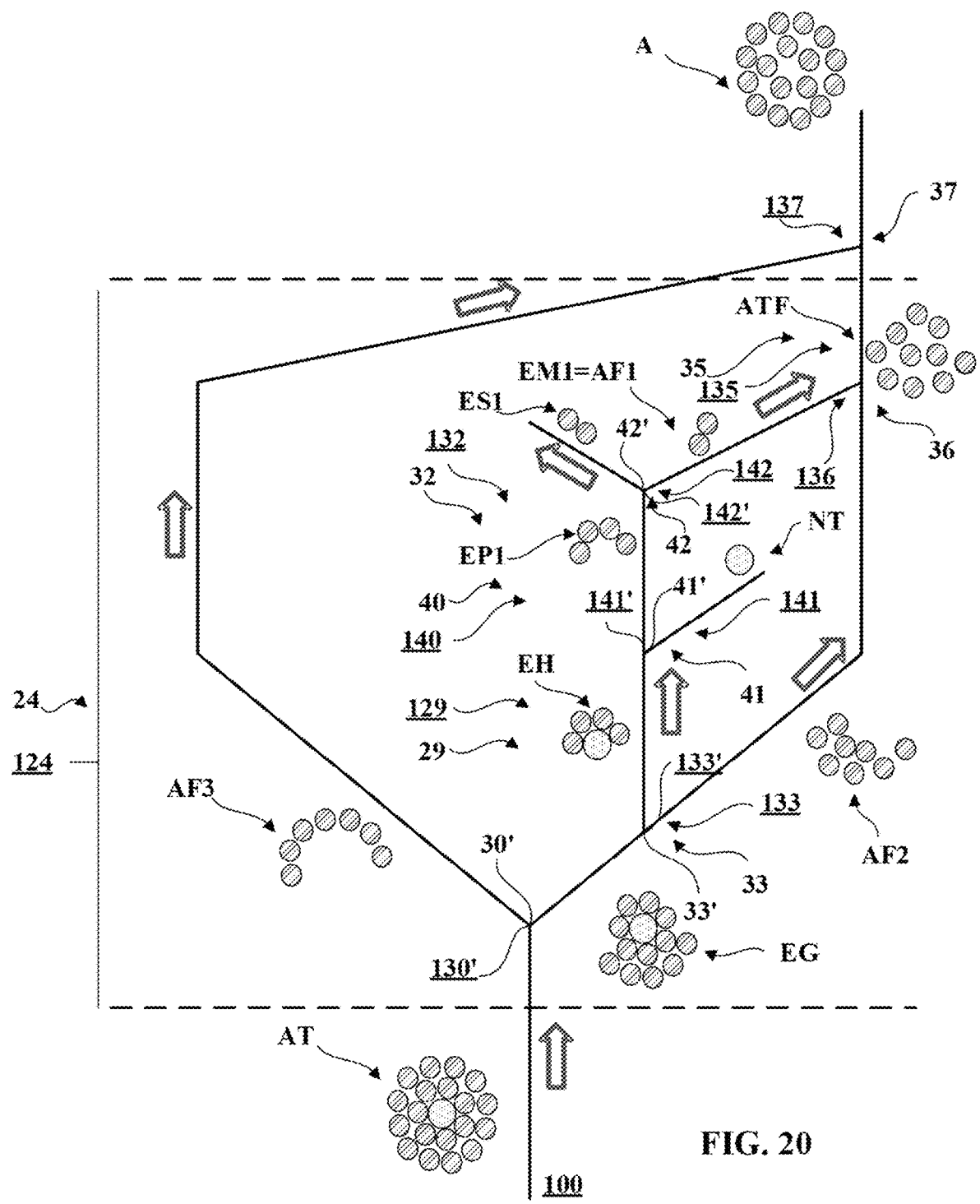

An installation and a method according to the sixth embodiment of the invention will now be described with reference to FIG. 20. Elements similar to those of the preceding embodiments are denoted by identical references.

Unlike in the fifth embodiment, the means 24 for separating the temporary assembly AT between the first split assembly AF1, the second split assembly AF2, the third split assembly AF3 and the temporary core NT and the means 35 for reassembling the first split assembly AF1 with the second split assembly AF2 and the third split assembly AF3 are arranged such that $E2'+F2'=A2'$. In particular, the means 24 for separating and the means 35 for reassembling are arranged such that $C2'=A2'$. Similarly, the step 124 of separating the temporary assembly AT between the first split assembly AF1, the second split assembly AF2, the third split assembly AF3 and the temporary core NT and the step 135 of reassembling the first split assembly AF1 with the second split assembly AF2 and the third split assembly AF3 are carried out such that $E2'+F2'=A2'$. In particular, the step 124 of separating and the step 135 of reassembling are carried out such that $C2'=A2'$.

In the present case, the means 29 for separating the temporary assembly AT between the upstream split assemblage EG and the third split assembly AF3 comprise means 30' for splitting the temporary assembly AT into the upstream split assemblage EG and the third split assembly AF3. Similarly, the step 129 of separating the temporary assembly AT between the upstream split assemblage EG and the third split assembly AF3 comprises a step 130' of splitting the temporary assembly AT into the upstream split assemblage EG and the third split assembly AF3.

The other means and steps follow mutatis mutandis from those of the first embodiment.

Installation and Method According to a Seventh Embodiment of the Invention

Figure 21:
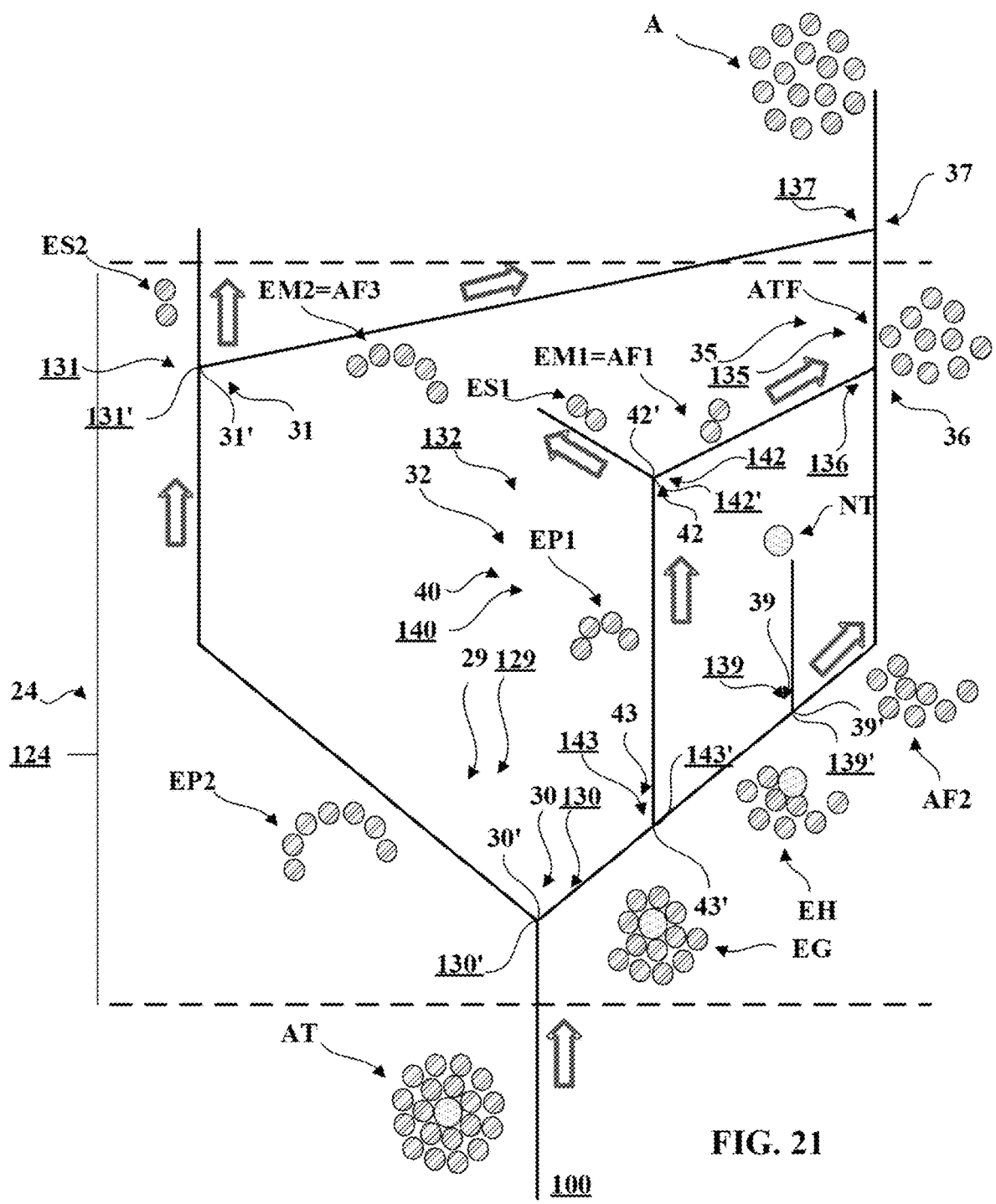

An installation and a method according to the seventh embodiment of the invention will now be described with reference to FIG. 21. Elements similar to those of the preceding embodiments are denoted by identical references.

Figure 17:
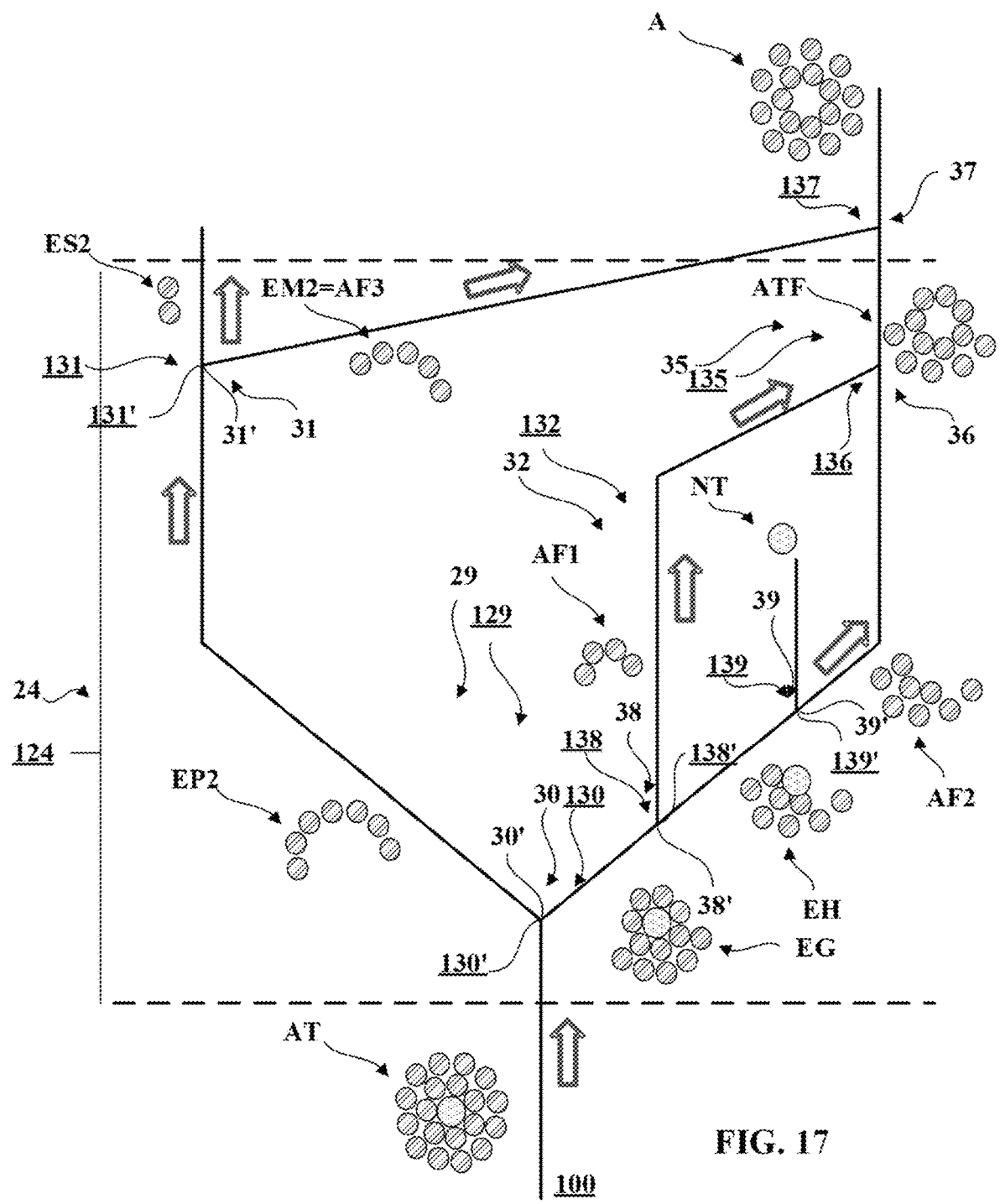
FIGS. 17 to 24 are schematic representations of installations and production methods analogous to those of FIGS. 2 and 16 of other embodiments of the invention.

Unlike in the fifth embodiment, the means 40 for separating the upstream split assemblage EG between the precursor assemblage EP1, the second split assembly AF2 and the temporary core NT comprise means 43 for separating the upstream split assemblage EG between a downstream split assemblage EH similar to the downstream split assemblage EH of the third embodiment of FIG. 17 and the precursor assemblage EP1. In the present case, the means for separating 43 comprise means 43' for splitting the upstream split assemblage EG into a downstream split assemblage EH and the precursor assemblage EP1. Similarly, the step 140 of separating the upstream split assemblage EG between the precursor assemblage EP1, the second split assembly AF2 and the temporary core NT comprises a step 143 of separating the upstream split assemblage EG between a downstream split assemblage EH and the precursor assemblage EP1. In the present case, the step of separating 43 comprises a step 143' of splitting the upstream split assemblage EG into a downstream split assemblage EH and the precursor assemblage EP1.

Unlike in the fifth embodiment, the means 40 for separating the upstream split assemblage EG between the precursor assemblage EP1, the second split assembly AF2 and the temporary core NT also comprise means 39 for separating the downstream split assemblage EH between the second split assembly AF2 and the temporary core NT. These means for separating 39, the means for splitting 39' and the steps of separating 139 and of splitting 139' are similar to those of the third embodiment of FIG. 17.

The other means and steps follow mutatis mutandis from those of the preceding embodiments.

Installation and Method According to an Eighth Embodiment of the Invention

Figure 22:
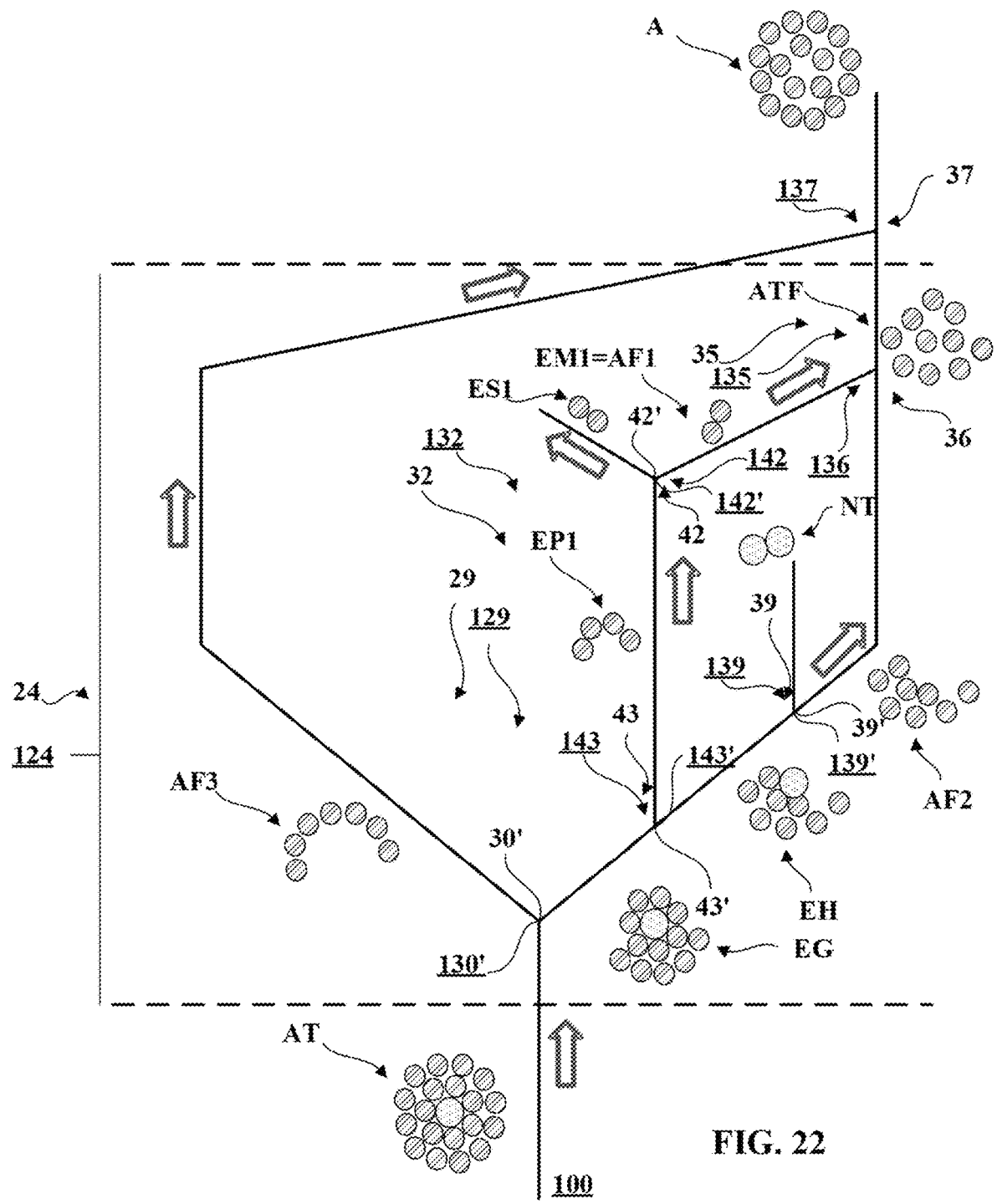

An installation and a method according to the eighth embodiment of the invention will now be described with reference to FIG. 22. Elements similar to those of the preceding embodiments are denoted by identical references.

The differences between the eighth embodiment and the sixth embodiment are the same differences as between the seventh embodiment and the fifth embodiment. The means and steps therefore follow mutatis mutandis from those of the preceding embodiments.

Installation and Method According to a Ninth Embodiment of the Invention

Figure 23:
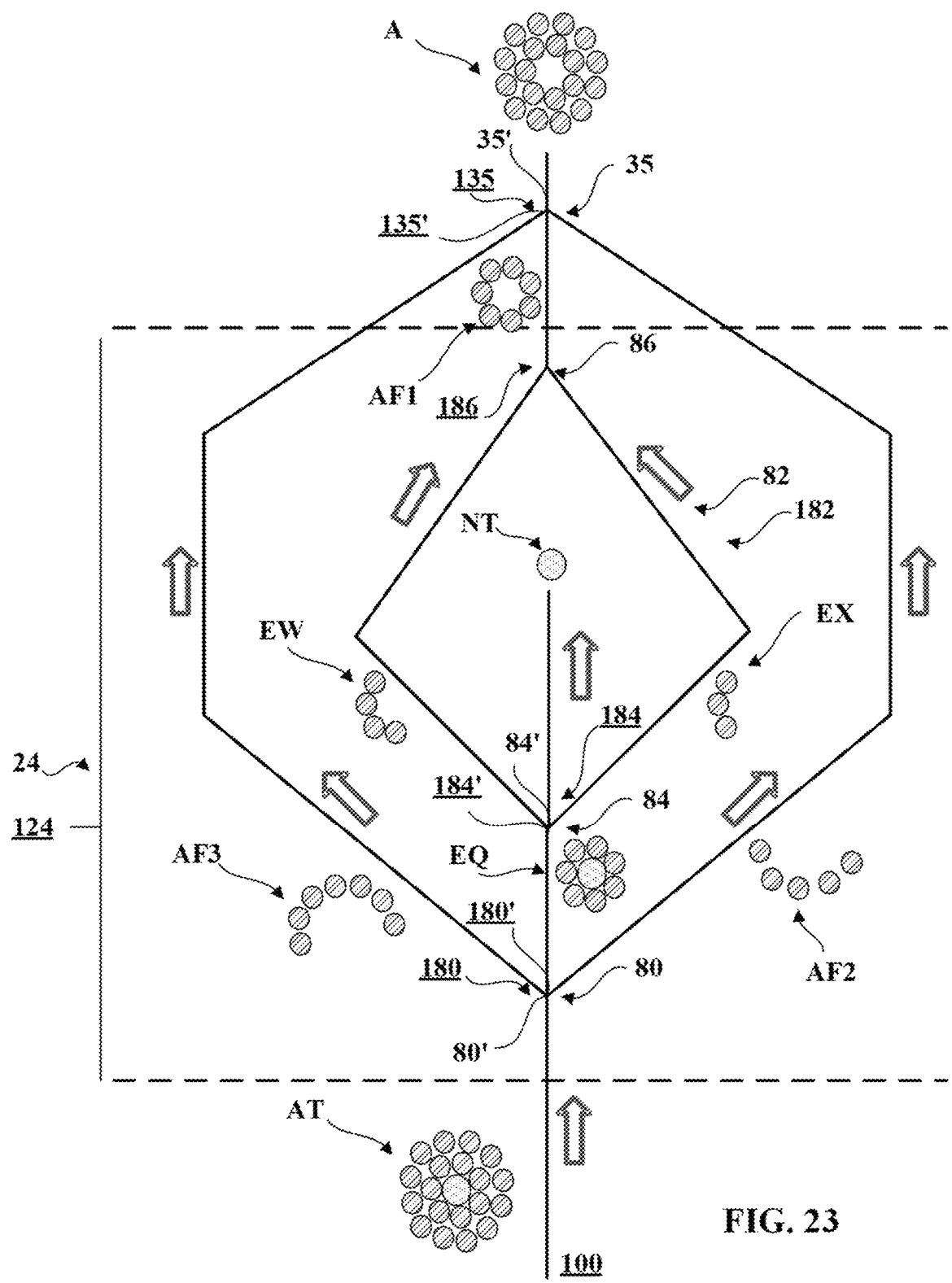

An installation and a method according to the ninth embodiment of the invention will now be described with reference to FIG. 23. Elements similar to those of the preceding embodiments are denoted by identical references.

As in the second and fourth embodiments, the means 24 for separating and the means 35 for reassembling are arranged such that C1'=A1' and C2'=A2'. Similarly, the step 124 of separating and the step 135 of reassembling are carried out such that C1'=A1' and C2'=A2'.

Unlike in the preceding embodiments, the first split assembly is composed of the layer D1 with here D1'=7, the second split assembly is composed of the layer E2 with here E2'=5 and the third split assembly is composed of the layer F2 with here F2'=7. In this ninth embodiment, therefore, D1'=C1' and E2'+F2'=C2'.

Unlike in the preceding embodiments, the means 35 for reassembling comprise means 35' for simultaneously reassembling the first, second and third split assemblies AF1, AF2, AF3 to form the final assembly A. Similarly, the step of reassembling 35 comprises a step 135' of simultaneously reassembling the first, second and third split assemblies AF1, AF2, AF3 to form the final assembly A.

Unlike in the preceding embodiments, the means 24 for separating the temporary assembly AT between the first split assembly AF1, the second split assembly AF2, the third split assembly AF3 and the temporary core NT comprise means 80 for separating the temporary assembly AT between an intermediate split assemblage EQ, the second split assembly AF2 and the third split assembly AF3. Here, the means for separating 80 comprise means 80' for splitting the temporary assembly AT into the intermediate split assembly EQ, the second split assembly AF2 and the third split assembly AF3. Similarly, the step 124 of separating the temporary assembly AT between the first split assembly AF1, the second split assembly AF2, the third split assembly AF3 and the temporary core NT comprises a step 180 of separating the temporary assembly AT between the intermediate split assemblage EQ, the second split assembly AF2 and the third split assembly AF3. Here, the step of separating 180 comprises a step 180' of splitting the temporary assembly AT into the intermediate split assemblage EQ, the second split assembly AF2 and the third split assembly AF3.

The means 24 for separating the temporary assembly AT between the first split assembly AF1, the second split assembly AF2, the third split assembly AF3 and the temporary core NT also comprise means for separating 82 the intermediate split assemblage EQ between the first split assembly AF1 and the temporary core NT. Similarly, the step 124 of separating the temporary assembly AT between the first split assembly AF1, the second split assembly AF2, the third split assembly AF3 and the temporary core NT comprises a step 182 of separating the intermediate split assemblage EQ between the first split assembly AF1 and the temporary core NT.

The intermediate split assemblage EQ comprises a layer Q1 composed of Q1'=7 metallic filamentary elements 14 helically wound around the temporary core NT, the Q1' metallic filamentary elements 14 being derived from the inner layer A1 composed of A1=7 metallic filamentary elements 14 of the temporary assembly AT. In the present case, the intermediate split assemblage EQ is composed of the layer Q1 and the temporary core NT, the Q1' metallic filamentary elements 14 being helically wound around the temporary core NT.

The means 80 for separating the temporary assembly AT between the intermediate split assemblage EQ, the second split assembly AF2 and the third split assembly AF3 are arranged upstream of the means 82 for separating the intermediate split assemblage EQ between the first split assembly AF1 and the temporary core NT. Similarly, the step 180 of separating the temporary assembly AT between the intermediate split assemblage EQ, the second split assembly AF2 and the third split assembly AF3 takes place upstream of the step 182 of separating the intermediate split assemblage EQ between the first split assembly AF1 and the temporary core NT.

Advantageously, the means 82 for separating the intermediate split assemblage EQ between the first split assembly AF1 and the temporary core NT comprise means 84 for separating the intermediate split assemblage EQ between a first separated assemblage EW, a second separated assemblage EX and the temporary core NT. Here, the means for separating 84 comprise means 84' for splitting the intermediate split assemblage EQ into the first separated assemblage EW, the second separated assemblage EX and the temporary core NT. Similarly, the step 182 of separating the intermediate split assemblage EQ between the first split assembly AF1 and the temporary core NT comprises a step 184 of separating the intermediate split assemblage between the first separated assemblage EW, the second separated assemblage EX and the temporary core NT. Here, the step of separating 184 comprises a step 184' of splitting the intermediate split assemblage EQ into the first separated assemblage EW, the second separated assemblage EX and the temporary core NT.

The means 82 for separating the intermediate split assemblage EQ between the first split assembly AF1 and the temporary core NT also comprise means 86 for reassembling the first separated assemblage EW and the second separated assemblage EX to form the first split assembly AF1. Similarly, the step 182 of separating the intermediate split assemblage EQ between the first split assembly AF1 and the temporary core NT comprises a step 186 of reassembling the first separated assemblage EW and the second separated assemblage EX to form the first split assembly AF1.

The first separated assemblage EW comprises at least one layer W1 composed of W1'=4 helically wound metallic filamentary elements 14, the W1' metallic filamentary elements being derived from the layer Q1 composed of the Q1' metallic filamentary elements 14 of the intermediate split assemblage EQ. Here, the first separated assemblage EW is composed of the layer W1.

The second separated assemblage EX comprises at least one layer X1 composed of X1'=3 helically wound metallic filamentary elements 14, the X1' metallic filamentary elements being derived from the layer Q1 composed of the Q1' metallic filamentary elements 14 of the intermediate split assemblage EQ. Here, the second separated assemblage EX is composed of the layer X1.

The means 84 for separating the intermediate split assemblage EQ between the first separated assemblage EW, the second separated assemblage EX and the temporary core NT are arranged upstream of the means 86 for reassembling the first separated assemblage EW and the second separated assemblage EX to form the first split assembly AF1. Similarly, the step 184 of separating the intermediate split assemblage EQ between the first separated assemblage EW, the second separated assemblage EX and the temporary core NT takes place upstream of the step 186 of reassembling the first separated assemblage EW and the second separated assemblage EX to form the first split assembly AF1.

It will be noted that, in this ninth embodiment, C1'=A1', C2'=A2', A1'=Q1', A2'=E2'+F2', Q1'=D1' and Q1'=W1'+X1'=D1'.

Installation and Method According to a Tenth Embodiment of the Invention

Figure 24:
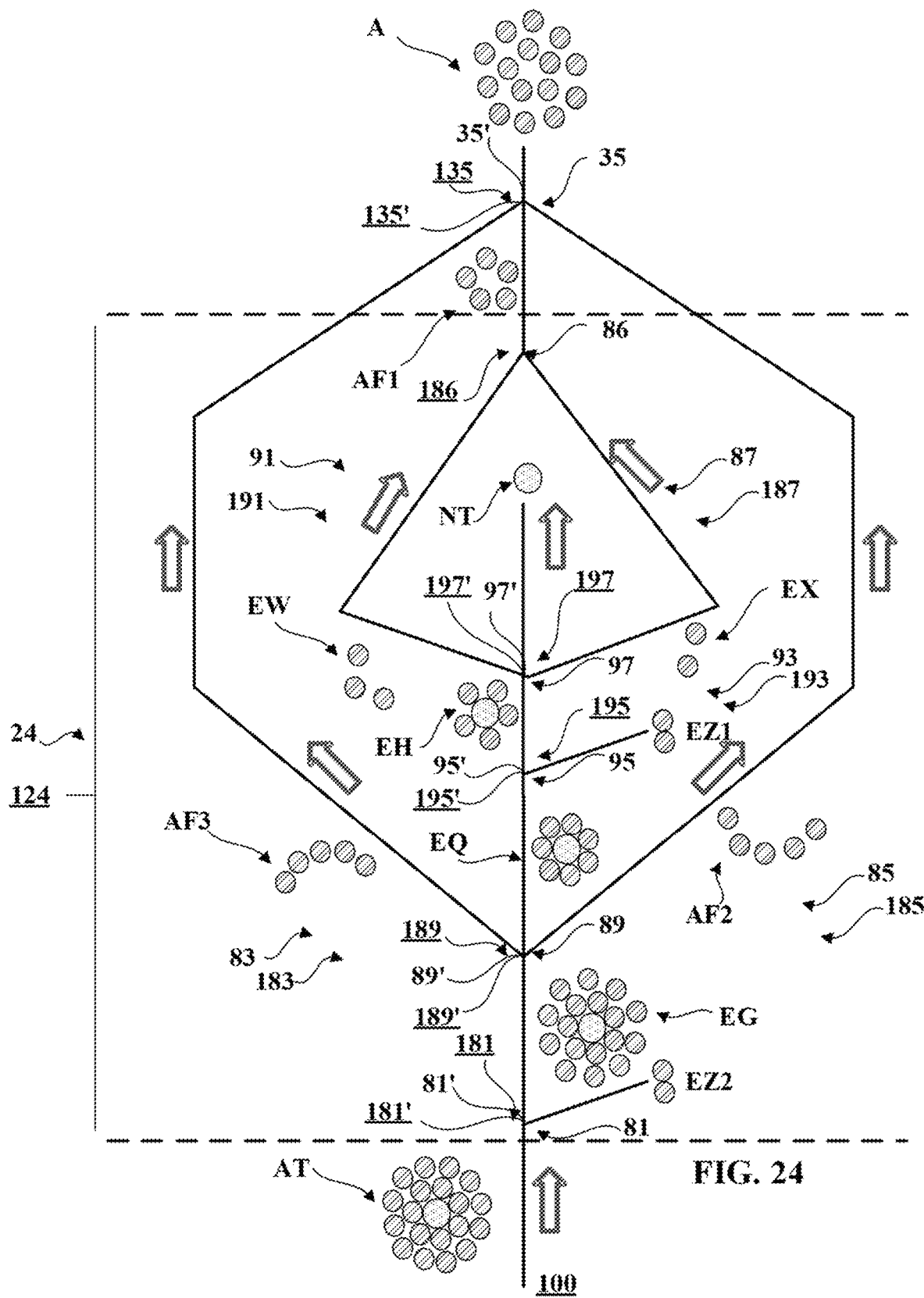

An installation and a method according to the tenth embodiment of the invention will now be described with reference to FIG. 24. Elements similar to those of the preceding embodiments are denoted by identical references.

Unlike in the ninth embodiment, the means 24 for separating and the means 35 for reassembling are arranged such that C1'<A1' and C2'<A2'. Similarly, the step 124 of separating and the step 135 of reassembling are carried out such that C1'<A1' and C2'<A2'.

Unlike in the preceding embodiments, the means 24 for separating the temporary assembly AT between the first split assembly AF1, the second split assembly AF2, the third split assembly AF3 and the temporary core NT comprise means 81 for separating the temporary assembly AT between a derived assemblage EZ2 and an upstream split assemblage EG. Here, the means for separating 81 comprise means 81' for splitting the temporary assembly AT into the derived assemblage EZ2 and the upstream split assemblage EG. Similarly, the step 124 of separating the temporary assembly AT between the first split assembly AF1, the second split assembly AF2, the third split assembly AF3 and the temporary core NT comprises a step 181 of separating the temporary assembly AT between the derived assemblage EZ2 and the upstream split assemblage EG. Here, the step of separating 181 comprises a step 181' of splitting the temporary assembly AT into the derived assemblage EZ2 and the upstream split assemblage EG.

The derived assemblage EZ2 comprises at least one layer Z2 composed of Z2'=2 helically wound metallic filamentary elements 14, the Z2' metallic filamentary elements 14 being derived from the outer layer A2 composed of the A2' metallic filamentary elements 14 of the temporary assembly AT. Here, the derived assemblage EZ2 is composed of the layer Z2. The upstream split assemblage EG comprises at least two layers comprising an inner layer G1 composed of G1'=7 metallic filamentary elements 14 helically wound around the temporary core NT and an outer layer G2 composed of G2'=10 metallic filamentary elements 14 helically wound around the inner layer G1. The G1' metallic filamentary elements 14 are derived from the inner layer A1 composed of the A1' metallic filamentary elements 14 of the temporary assembly AT and the G2' metallic filamentary elements 14 are derived from the outer layer A2 composed of the A2' metallic filamentary elements 14 of the temporary assembly AT. Here, the split assemblage EG is composed of the inner layer G1, the outer layer G2 and the temporary core NT.

The means 24 for separating the temporary assembly AT between the first split assembly AF1, the second split assembly AF2, the third split assembly AF3 and the temporary core NT comprise means 83 for separating the temporary assembly AT between an intermediate split assemblage EQ, the second split assembly AF2 and the third split assembly AF3. Similarly, the step 124 of separating the temporary assembly AT between the first split assembly AF1, the second split assembly AF2, the third split assembly AF3 and the temporary core NT comprises a step 183 of separating the temporary assembly AT between the intermediate split assemblage EQ, the second split assembly AF2 and the third split assembly AF3.

The intermediate split assemblage EQ comprises at least one layer Q1 composed of Q1'=7 metallic filamentary elements 14 helically wound around the temporary core NT, the Q1' metallic filamentary elements 14 being derived from the layer G1 composed of the G1' metallic filamentary elements 14 of the upstream split assemblage EG. Here, the intermediate split assemblage EQ is composed of the layer Q1 and the temporary core NT, the Q1' metallic filamentary elements 14 being helically wound around the temporary core NT.

The means 24 for separating the temporary assembly AT between the first split assembly AF1, the second split assembly AF2, the third split assembly AF3 and the temporary core NT also comprise means 85 for separating the upstream split assemblage EG between the first split assembly AF1, the second split assembly AF2, the third split assembly AF3 and the temporary core NT. Similarly, the step 124 of separating the temporary assembly AT between the first split assembly AF1, the second split assembly AF2, the third split assembly AF3 and the temporary core NT comprises a step 185 of separating the upstream split assemblage EG between the first split assembly AF1, the second split assembly AF2, the third split assembly AF3 and the temporary core NT.

The means 24 for separating the temporary assembly AT between the first split assembly AF1, the second split assembly AF2, the third split assembly AF3 and the temporary core NT also comprise means 87 for separating the intermediate split assemblage EQ between a derived assemblage EZ1, the first split assembly AF1 and the temporary core NT. Similarly, the step 124 of separating the temporary assembly AT between the first split assembly AF1, the second split assembly AF2, the third split assembly AF3 and the temporary core NT comprises a step 187 of separating the intermediate split assemblage EQ between the derived assemblage EZ1, the first split assembly AF1 and the temporary core NT.

The derived assemblage EZ1 comprises at least one layer Z1 composed of $Z1'=2$ helically wound metallic filamentary elements 14, the Z1' metallic filamentary elements 14 being derived from the outer layer Q1 composed of the $Q1'=7$ metallic filamentary elements 14 of the temporary assembly EQ. Here, the derived assemblage EZ1 is composed of the layer Z1.

The means 81 for separating the temporary assembly AT between the derived assemblage EZ1 and the upstream split assemblage EG are arranged upstream of the means 85 for separating the upstream split assemblage EG between the first split assembly AF1, the second split assembly AF2, the third split assembly AF3 and the temporary core NT. Similarly, the step 181 of separating the temporary assembly AT between the derived assemblage EZ2 and the upstream split assemblage EG takes place upstream of the step 185 of separating the upstream split assemblage EG between the first split assembly AF1, the second split assembly AF2, the third split assembly AF3 and the temporary core NT.

The means 83 for separating the temporary assembly AT between the intermediate split assemblage EQ, the second split assembly AF2 and the third split assembly AF3 are arranged upstream of the means 87 for separating the intermediate split assemblage EQ between the derived assemblage EZ1, the first split assembly AF1 and the temporary core NT. Similarly, the step 183 of separating the temporary assembly AT between the intermediate split assemblage EQ, the second split assembly AF2 and the third split assembly AF3 takes place upstream of the step 187 of separating the intermediate split assemblage EQ between the derived assemblage EZ1, the first split assembly AF1 and the temporary core NT.

The means 85 for separating the upstream split assemblage EG between the first split assembly AF1, the second split assembly AF2, the third split assembly AF3 and the temporary core NT comprise means 89 for separating the upstream split assemblage EG between an intermediate split assemblage EQ, the second split assembly AF2 and the third split assembly AF3. Here, the means for separating 89 comprise means 89' for splitting the upstream split assemblage EG into the intermediate split assemblage EQ, the second split assembly AF2 and the third split assembly AF3. Similarly, the step 185 of separating the upstream split assemblage EG between the first split assembly AF1, the second split assembly AF2, the third split assembly AF3 and the temporary core NT comprises a step 189 of separating the upstream split assemblage EG between the intermediate split assemblage EQ, the second split assembly AF2 and the third split assembly AF3. Here, the step of separating 189 comprises a step 189' of splitting the upstream split assemblage EG into the intermediate split assemblage EQ, the second split assembly AF2 and the third split assembly AF3.

The means 85 for separating the upstream split assemblage EG between the first split assembly AF1, the second split assembly AF2, the third split assembly AF3 and the temporary core NT also comprise means 91 for separating the intermediate split assemblage EQ between the first split assembly AF1 and the temporary core NT. Similarly, the step 185 of separating the upstream split assemblage EG between the first split assembly AF1, the second split assembly AF2, the third split assembly AF3 and the temporary core NT also comprises a step 191 of separating the intermediate split assemblage EQ between the first split assembly AF1 and the temporary core NT.

The means 89 for separating the upstream split assemblage EG between the intermediate split assemblage EQ, the second split assembly AF2 and the third split assembly AF3 are arranged upstream of the means 91 for separating the intermediate split assemblage EQ between the first split assemblage AF1 and the temporary core NT. Similarly, the step 189 of separating the upstream split assemblage EG between the intermediate split assemblage EQ, the second split assembly AF2 and the third split assembly AF3 takes place upstream of the step 191 of separating the intermediate split assemblage EQ between the first split assemblage AF1 and the temporary core NT.

The means 87 for separating the intermediate split assemblage EQ between the derived assemblage EZ1, the first split assembly AF1 and the temporary core comprise means 93 for separating the intermediate split assemblage EQ between a first separated assemblage EW, a second separated assemblage EX, the derived assemblage EZ1 and the temporary core NT. The separated assemblages EW and EX are similar to those of the ninth embodiment. Similarly, the step 187 of separating the intermediate split assemblage EQ between the derived assemblage EZ1, the first split assembly AF1 and the temporary core NT comprises a step 193 of separating the intermediate split assemblage EQ between the first separated assemblage EW, the second separated assemblage EX, the derived assemblage EZ1 and the temporary core NT.

The means 87 for separating the intermediate split assemblage EQ between the derived assemblage EZ1, the first split assembly AF1 and the temporary core NT comprise means 86 for reassembling the first separated assemblage EW and the second separated assemblage EX to form the first split assembly AF1, which means are identical to those of the ninth embodiment. Similarly, the step 187 of separating the intermediate split assemblage EQ between the derived assemblage EZ1, the first split assembly AF1 and the temporary core NT comprises a step 186 of reassembling the first separated assemblage EW and the second separated assemblage EX to form the first split assembly AF1.

The first separated assemblage EW comprises at least one layer W1 composed of $W1'=3$ helically wound metallic filamentary elements 14, the W1' metallic filamentary elements 14 being derived from the layer Q1 composed of the Q1' metallic filamentary elements 14 of the intermediate split assemblage EQ. The second separated assemblage EX comprises at least one layer X1 composed of X1'=2 helically wound metallic filamentary elements 14, the X1' metallic filamentary elements 14 being derived from the layer Q1 composed of the Q1' metallic filamentary elements 14 of the intermediate split assemblage EQ. Here, each first and second separated assemblage EW, EX is composed of the layer W1, X1, respectively.

The means 93 for separating the intermediate split assemblage EQ between the first separated assemblage EW, the second separated assemblage EX, the derived assemblage EZ1 and the temporary core NT are arranged upstream of the means 86 for reassembling the first separated assemblage EW and the second separated assemblage EX to form the first split assembly AF1. Similarly, the step 193 of separating the intermediate split assemblage EQ between the first separated assemblage EW, the second separated assemblage EX, the derived assemblage EZ1, the temporary core NT takes place upstream of the step 186 of reassembling the first separated assemblage EW and the second separated assemblage EX to form the first split assembly AF1.

The means 93 for separating the intermediate split assemblage EQ between the first separated assemblage EW, the second separated assemblage EX, the derived assemblage EZ1, the temporary core NT comprise means 95 for separating the intermediate split assemblage EQ between the derived assemblage EZ1 and a downstream split assemblage EH. Here, the means for separating 95 comprise means 95' for splitting the intermediate split assemblage EQ into the derived assemblage EZ1 and the downstream split assemblage EH. Similarly, the step 193 of separating the intermediate split assemblage EQ between the first separated assemblage EW, the second separated assemblage EX, the derived assemblage EZ1, the temporary core NT comprises a step 195 of separating the intermediate split assemblage EQ between the derived assemblage EZ1 and the downstream split assemblage EH. Here, the step of separating 195 comprises a step 195' of splitting the intermediate split assemblage EQ into the derived assemblage EZ1 and the downstream split assemblage EH.

The downstream split assemblage EH comprises a layer H1 composed of H1'=5 metallic filamentary elements 14 helically wound around the temporary core NT, the H1' metallic filamentary elements 14 being derived from the layer Q1 composed of the Q1'>1 metallic filamentary elements 14 of the intermediate split assemblage EQ. Here, the downstream split assemblage EH is composed of the layer H1 and the temporary core NT, the H1' metallic filamentary elements 14 being helically wound around the temporary core NT.

The means 93 for separating the intermediate split assemblage EQ between the first separated assemblage EW, the second separated assemblage EX, the derived assemblage EZ1, the temporary core NT comprise means 97 for separating the downstream split assemblage EH between the first separated assemblage EW, the second separated assemblage EX and the temporary core NT. Here, the means for separating 97 comprise means 97' for splitting the downstream split assemblage EH into the first separated assemblage EW, the second separated assemblage EX and the temporary core NT. Similarly, the step 193 of separating the intermediate split assemblage EQ between the first separated assemblage EW, the second separated assemblage EX, the derived assemblage EZ1 and the temporary core NT comprises a step 197 of separating the downstream split assemblage EH between the first separated assemblage EW, the second separated assemblage EX and the temporary core NT. Here, the step of separating 197 comprises a step 197' of splitting the downstream split assemblage EH into the first separated assemblage EW, the second separated assemblage EX and the temporary core NT.

The means 95 for separating the intermediate split assemblage EQ between the derived assemblage EZ1 and the downstream split assemblage EH are arranged upstream of the means 97 for separating the downstream split assemblage EH between the first separated assemblage EW, the second separated assemblage EX and the temporary core NT. Similarly, the step 195 of separating the intermediate split assemblage EQ between the derived assemblage EZ1 and the downstream split assemblage EH takes place upstream of the step 197 of separating the downstream split assemblage EH between the first separated assemblage EW, the second separated assemblage EX and the temporary core NT.

As in the ninth embodiment, the means 35 for reassembling comprise means 35' for simultaneously reassembling the first, second and third split assemblies AF1, AF2, AF3 to form the final assembly A. Similarly, the step of reassembling 135 comprises a step 135' of simultaneously reassembling the first, second and third split assemblies AF1, AF2, AF3 to form the final assembly A.

It will be noted that, in this tenth embodiment, C1'<A1', C2'<A2', A1'=G1', A2'=Z2'+G2', G1'=Q1', G2'=E2'+F2', Q1'>D1', A1'≥Q1', A2'>E2'+F2', Q1'=Z1'+D1', Q1'=W1'+X1'+Z1', Q1'=Z1'+H1', H1'=W1'+X1' and W1'+X1'=D1'.

The invention is not limited to the embodiments described above. Indeed, it is entirely possible to envisage utilising, without departing from the scope of the invention, a method and an installation in which the step and the means for separating the temporary assembly between at least the first split assembly, the second split assembly, the third split assembly and the temporary core or one or more assemblages comprising the temporary core is a step or are means for separating the temporary assembly between the first split assembly, the second split assembly, the third split assembly and an assemblage comprising the temporary core and filamentary elements derived from the temporary assembly.

In addition, it is possible to envisage, without departing from the scope of the invention, a temporary core comprising first and second parts, of which the first part is separated with a first upstream split assemblage from which there are obtained, after one or more steps of separating, the first and second split assemblies, and of which the second part is separated with a second upstream split assemblage from which there is obtained, after one or more steps of separating, the third split assembly.

It is also possible to envisage a step of separating, or means for separating, the temporary assembly into more than the first, second and third split assemblies AF1, AF2, AF3, for example four, five or even six split assemblies. In such embodiments, the step of reassembling, or the means for reassembling, may permit the reassembling of more than the first, second and third split assemblies AF1, AF2, AF3, for example the reassembling of four, five or even six split assemblies.

In the embodiments described above, the pitch p1 is equal to the pitch p2 and the direction of winding of the metallic filamentary elements of the inner layer of the final assembly is identical to the direction of winding of the metallic filamentary elements of the outer layer of the final assembly. It is also possible to envisage a final assembly in which the pitch p1 is different from the pitch p2, the directions of winding of the metallic filamentary elements of the inner layer and of the outer layer of the final assembly being identical. To this end, there will be envisaged a step of providing the temporary assembly in which the inner layer is assembled around the temporary core with a first pitch p1' in a first step of assembling and then in which the outer layer is assembled around the inner layer with a second pitch p2' which is different from p1' in a second step of assembling. A step of storing the inner layer wound around the temporary core between the first and second steps of assembling can optionally be provided.

The invention claimed is:

1. A method for producing a final assembly comprising at least two layers comprising an inner layer C1 composed of C1'>1 helically wound metallic filamentary elements and an outer layer C2 composed of C2'>1 metallic filamentary elements helically wound around the inner layer C1, the method comprising:
   a step of providing a temporary assembly comprising at least two layers comprising an inner layer A1 composed of A1'>1 metallic filamentary elements helically wound around a temporary core and an outer layer A2 composed of A2'>1 metallic filamentary elements helically wound around the inner layer A1;
   a step of separating the temporary assembly into at least:
      a first split assembly comprising at least one layer D1 composed of D1'≥1 helically wound metallic filamentary elements, the D1' metallic filamentary elements being derived from the inner layer A1 composed of A1'>1 metallic filamentary elements of the temporary assembly,
      a second split assembly comprising at least one layer comprising a layer E2 composed of E2'≥1 helically wound metallic filamentary elements, the E2' metallic filamentary elements being derived from the outer layer A2 composed of A2'>1 metallic filamentary elements of the temporary assembly (AT),
      a third split assembly comprising at least one layer F2 composed of F2'≥1 helically wound metallic filamentary elements, the F2' metallic filamentary elements being derived from the outer layer A2 composed of A2'>1 metallic filamentary elements of the temporary assembly, and
      the temporary core or one or more assemblages comprising the temporary core; and
   a step of reassembling at least the first split assembly, the second split assembly and the third split assembly to form the final assembly.

2. The method according to claim 1, wherein the step of separating the temporary assembly and the step of reassembling the first split assembly with the second split assembly and the third split assembly are carried out such that C1'<A1' and C2'≤A2'.

3. The method according to claim 2, wherein, the second split assembly comprising at least two layers comprising an inner layer E1 composed of E1'≥1 helically wound metallic filamentary elements and an outer layer E2 composed of E2'≥1 metallic filamentary elements helically wound around the inner layer E1, the E1' metallic filamentary elements being derived from the inner layer A1 composed of A1'>1 metallic filamentary elements of the temporary assembly and the E2' metallic filamentary elements being derived from the outer layer A2 composed of A2'>1 metallic filamentary elements of the temporary assembly, the step of separating the temporary assembly comprises:
   a step of separating the temporary assembly into:
      an upstream split assemblage comprising at least two layers comprising an inner layer G1 composed of G1'≥1 metallic filamentary elements helically wound around the temporary core and an outer layer G2 composed of G2'≥1 metallic filamentary elements helically wound around the inner layer G1, the G1' metallic filamentary elements being derived from the inner layer A1 composed of A1'>1 metallic filamentary elements of the temporary assembly and the G2' metallic filamentary elements being derived from the outer layer A2 composed of A2'>1 metallic filamentary elements of the temporary assembly, and
      the third split assembly; and
   a step of separating the upstream split assemblage into:
      the first split assembly,
      the second split assembly, and
      the temporary core or one or more assemblages comprising the temporary core.

4. The method according to claim 3, wherein the step of separating the upstream split assemblage comprises:
   a step of separating the upstream split assemblage into:
      a precursor assemblage comprising at least one layer I1 composed of I1'>1 helically wound metallic filamentary elements, the I1' metallic filamentary elements being derived from the inner layer G1 composed of the G1' metallic filamentary elements of the upstream split assemblage EG,
      the second split assembly, and
      the temporary core or one or more assemblages comprising the temporary core; and
   a step of separating the precursor assemblage into:
      a main assemblage comprising at least one layer J1 composed of J1'≥1 helically wound metallic filamentary elements, the J1'≥1 metallic filamentary elements being derived from the layer I1 composed of the I1'>1 metallic filamentary elements of the precursor assemblage, the main assemblage forming the first split assembly, and
      a supplementary assemblage comprising at least one layer K1 composed of K1'≥1 helically wound metallic filamentary elements, the K1'≥1 metallic filamentary elements being derived from the layer I1 composed of the I1'>1 metallic filamentary elements of the precursor assemblage.

5. The method according to claim 2, wherein the step of separating the temporary assembly comprises:
   a step of separating the temporary assembly into:
      an intermediate split assemblage comprising a layer Q1 composed of Q1'>1 metallic filamentary elements helically wound around the temporary core, the Q1' metallic filamentary elements being derived from the inner layer A1 composed of A1'>1 metallic filamentary elements of the temporary assembly,
      the second split assembly, and
      the third split assembly; and
   a step of separating the intermediate split assemblage into:
      a derived assemblage comprising at least one layer Z1 composed of Z1'>1 helically wound metallic filamentary elements, the Z1' metallic filamentary elements being derived from the inner layer Q1 composed of the Q1'>1 metallic filamentary elements of the intermediate split assemblage,
      the first split assembly, and
      the temporary core or one or more assemblages comprising the temporary core.

6. The method according to claim 1, wherein the step of separating the temporary assembly and the step of reassembling the first split assembly with the second split assembly and the third split assembly are carried out such that $C1'=A1'$ and $C2'\leq A2'$.

7. The method according to claim 6, wherein, the second split assembly comprising at least two layers comprising an inner layer E1 composed of $E1'\geq 1$ helically wound metallic filamentary elements and an outer layer E2 composed of $E2'\geq 1$ metallic filamentary elements helically wound around the inner layer E1, the E1' metallic filamentary elements being derived from the inner layer A1 composed of $A1'>1$ metallic filamentary elements of the temporary assembly and the E2' metallic filamentary elements being derived from the outer layer A2 composed of $A2'>1$ metallic filamentary elements of the temporary assembly, the step of separating the temporary assembly comprises:
  a step of separating the temporary assembly into:
    an upstream split assemblage comprising at least two layers comprising an inner layer G1 composed of $G1'\geq 1$ metallic filamentary elements helically wound around the temporary core and an outer layer G2 composed of $G2'\geq 1$ metallic filamentary elements helically wound around the inner layer G1, the G1' metallic filamentary elements being derived from the inner layer A1 composed of $A1'>1$ metallic filamentary elements of the temporary assembly and the G2' metallic filamentary elements being derived from the outer layer A2 composed of $A2'>1$ metallic filamentary elements of the temporary assembly, and
    the third split assembly; and
  a step of separating the upstream split assemblage into:
    the first split assembly,
    the second split assembly, and
    the temporary core.

8. The method according to claim 6, wherein the step of separating the temporary assembly comprises:
  a step of separating the temporary assembly into:
    an intermediate split assemblage comprising a layer Q1 composed of $Q1'>1$ metallic filamentary elements helically wound around the temporary core, the Q1' metallic filamentary elements being derived from the inner layer A1 composed of $A1'>1$ metallic filamentary elements of the temporary assembly,
    the second split assembly, and
    the third split assembly; and
  a step of separating the intermediate split assemblage into:
    the first split assembly, and
    the temporary core or one or more assemblages comprising the temporary core.

9. The method according to claim 8, wherein the step of separating the intermediate split assemblage comprises:
  a step of separating the intermediate split assemblage into:
    a first separated assemblage comprising at least one layer W1 composed of $W1'\geq 1$ helically wound metallic filamentary elements, the W1' metallic filamentary elements being derived from the layer Q1 composed of the Q1' metallic filamentary elements of the intermediate split assemblage,
    a second separated assemblage comprising at least one layer X1 composed of $X1'\geq 1$ helically wound metallic filamentary elements, the X1' metallic filamentary elements being derived from the layer Q1 composed of the Q1' metallic filamentary elements of the intermediate split assemblage, and
    the temporary core or one or more assemblages comprising the temporary core; and
  a step of reassembling the first separated assemblage and the second separated assemblage to form the first split assembly.

10. The method according to claim 1, wherein the step of separating the temporary assembly and the step of reassembling the first split assembly, the second split assembly and the third split assembly are carried out such that $C2'<A2'$.

11. The method according to claim 1, wherein the step of separating the temporary assembly and the step of reassembling the first split assembly, the second split assembly and the third split assembly are carried out such that $C2'=A2'$.

12. An installation for producing a final assembly comprising at least two layers comprising an inner layer C1 composed of $C1'>1$ helically wound metallic filamentary elements and an outer layer C2 composed of $C2'>1$ metallic filamentary elements helically wound around the inner layer C1, the installation comprising:
  means for providing a temporary assembly comprising at least two layers comprising an inner layer A1 composed of $A1'>1$ metallic filamentary elements helically wound around a temporary core and an outer layer A2 composed of $A2'>1$ metallic filamentary elements helically wound around the inner layer A1;
  means for separating the temporary assembly into at least:
    a first split assembly comprising at least one layer D1 composed of $D1'\geq 1$ helically wound metallic filamentary elements, the D1' metallic filamentary elements being derived from the inner layer A1 composed of $A1'>1$ metallic filamentary elements of the temporary assembly,
    a second split assembly comprising at least one layer comprising a layer E2 composed of $E2'\geq 1$ helically wound metallic filamentary elements, the E2' metallic filamentary elements being derived from the outer layer A2 composed of $A2'>1$ metallic filamentary elements of the temporary assembly,
    a third split assembly comprising at least one layer F2 composed of $F2'\geq 1$ helically wound metallic filamentary elements, the F2' metallic filamentary elements being derived from the outer layer A2 composed of $A2'>1$ metallic filamentary elements of the temporary assembly, and
    the temporary core or one or more assemblages comprising the temporary core; and
  means for reassembling at least the first split assembly, the second split assembly and the third split assembly to form the final assembly.

* * * * *